US009120512B2

(12) United States Patent
Shirokura et al.

(10) Patent No.: US 9,120,512 B2
(45) Date of Patent: Sep. 1, 2015

(54) CONTROL DEVICE AND GAIT GENERATING DEVICE FOR BIPEDAL MOBILE ROBOT

(75) Inventors: Shinya Shirokura, Wako (JP); Hiroyuki Kaneko, Wako (JP); Chiaki Tanaka, Wako (JP); Masakazu Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 759 days.

(21) Appl. No.: 13/086,872

(22) Filed: Apr. 14, 2011

(65) Prior Publication Data

US 2011/0264264 A1 Oct. 27, 2011

(30) Foreign Application Priority Data

Apr. 22, 2010 (JP) .................................. 2010-099089
Apr. 22, 2010 (JP) .................................. 2010-099090

(51) Int. Cl.
*B62D 57/032* (2006.01)
*B25J 19/00* (2006.01)

(52) U.S. Cl.
CPC ........... *B62D 57/032* (2013.01); *B25J 19/0008* (2013.01); *G05B 2219/40264* (2013.01)

(58) Field of Classification Search
CPC ................. B62D 57/00–57/04; B62D 57/032; B25J 19/0008; A63H 3/00; G06N 3/004; G06N 3/008; G05B 2219/40264
USPC .......... 700/245, 250, 254, 260–261; 901/1–2; 446/325–326; 318/568.1–568.19
See application file for complete search history.

(56) References Cited

U.S. PATENT DOCUMENTS

2003/0017779 A1* 1/2003 Sakai ............................ 446/226
2005/0228539 A1* 10/2005 Takenaka et al. ............. 700/245
2009/0187275 A1* 7/2009 Suga et al. .................... 700/245

FOREIGN PATENT DOCUMENTS

| JP | 4-72755 | 11/1992 |
| JP | 3674788 | 5/2005 |
| JP | 2005-305597 | 11/2005 |
| JP | 2006-212736 | 8/2006 |
| JP | 2006-247769 | 9/2006 |
| JP | 4246638 | 4/2009 |

OTHER PUBLICATIONS

Hop Definition, theFreeDictionary.com.*
Skip Definition, theFreeDictionary.com.*
Gary Boone and Jessica Hodgins, Slipping and Tripping Reflexes for Bipedal Robots, Autonomous Robots 4, 259-271(1997)).*

* cited by examiner

*Primary Examiner* — Khoi Tran
*Assistant Examiner* — Abby Lin
(74) *Attorney, Agent, or Firm* — Rankin, Hill & Clark LLP

(57) ABSTRACT

A control device for a bipedal mobile robot generates a desired motion of a bipedal mobile robot. When causing the robot to perform a one-leg hopping operation, a desired motion of the robot is generated such that the proximal end portion of a free leg of the robot is positioned at a relatively higher level than the proximal end portion of a supporting leg thereof in the state wherein the supporting leg has landed on a floor after leaving from the floor and such that the horizontal distance between the total center-of-gravity point of the robot and the proximal end portion of the supporting leg in the aforesaid state is shorter than the horizontal distance therebetween in a state wherein the robot is standing in an upright posture.

11 Claims, 31 Drawing Sheets

RUNNING GAIT

ONE-LEG HOPPING GAIT

EMERGENCY GAIT

FIG.13(a)　　　　　　　　　FIG.13(b)
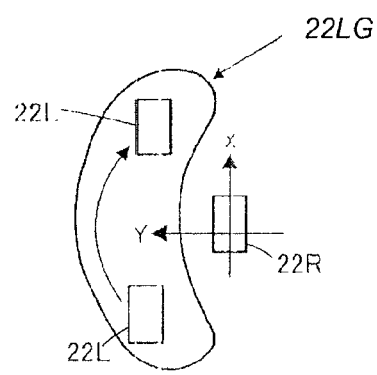 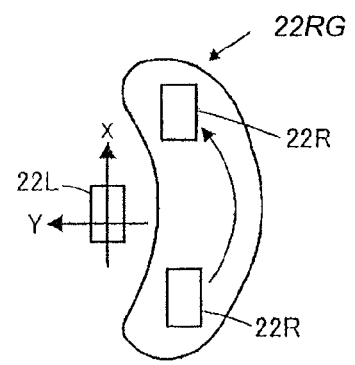
FIG.14
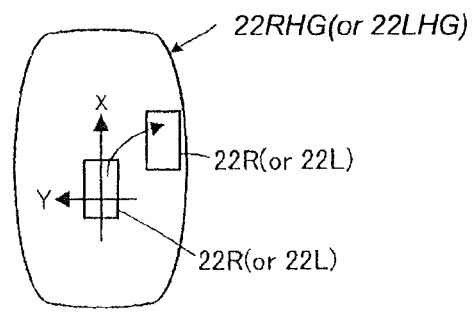

CONTROL DEVICE AND GAIT GENERATING DEVICE FOR BIPEDAL MOBILE ROBOT

BACKGROUND OF THE INVENTION

1. Field of the Invention

The present invention relates to a control device and a gait generating device for a bipedal mobile robot.

2. Description of the Related Art

For a bipedal mobile robot, such as a humanoid robot, which has two legs connected to the body thereof through the intermediary of joints, a technique for causing a robot to travel by carrying out a series of motions of each leg leaving from a floor and then landing on the floor (hereinafter referred to simply as "the motion of leaving from/landing on a floor" in some cases), alternating between two legs, (i.e., by performing a walking motion or a running motion of the robot) has conventionally been proposed by the applicant of the present application, as disclosed in, for example, Japanese Patent No. 3674788.

Although the aforesaid motion of leaving from/landing on a floor performed by alternating between the two legs is a typical type of the motions of the two legs required in a bipedal mobile robot, the type of motions is not limited thereto. For example, there is a case where a bipedal mobile robot preferably performs a single or a plurality of motions of only one leg leaving from/landing on a floor while the other leg of the two legs is off the floor in order to prevent the posture of the robot from being disturbed when, for example, a lateral external force acts on the robot due to contact or the like between the robot and an object (hereinafter referred to "the one-leg hopping motion in some cases). It is also possible that the robot carries out the one-leg hopping motion as necessary in response to, for example, a request by an operator of the robot.

Meanwhile, a bipedal mobile robot usually has a laterally symmetrical construction. Hence, when the robot performs the aforesaid motion of leaving from/landing on a floor motion, alternating between its two legs (when the robot carries out a walking motion or a running motion), the body (base body) of the robot as observed in a lateral plane (frontal plane) is normally maintained at a posture when the robot stands straight or a posture close thereto (a posture in which the body trunk of the body as observed in the lateral plane is substantially vertical).

However, the study conducted by the inventors of the present application has revealed that, when the robot performs the aforesaid one-leg hopping motion, an attempt to maintain the body of the robot at the same posture as that in a walking motion or a running motion leads to an inconvenience described below.

In the case where a bipedal mobile robot is operated to carry out the aforesaid one-legged hopping motion, the total center-of-gravity point of the robot is preferably positioned substantially right above the ground contact surface of the one leg in a state wherein the one leg carrying out the motion of leaving from/landing on a floor has landed on a floor after leaving from the floor.

In this case, if the body trunk axis of the body of the robot as observed in the lateral plane is oriented substantially in the vertical direction (if the posture of the body is the aforesaid upright posture or close thereto), then the position of the proximal end portion (the portion connected to the body) of the one leg on the floor would be dislocated in a lateral direction from the position right above the aforesaid ground contact surface of the one leg. This is because, in the bipedal mobile robot having the laterally symmetrical construction, the total center-of-gravity point of the robot in the state wherein the body trunk axis of the robot body is oriented substantially in the vertical direction lies in the vicinity of the middle between the proximal end portions of the two legs in the transverse direction (the lateral direction) of the robot.

Therefore, especially in the period immediately after the one leg lands on the floor after leaving from the floor, a relatively large moment acts about an axis in the longitudinal direction (about a roll axis) of the robot on the joint of the proximal end portion of the one leg due to the gravitational force acting on the robot and the inertial force in the vertical direction (i.e., due to a floor reaction force that balances out the resultant force of the gravitational force and the inertial force).

This inconveniently results in an increased size or weight of the joint of the proximal end portion of the one leg or an actuator driving the joint.

SUMMARY OF THE INVENTION

The present invention has been made with the view of the background described above and it is an object of the invention to provide a control device and a gait generating device for a bipedal mobile robot which is capable of preventing a large moment from acting on a proximal end joint of a leg carrying out a motion of leaving from/landing on a floor when a bipedal mobile robot is operated to carry out a one-leg hopping motion.

Another object of the present invention is to provide a control device for a bipedal mobile robot which is capable of properly changing from one motion of each leg leaving from/landing on a floor, alternating between two legs, as in a walking motion or a running motion, to another motion of one-leg hopping.

A control device for a bipedal mobile robot in accordance with the present invention is a control device for a bipedal mobile robot which has two legs with the proximal end portions thereof connected to a body through the intermediary of joints and which is capable of accomplishing motions, including a one-leg hopping motion in which only one leg of the two legs leaves from a floor and then lands on the floor while the other leg is off the floor, the control device including: a desired gait generating unit which generates a desired gait including at least a desired motion of the robot such that the proximal end portion of the other leg (hereinafter referred to as a free leg in some cases) is positioned at a relatively higher level than the proximal end portion of the one leg (hereinafter referred to as a supporting leg in some cases) in a state wherein the one leg has landed on the floor after leaving from the floor in the case where the robot performs the one-leg hopping motion; and a joint control unit which controls the operation of each joint of the robot on the basis of the generated desired gait (a first aspect).

According to the first aspect, the desired gait generating unit generates a desired gait which includes at least a desired motion of the robot such that the proximal end portion of the free leg is at a relatively higher position than the proximal end portion of the supporting leg in the state wherein the supporting leg, which carries out the motion of leaving from the floor and the motion of landing on the floor, has landed on the floor after leaving from the floor when the robot performs the one-leg hopping motion.

Here, the posture of the body of the robot in a state wherein there is no difference between the height of the proximal end portion of the supporting leg and the height of the proximal end portion of the free leg corresponds to the posture of the body in the state wherein the robot is standing in an upright posture.

Hence, the posture of the body in the aforesaid desired gait generated by the desired gait generating unit in the state wherein the supporting leg has landed on the floor after leaving from the floor can be set at a posture in which an upper portion of the body is tilted closer to a position right above the proximal end portion of the supporting leg than at the aforesaid upright posture of the body.

When the body is set at the posture tilted as described above, the distance in the horizontal direction between the total center-of-gravity point of the robot and the proximal end portion of the supporting leg will be shorter than in the case where the body is in a posture corresponding to the aforesaid upright posture.

Further, in the first aspect of the invention, the operation of each joint of the robot is controlled according to the desired gait generated as described above.

This arrangement restrains a large moment from acting on the joint of a proximal end portion of the supporting leg due to the resultant force of a gravitational force acting on the robot and the inertial force in the vertical direction or due to a floor reaction force balancing out the resultant force in the state wherein the supporting leg has landed on the floor after leaving from the floor in the one-leg hopping motion of the robot.

Thus, the first aspect of the invention makes it possible to prevent a large moment from acting on the joint of the proximal end portion of the leg which leaves from a floor and lands on the floor when the bipedal mobile robot performs the one-leg hopping motion.

Further, the control device for a bipedal mobile robot according to the present invention is a control device for a bipedal mobile robot which has two legs with the proximal end portions thereof connected to a body through the intermediary of joints and which is capable of accomplishing motions, including a one-leg hopping motion in which only one of the two legs leaves from a floor and then lands on the floor while the other leg is off the floor, the control device including: a desired gait generating unit which generates a desired gait including at least a desired motion of the robot such that the horizontal distance between the total center-of-gravity point of the robot and the proximal end portion of the one leg in a state wherein the one leg has landed on a floor after leaving from the floor is shorter than the horizontal distance therebetween in a state wherein the robot is standing in an upright posture when the robot performs the one-leg hopping motion; and a joint control unit which controls the operation of each joint of the robot according to the generated desired gait (a second aspect).

According to the second aspect of the invention, the desired gait generating unit generates a desired gait including at least a desired motion of the robot such that the horizontal distance between the total center-of-gravity point of the robot and the proximal end portion of the one leg in a state wherein the one leg (a supporting leg) has landed on a floor after leaving from the floor is shorter than the horizontal distance therebetween in a state wherein the robot is standing in an upright posture when the robot performs the one-leg hopping motion.

Hence, as with the first aspect of the invention, in the desired gait generated in the state wherein the supporting leg has landed on the floor after leaving from the floor, the horizontal distance between the total center-of-gravity point of the robot and the proximal end portion of the supporting leg is shorter than that in the case where the posture of the body corresponds to the aforesaid upright posture.

Further, according to the second aspect of the invention, the operation of each joint of the robot is controlled according to the desired gait generated as described above.

This arrangement restrains a large moment from acting on the joint of a proximal end portion of the supporting leg due to the resultant force of a gravitational force acting on the robot and the inertial force in the vertical direction or due to a floor reaction force balancing out the resultant force in the state wherein the supporting leg has landed on the floor after leaving from the floor in the one-leg hopping motion.

Thus, the second aspect of the invention makes it possible to prevent a large moment from acting on the joint of the proximal end portion of the leg which leaves from a floor and lands on the floor when the bipedal mobile robot performs the one-leg hopping motion.

In the first aspect of the invention, the desired motion generated by the desired gait generating unit in the state wherein the one leg has landed on the floor after leaving from the floor is preferably a desired motion that causes the total center-of-gravity point of the robot and the proximal end portion of the one leg to be vertically arranged at right above the ground contact surface of the one leg (a third aspect of the invention). The same applies to the aforesaid second aspect of the invention (a fourth aspect of the invention).

The third or the fourth aspect of the invention makes it possible to control the moment acting on the proximal end portion to substantially zero, thus permitting a reduced load on an actuator (e.g., a motor) that drives the joint of the proximal end portion.

Further, in the third aspect of the invention, in the case where the parallel direction of the two legs in the state wherein the robot is standing in the upright posture is defined as the lateral direction of the robot, the posture of the body in the desired motion generated by the desired gait generating unit in the state wherein the one leg has landed on the floor after leaving from the floor is preferably a posture obtained by tilting the body toward the one leg from the body posture in the upright posture between the right side and the left side of the robot (a fifth aspect of the invention). The same applies to the fourth aspect of the invention (a sixth aspect of the invention).

The fifth aspect or the sixth aspect of the invention makes it possible to easily attain a desired motion that makes it possible to set the horizontal distance between the total center-of-gravity point of the robot and the proximal end portion of the supporting leg in the state wherein the supporting leg has landed on the floor after leaving from the floor to be shorter than that in the case where the posture of the body is the posture corresponding to the upright posture.

Further, a gait generating device for a bipedal mobile robot in accordance with the present invention is a gait generating device for a bipedal mobile robot which has two legs with the proximal end portions thereof connected to a body through the intermediary of joints and which is capable of accomplishing motions, including a one-leg hopping motion in which only one of the two legs leaves from a floor and then lands on the floor while the other leg is off the floor, the gait generating device including: a desired motion generating unit which generates a desired motion of the robot such that the proximal end portion of the other leg is at a relatively higher position than the proximal end portion of the one leg in the state wherein the one leg has landed on a floor after leaving from the floor in the case where a desired gait including at least a desired motion of the robot for causing the robot to perform the one-leg hopping motion is generated (a seventh aspect of the invention).

According to the seventh aspect of the invention, when generating the desired gait including at least the desired motion of the robot for causing the robot to carry out the one-leg hopping motion, the desired motion generating unit generates the desired motion of the robot such that the proximal end portion of the other leg (the free leg) is at a relatively higher position than the proximal end portion of the one leg (the supporting leg) in the state wherein the one leg has landed on a floor after leaving from the floor.

Hence, in the desired motion generated in the state wherein the supporting leg has landed on the floor after leaving from the floor, the horizontal distance between the total center-of-gravity point of the robot and the proximal end portion of the supporting leg is shorter than that in the case where the posture of the body is the posture corresponding to the aforesaid upright posture, as with the first aspect of the invention.

This arrangement generates a desired motion that makes it possible to restrain a large moment from acting on the joint of a proximal end portion of the supporting leg due to the resultant force of a gravitational force acting on the robot and the inertial force in the vertical direction or due to a floor reaction force balancing out the resultant force in the state wherein the supporting leg has landed on the floor after leaving from the floor in the one-leg hopping motion.

Thus, according to the seventh aspect of the invention, a desired motion can be generated, which makes it possible to prevent a large moment from acting on the joint of the proximal end portion of the leg which leaves from a floor and lands on the floor when the bipedal mobile robot performs the one-leg hopping motion.

Further, a gait generating device for a bipedal mobile robot in accordance with the present invention is a gait generating device for a bipedal mobile robot which has two legs with the proximal end portions thereof connected to a body through the intermediary of joints and which is capable of accomplishing motions, including a one-leg hopping motion in which only one of the two legs leaves from a floor and then lands on the floor while the other leg is off the floor, the gait generating device including: a desired motion generating unit which generates a desired motion of the robot such that the horizontal distance between the total center-of-gravity point of the robot and the proximal end portion of the one leg in the state wherein the one leg has landed on a floor after leaving from the floor is shorter than the horizontal distance in the state wherein the robot is standing in the upright posture in the case where a desired gait including at least a desired motion of the robot for causing the robot to perform the one-leg hopping motion is generated (an eighth aspect of the invention).

According to the eighth aspect of the invention, when generating a desired gait including at least a desired motion of the robot for causing the robot to perform the one-leg hopping motion, the desired motion generating unit generates a desired motion of the robot such that the horizontal distance between the total center-of-gravity point of the robot and the proximal end portion of the one leg in a state wherein the one leg (the supporting leg) has landed on a floor after leaving from the floor is shorter than the horizontal distance therebetween in the state wherein the robot is standing in an upright posture.

Hence, as with the first aspect of the invention, in the desired motion generated in the state wherein the supporting leg has landed on the floor after leaving from the floor, the horizontal distance between the total center-of-gravity point of the robot and the proximal end portion of the supporting leg is shorter than that in the case where the posture of the body corresponds to the aforesaid upright posture.

This arrangement generates a desired motion that makes it possible to restrain a large moment from acting on the joint of a proximal end portion of the supporting leg due to the resultant force of a gravitational force acting on the robot and the inertial force in the vertical direction or due to a floor reaction force balancing out the resultant force in the state wherein the supporting leg has landed on the floor after leaving from the floor in the one-leg hopping motion.

Thus, the eighth aspect of the invention makes it possible to generate a desired motion that makes it possible to prevent a large moment from acting on the joint of the proximal joint of the leg which leaves from a floor and lands on the floor when the bipedal mobile robot performs the one-leg hopping motion.

In the seventh aspect of the invention, the desired motion generated by the desired motion generating unit when the robot performs the one-leg hopping motion is preferably a desired motion that causes the total center-of-gravity point of the robot and the proximal end portion of the one leg to be vertically arranged at right above the ground contact surface of the one leg (a ninth aspect of the invention). The same applies to the aforesaid eighth aspect of the invention (a tenth aspect of the invention).

The ninth or the tenth aspect of the invention makes it possible to control the moment acting on the proximal end portion to substantially zero, thus permitting a reduced load on an actuator (e.g., a motor) that drives the joint of the proximal end portion, as with the third or the fourth aspect of the invention.

Further, in the ninth aspect of the invention, in the case where the parallel direction of the two legs in the state wherein the robot is standing in the upright posture is defined as the lateral direction of the robot, the posture of the body in the desired motion generated by the desired motion generating unit in the state wherein the one leg has landed on the floor after leaving from the floor is preferably a posture obtained by tilting the body toward the one leg from the body posture in the upright posture between the right side and the left side of the robot (an eleventh aspect of the invention). The same applies to the fourth aspect of the invention (a twelfth aspect of the invention).

The eleventh aspect or the twelfth aspect of the invention makes it possible to easily attain a desired motion that makes it possible to set the horizontal distance between the total center-of-gravity point of the robot and the proximal end portion of the supporting leg in the state wherein the supporting leg has landed on the floor after leaving from the floor to be shorter than that in the case where the posture of the body is the posture corresponding to the upright posture.

Meanwhile, a bipedal mobile robot normally uses, as a basic motion for traveling, the motion in which each leg leaves from a floor and landing the floor, alternating between the two legs thereof, as in a walking motion or a running motion. However, there is a case where, while the robot is traveling by carrying out the walking motion or the running motion, the actual posture of the robot is disturbed due to, for example, an unexpected external force applied to the robot, causing the robot to lose its original proper posture (the posture that enables the robot to carry out a continuous motion).

In such a situation, there are cases where it becomes difficult to restore the actual posture of the robot to the proper posture so as to achieve the continuous motion of the robot in the walking motion or the running motion, in which each leg leaves from and lands on a floor, alternating between the two legs, mainly due to a limited mechanical movable range of the legs.

A case where, for example, the body of the robot is subjected to a lateral external force rightward will be assumed. In this case, during a period in which the left leg acts as a free leg, it is usually difficult to give the left leg a large step toward the right because the movable range of the left leg is limited in order to prevent the left leg from interfering with the right leg. This makes it difficult to generate a desired gait that causes a floor reaction force moment for setting the posture of the body leaning toward the right due to the aforesaid external force back to the left to act on the robot, frequently resulting in a difficulty of resolving the disturbed posture of the robot. The same applies to the case where, for example, the body of the robot is subjected to a lateral external force leftward.

In such a situation, causing the robot to perform the one-leg hopping motion is likely to frequently resolve the disturbed posture of the robot so as to enable to robot to resume a continuous motion. In this case, it is necessary to properly accomplish a shift between the motion in which each leg leaves from and lands on a floor, alternating between the two legs, as in the walking motion or the running motion, and the one-leg hopping motion.

Therefore, the control device for a bipedal mobile robot in accordance with the present invention further adopts the construction described below.

In the first aspect of the invention, preferably, the robot has, as the operation modes thereof, a one-leg hopping operation mode, which is a mode for carrying out the one-leg hopping motion, and an operation mode of both leg alternately leaving from/landing on a floor for the robot to travel by carrying out the leaving from/landing on a floor motion, which consists of the motion of each leg leaving from a floor and then landing on the floor, alternating between two legs, the control device further comprising:

a first determining unit which sequentially determines whether it is possible to generate the desired gait that satisfies a predetermined first condition required to continue the motion of the robot in the operation mode of both legs alternately leaving from/landing on a floor while the robot is moving in the operation mode of both legs alternately leaving from/landing on a floor;

a second determining unit which sequentially determines whether it is possible to generate the desired gait that satisfies a predetermined second condition required to continue the motion of the robot by changing the future operation mode of the robot from the operation mode of both legs alternately leaving from/landing on a floor to the one-leg hopping operation mode in the case where the determination result given by the first determining unit is negative; and an operation mode determining unit which maintains the operation mode of the robot to the operation mode of both legs alternately leaving from/landing on a floor in the case where the determination result given by the first determining unit is affirmative, or determines the operation mode of the robot on the basis of the determination results given by the first determining unit and the second determining unit so as to change the future operation mode of the robot from the operation mode of both legs alternately leaving from/landing on a floor to the one-leg hopping operation mode in the case where the determination result given by the first determining unit is negative while the determination result given by the second determining unit is affirmative, wherein the desired gait generating unit generates the desired gait such that the robot performs a motion in the determined operation mode (a thirteenth aspect of the invention). The same applies to the aforesaid second aspect of the invention (a twenty-first aspect of the invention).

According to the thirteenth aspect of the invention or the twenty-first aspect of the invention, the determination processing by the first determining unit is sequentially carried out while the robot is moving in the operation mode of both legs alternately leaving from/landing on a floor. If the determination result given by the first determining unit is negative, then it means that it has been determined that a proper desired gait for the robot to continue its motion in the operation mode of both legs alternately leaving from/landing on a floor (a desired gait that satisfies the aforesaid first condition) cannot be generated, making it difficult to continue the motion of the robot in the operation mode of both legs alternately leaving from/landing on a floor.

In this case, the determination processing by the second determining unit is carried out to sequentially determine whether it is possible to generate the desired gait that satisfies the predetermined second condition required for continuing the motion of the robot by changing the future operation mode of the robot from the operation mode of both legs alternately leaving from/landing on a floor to the one-leg hopping operation mode.

Here, the motion of the robot in the one-leg hopping operation mode (the one-leg hopping operation) is a motion in which only one of the two legs leaves from a floor and then lands on the floor while the other leg is off the floor, so that the one leg and the other leg do not interfere with each other. Hence, in the one-leg hopping operation mode, the degree of freedom of travel of the robot particularly in the lateral direction (in the parallel direction of the two legs) is higher than that in the motion of the robot in the operation mode of both legs alternately leaving from/landing on a floor.

Thus, even if it is difficult to continue the motion of the robot in the operation mode of both legs alternately leaving from/landing on a floor, there are cases where a proper desired gait for continuing the motion of the robot (a desired gait that satisfies the second condition) can be generated by changing the operation mode to the one-leg hopping operation mode. In this case, the determination result given by the second determining unit turns to be affirmative.

Hence, according to the thirteenth aspect of the invention or the twenty-first aspect of the invention, the operation mode determining unit maintains the operation mode of the robot to the operation mode of both legs alternately leaving from/landing on a floor in the case where the determination result given by the first determining unit is affirmative, while operation mode determining unit changes the future operation mode of the robot from the operation mode of both legs alternately leaving from/landing on a floor to the one-leg hopping operation mode in the case where the determination result given by the first determining unit is negative while the determination result given by the second determining unit is affirmative.

Then, the desired gait generating unit generates the desired gait that causes the robot to carry out a motion in the aforesaid determined operation mode. In other words, if the determined operation mode is the operation mode of both legs alternately leaving from/landing on a floor, then the desired gait generating unit generates a desired gait that causes the robot to perform a motion in the operation mode of both legs alternately leaving from/landing on a floor. If the determined operation mode is the one-leg hopping operation mode, then the desired gait generating unit generates a desired gait that causes the robot to carry out a motion in the one-leg hopping operation mode. Then, the operation of each joint of the robot is controlled according to the desired gait. This means that the operation of each joint of the robot is controlled such that the actual gait of the robot follows the desired gait.

Thus, according to the thirteenth or the twenty-first aspect of the invention, the motion of the robot can be implemented in the one-leg hopping operation mode in the case where it is difficult to continue the motion of the robot in the operation mode of both legs alternately leaving from/landing on a floor. Hence, the thirteenth or the twenty-first aspect of the invention makes it possible to enable the robot to implement a continuous motion in a type of motion in the one-leg hopping operation mode (the one-leg hopping motion), which is different from the walking motion or the running motion, in the situation wherein it is difficult to accomplish the continuous motion of the robot by the motion of each leg leaving from/landing on a floor, alternating between the two legs, as in the walking motion or the running motion.

In the thirteenth or the twenty-first aspect of the invention, it is possible to continue the motion of the robot in the one-leg hopping operation mode after the operation mode is switched to the one-leg hopping operation mode. However, the motion of a bipedal mobile robot in the operation mode of both legs alternately leaving from/landing on a floor generally allows the stability of the posture of the robot to be secured more easily and tends to reduce the load on the joints or the like of the legs of the robot, as compared with the motion thereof in the one-leg hopping operation mode.

Therefore, the thirteenth aspect of the invention further includes a third determining unit which sequentially determines whether it is possible to generate the desired gait that satisfies a predetermined third condition required to continue the motion of the robot by changing the future operation mode of the robot from the one-leg hopping operation mode to the operation mode of both legs alternately leaving from/landing on a floor during the motion of the robot in the one-leg hopping operation mode; and a fourth determining unit which sequentially determines whether it is possible to generate the desired gait that satisfies a predetermined fourth condition required to continue the motion of the robot in the one-leg hopping operation mode in the case where the determination result given by the third determining unit is negative, wherein the operation mode determining unit preferably includes a unit which determines the operation mode of the robot according to the determination results given by the third determining unit and the fourth determining unit such that the future operation mode of the robot is changed from the one-leg hopping operation mode to the operation mode of both legs alternately leaving from/landing on a floor in the case where the determination result given by the third determining unit is affirmative, or the future operation mode of the robot is maintained to the one-leg hopping operation mode in the case where the determination result given by the third determining unit is negative and the determination result given by the fourth determining unit is affirmative (a fourteenth aspect of the invention). The same applies to the aforesaid twenty-first aspect of the invention (a twenty-second aspect of the invention).

According to the fourteenth or the twenty-second aspect of the invention, the determination processing by the third determining unit is carried out while the robot is moving in the one-leg hopping operation mode. If the determination result given by the third determining unit is affirmative, that is, if it is determined that a proper desired gait for continuing the motion of the robot (a desired gait that satisfies the third condition) by changing the future operation mode of the robot from the one-leg hopping operation mode to the operation mode of both legs alternately leaving from/landing on a floor, then the operation mode determining unit sets the operation mode from the one-leg hopping operation mode back to the operation mode of both legs alternately leaving from/landing on a floor.

Thus, according to the fourteenth or the twenty-second aspect of the invention, if the situation wherein the proper desired gait that enables the robot to continue its motion in the operation mode of both legs alternately leaving from/landing on a floor can be generated takes place after changing the operation mode from the operation mode of both legs alternately leaving from/landing on a floor to the one-leg hopping operation mode, then the operation mode of the robot can be reset to the operation mode of both legs alternately leaving from/landing on a floor.

According to the fourteenth or the twenty-second aspect of the invention, if the determination result given by the third determining unit is negative, then the determination processing by the fourth determining unit is carried out to sequentially determine whether it is possible to generate a proper desired gait for continuing the motion of the robot (the desired gait that satisfies the third condition) in the one-leg hopping operation mode. Further, if the determination result given by the fourth determining unit is affirmative, then the operation mode determining unit maintains the operation mode to the one-leg hopping operation mode. Thus, if the situation wherein it is difficult to continue the motion of the robot in the operation mode of both legs alternately leaving from/landing on a floor lasts, then the motion of the robot in the one-leg hopping operation mode can be continued to a maximum extent.

In the thirteenth or the fourteenth aspect of the invention described above, in the case where the determination result given by the first determining unit is negative while the determination result given by the second determining unit is affirmative, the operation mode determining unit changes the operation mode of the robot from the operation mode of both legs alternately leaving from/landing on a floor to the one-leg hopping operation mode after the leg to be landed anew in the operation mode of both legs alternately leaving from/landing on a floor after current time lands on the floor (a fifteenth aspect of the invention). The same applies to the twenty-first or the twenty-second aspect of the invention (a twenty-third aspect of the invention).

Further, in the fourteenth aspect of the invention, in the case where the determination result given by the third determining unit is affirmative, the operation mode determining unit preferably changes the operation mode of the robot from the one-leg hopping operation mode to the operation mode of both legs alternately leaving from/landing on a floor after the one leg to be landed anew in the one-leg hopping operation mode after the current time lands on the floor (a sixteenth aspect of the invention). The same applies to the twenty-second aspect of the invention (a twenty-fourth aspect of the invention).

According to the fifteenth aspect of the invention, the sixteenth aspect of the invention, the twenty-third aspect of the invention, and the twenty-fourth aspect of the invention, the operation mode of the robot can be changed without causing a sudden change in the motion of the robot.

In the thirteenth to the sixteenth aspects of the invention or the twenty-first to the twenty-fourth aspects of the invention described above, the first condition, the second condition, the third condition, and the fourth condition may adopt a variety of conditions, depending on, for example, the method of generating the desired gait. Typically, however, the following conditions, for example, are ideally adopted.

For example, in the aforesaid fifteenth aspect of the invention, preferably, the first condition includes at least a first A condition that a desired landing position in the desired gait of a leg to be landed on a floor anew after the current time in the operation mode of both legs alternately leaving from/landing on a floor lies in a predetermined permissible landing region associated with the operation mode of both legs alternately leaving from/landing on a floor in the case where it is assumed that the desired gait is generated by the desired gait generating unit provided that the operation mode is maintained to the operation mode of both legs alternately leaving from/landing on a floor, a first B condition that the motion trajectory of the robot defined by the desired gait becomes a motion trajectory that can be converged in the future to a motion trajectory of a virtual cyclic gait repeating the same pattern of motion in the operation mode of both legs alternately leaving from/landing on a floor, and a first C condition that the desired position of a ZMP defined by the desired gait lies in a predetermined ZMP existence permissible region set according to the motion trajectories of the two legs defined by the desired gait, and the second condition includes at least a second A condition that a desired landing position in the desired gait of a leg to be landed on a floor anew in the operation mode of both legs alternately leaving from/landing on a floor lies in a predetermined permissible landing region associated with the operation mode of both legs alternately leaving from/landing on a floor in the case where it is assumed that the desired gait is generated by the desired gait generating unit provided that the operation mode is changed from the operation mode of both legs alternately leaving from/landing on a floor to the one-leg hopping operation mode after the leg to be landed anew after the current time in the operation mode of both legs alternately leaving from/landing on a floor lands on a floor, a second B condition that the motion trajectory of the robot defined by the desired gait becomes a motion trajectory that can be converged in the future to a motion trajectory of a virtual cyclic gait repeating the same pattern of motion in the one-leg hopping operation mode, and a second C condition that the desired position of a ZMP defined by the desired gait lies in a predetermined ZMP existence permissible region set according to the motion trajectory of the one leg defined by the desired gait (a seventeenth aspect of the invention). The same applies to the twenty-third aspect of the invention (a twenty-fifth aspect of the invention).

According to the seventeenth or the twenty-fifth aspect of the invention, a kinetic restrictive requirement related to the motion of a leg, a requirement for securing the continuity of the motion of the robot, and a dynamic restrictive requirement of the robot in the case where it is assumed that the desired gait is generated by the desired gait generating unit provided that the operation mode is maintained to the operation mode of both legs alternately leaving from/landing on a floor can be reflected on the first A condition, the first B condition, and the first C condition, respectively. This enables the first determining unit to determine with high reliability whether it is possible to generate a desired gait that is appropriate for continuing the motion of the robot in the operation mode of both legs alternately leaving from/landing on a floor.

Similarly, a kinetic restrictive requirement related to the motion of a leg, a requirement for securing the continuity of the motion of the robot, and a dynamic restrictive requirement of the robot in the case where it is assumed that the desired gait is generated by the desired gait generating unit provided that the operation mode is changed from the operation mode of both legs alternately leaving from/landing on a floor to the one-leg hopping operation mode after the leg to be landed anew after the current time in the operation mode of both legs alternately leaving from/landing on a floor lands on a floor can be reflected on the second A condition, the second B condition, and the second C condition, respectively. This enables the second determining unit to determine with high reliability whether it is possible to generate a desired gait that is appropriate for continuing the motion of the robot by changing the future operation mode of the robot from the operation mode of both legs alternately leaving from/landing on a floor to the one-leg hopping operation mode.

Further, for example, in the aforesaid sixteenth aspect of the invention, preferably, the third condition includes at least a third A condition that a desired landing position in the desired gait of the one leg to be landed on a floor anew in the one-leg hopping operation mode lies in a predetermined permissible landing region associated with the one-leg hopping operation mode in the case where it is assumed that the desired gait is generated by the desired gait generating unit provided that the operation mode is changed from the one-leg hopping operation mode to the operation mode of both legs alternately leaving from/landing on a floor after the one leg to be landed on the floor anew after the current time in the one-leg hopping operation mode, a third B condition that the motion trajectory of the robot defined by the desired gait becomes a motion trajectory that can be converged in the future to a motion trajectory of a virtual cyclic gait repeating the same pattern of motion in the operation mode of both legs alternately leaving from/landing on a floor, and a third C condition that the desired position of a ZMP defined by the desired gait lies in a predetermined ZMP existence permissible region set according to the motion trajectories of the two legs defined by the desired gait, and the fourth condition includes at least a fourth A condition that a desired landing position in the desired gait of the one leg to be landed on a floor anew after the current time in the one-leg hopping operation mode lies in the predetermined permissible landing region associated with the one-leg hopping operation mode in the case where it is assumed that the desired gait is generated by the desired gait generating unit provided that the operation mode is maintained to the one-leg hopping operation mode, a fourth B condition that the motion trajectory of the robot defined by the desired gait becomes a motion trajectory that can be converged in the future to a motion trajectory of a virtual cyclic gait repeating the same pattern of motion in the one-leg hopping operation mode, and a fourth C condition that the desired position of a ZMP defined by the desired gait lies in a predetermined ZMP existence permissible region set according to the motion trajectory of the one leg defined by the desired gait (an eighteenth aspect of the invention). The same applies to the twenty-fourth aspect of the invention (a twenty-sixth aspect of the invention).

According to the eighteenth or the twenty-sixth aspect of the invention, a kinetic restrictive requirement related to the motion of a leg, a requirement for securing the continuity of the motion of the robot, and a dynamic restrictive requirement of the robot in the case where it is assumed that the desired gait is generated by the desired gait generating unit provided that the operation mode is changed from the one-leg hopping operation mode to the operation mode of both legs alternately leaving from/landing on a floor after the one leg to be landed on the floor anew after the current time in the one-leg hopping operation mode can be reflected on the third A condition, the third B condition, and the third C condition, respectively. This enables the third determining unit to determine with high reliability whether it is possible to generate a desired gait that is appropriate for continuing the motion of the robot by changing the future operation mode of the robot from the one-leg hopping operation mode to the operation mode of both legs alternately leaving from/landing on a floor.

Similarly, a kinetic restrictive requirement related to the motion of a leg, a requirement for securing the continuity of the motion of the robot, and a dynamic restrictive requirement of the robot in the case where it is assumed that the desired gait is generated by the desired gait generating unit provided that the operation mode is maintained to the one-leg hopping operation mode can be reflected on the fourth A condition, the fourth B condition, and the fourth C condition, respectively. This enables the fourth determining unit to determine with high reliability whether it is possible to generate a desired gait that is appropriate for continuing the motion of the robot in the one-leg hopping operation mode.

Further, in the thirteenth to the eighteenth aspects of the invention described above, the desired gait generating unit preferably has a unit which generates a desired motion of the robot such that the total center-of-gravity point of the robot descends in the case where the determination result given by the first determining unit and the determination result given by the second determining unit are both negative (a nineteenth aspect of the invention). The same applies to the twenty-first to the twenty-sixth aspects of the invention (a twenty-seventh aspect of the invention).

Further, in the fourteenth aspect of the invention, the sixteenth aspect of the invention, or the eighteenth aspect of the invention, the desired gait generating unit preferably has a unit which generates a desired motion of the robot such that the total center-of-gravity point of the robot descends in the case where the determination result given by the third determining unit and the determination result given by the fourth determining unit are both negative (a twentieth aspect of the invention). The same applies to the twenty-second aspect of the invention, the twenty-fourth aspect of the invention, or the twenty-sixth aspect of the invention (a twenty-eighth aspect of the invention).

Thus, in both operation modes, namely, the operation mode of both legs alternately leaving from/landing on a floor and the one-leg hopping operation mode, an impact to the robot can be reduced when the robot falls in a situation wherein it is difficult for the robot to avoid having its posture disturbed.

BRIEF DESCRIPTION OF THE DRAWINGS

FIGS. 13(a) and 13(b) are diagrams illustrating the geometrically permissible landing regions in an operation mode of both legs alternately leaving from/landing on a floor in the case where a supporting leg is the right leg and in the case where the supporting leg is the left leg, respectively;

FIG. 14 is a diagram illustrating the geometrically permissible landing region in the one-leg hopping gait;

DESCRIPTION OF THE PREFERRED EMBODIMENTS

The following will describe an embodiment of the present invention.

Figure 1:
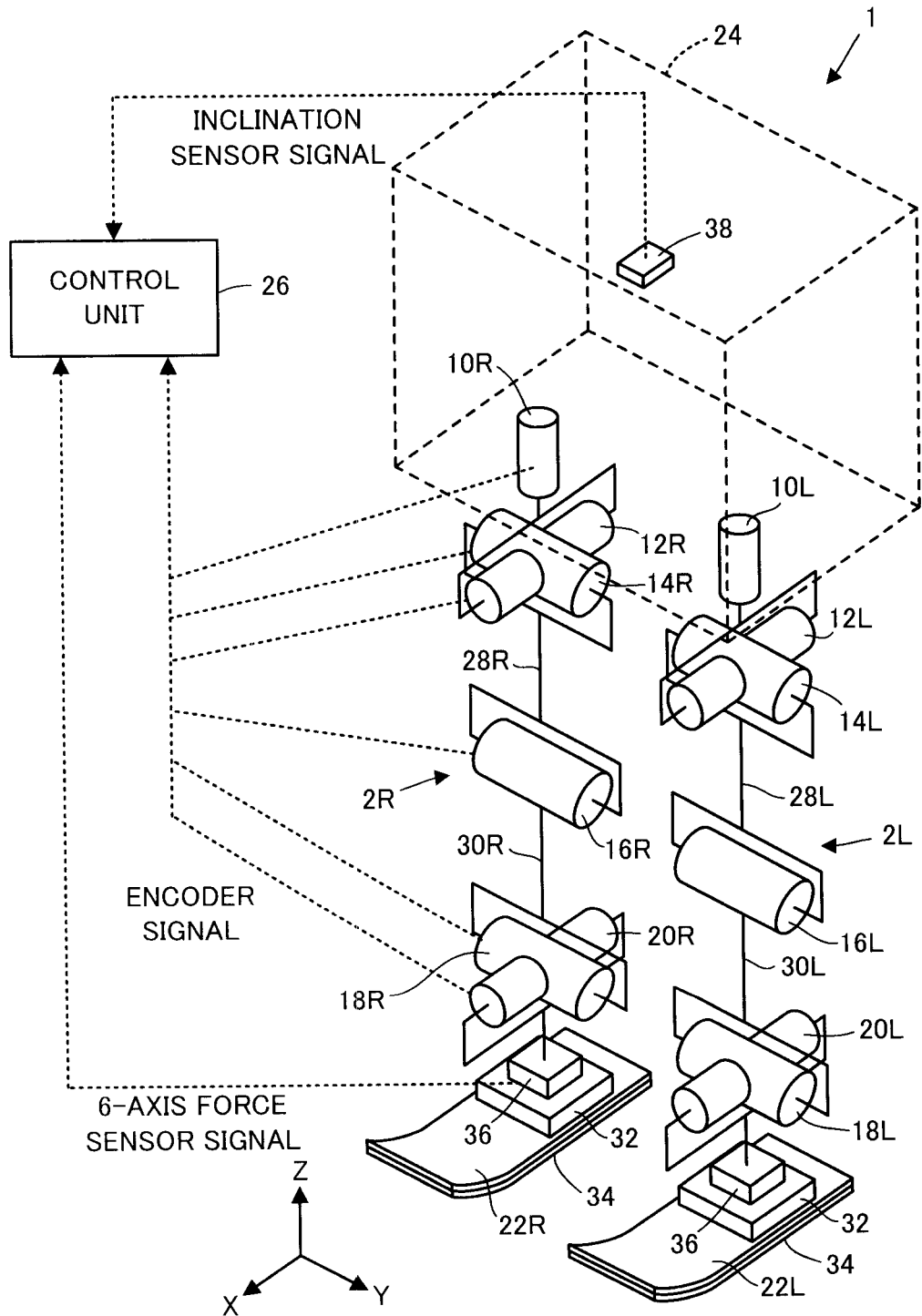
FIG. 1 is a schematic diagram illustrating the general construction of a bipedal mobile robot in an embodiment of the present invention.

As illustrated in FIG. 1, a bipedal mobile robot 1 (hereinafter referred to simply as the robot 1) according to the present embodiment is a bilaterally symmetrical robot having a body 24 as a base body and a pair of right and left legs (leg links) 2R and 2L extended from the body 24. In the description of the present embodiment, reference characters R and L will be used to indicate the right leg and the left leg, respectively.

The body 24 is connected to the proximal end portions (upper end portions) of the two legs 2R and 2L through the intermediary of a waist joint (hip joint), which will be discussed later, and is supported above the floor surface by one or both of the legs 2R and 2L that are in contact with the ground.

The two legs 2R and 2L share the same construction and each thereof has six joints. The six joints are a joint 10R or 10L for turning a waist (hip) (for the rotation in the yaw direction relative to the body 24), a joint 12R or 12L for turning the waist (hip) in a roll direction (about an X-axis), a joint 14R or 14L for rotating the waist (hip) in a pitch direction (about a Y-axis), a joint 16R or 16L for rotating a knee in the pitch direction, a joint 18R or 18L for rotating an ankle in the pitch direction, and a joint 20R or 20L for rotating an ankle in the roll direction, which are arranged in this order from the body 24.

Further, the X-axis, the Y-axis, and a Z-axis mean three coordinate axes of a supporting leg coordinate system, which will be discussed later. The X-axis direction and the Y-axis direction of the supporting leg coordinate system are the directions of two axes that are orthogonal to each other on a horizontal plane, the X-axis direction corresponding to the longitudinal direction (the direction of the roll axis) of the robot 1 and the Y-axis direction corresponding to the lateral direction (the direction of the pitch axis) of the robot 1. The Z-axis direction is the vertical direction (the gravitational direction) and corresponds to the up-and-down direction (the direction of a yaw axis) of the robot 1.

The joints 10R(L), 12R(L) and 14R(L) of each leg 2R(L) constitute a waist joint (hip joint) having 3 degrees of freedom, the joint 16R(L) constitutes a knee joint having 1 degree of freedom, and the joints 18R(L) and 20R(L) constitute an ankle joint having 2 degrees of freedom.

Further, the waist joint (hip joint) formed of 10R(L), 12R (L), and 14R(L) and the knee joint 16R(L) are connected by a thigh link 28R(L), while the knee joint 16R(L) and the ankle joint 18R(L) and 20R(L) are connected by a crus link 30R(L). A foot 22R(L) constituting a distal portion (lower end portion) of each leg 2R(L) is attached under the ankle joints 18R(L) and 20R(L) of each leg 2R(L). Further, the upper end portion (the proximal end portion) of each leg 2R(L) is connected to the body 24 through the intermediary of the waist joints (hip joints) 10R(L), 12R(L), and 14R(L).

Each of the aforesaid joints may have a publicly known structure. In this case, an actuator rotatively driving each joint is constructed of, for example, an electric motor 42 (refer to FIG. 2) provided with a speed reducer.

In the present embodiment, a spring mechanical section 32 incorporating an elastic member, such as a rubber or a spring (not shown), is interposed between the ankle joints 18R(L) and 20R(L) of each leg 2R(L) and the foot 22R(L). Further, the bottom surface of each foot 22R(L) is provided with a sole elastic member 34 made of rubber or the like. These spring mechanical section 32 and the sole elastic member 34 elastically deform in response to a floor reaction force to which each leg 2R(L) is subjected, thus functioning as a buffer mechanism or a compliance mechanism.

The construction of each leg 2R(L) described above provides the foot 22R(L) of the leg 2(L) with 6 degrees of freedom relative to the body 24. When the robot 1 travels, desired motions of the two feet 22R and 22L can be accomplished by driving 6*2=12 joints of the two legs 2R and 2L together ("*" in the present description denotes multiplication for scalar calculation, while it denotes an outer product in vector calculation) to appropriate angles. This arrangement enables the robot 1 to implement motions for traveling in a three-dimensional space, such as a walking motion or a running motion.

Although not shown, in the present embodiment, a pair of right and left arms is attached to both sides of an upper portion of the body 24 and a head is mounted on the upper end of the body 24. Further, each arm is capable of performing motions, such as swinging the arm to the front and the rear relative to the body 24, by a plurality of joints (a shoulder joint, an elbow joint, a wrist joint, and the like) provided therein. However, these arms and the head may be omitted.

The body 24 includes therein a control unit 26 which controls the operation of the robot 1. In FIG. 1, however, the control unit 26 is shown outside the body 24 for the convenience of illustration.

A 6-axis force sensor 36 for measuring a floor reaction force acting on the foot 22R(L) is interposed between the ankle joints 18R(L) and 20R(L) of each leg 2R(L) and the spring mechanical section 32. The 6-axis force sensor 36 detects the translational force components of a floor reaction force in the directions of three axes and the moment components thereof about the three axes, which are transmitted from the foot 22R(L), then outputs the detection signals to the control unit 26.

The body 24 has an inclination sensor 38 for measuring the inclination angles (the inclination angles in the roll direction and the pitch direction) of the body 24 relative to the vertical direction (the gravitational direction) and the changing velocities (angular velocities) thereof. More specifically, the inclination sensor 38 is constructed of an acceleration sensor and a rate sensor (angular velocity sensor), such as a gyro sensor, and outputs the detection signals of these sensors to the control unit 26. Then, the control unit 26 measures the inclination angle and the angular velocity of the body 24 relative to the vertical direction by a publicly known technique on the basis of the outputs of the inclination sensor 38.

Further, the electric motor 42 (refer to FIG. 2), which rotatively drives each joint is provided with an encoder (rotary encoder) 40 (refer to FIG. 2) for detecting the rotational angle of each joint, and a detection signal of the encoder 40 is output to the control unit 26.

Figure 2:
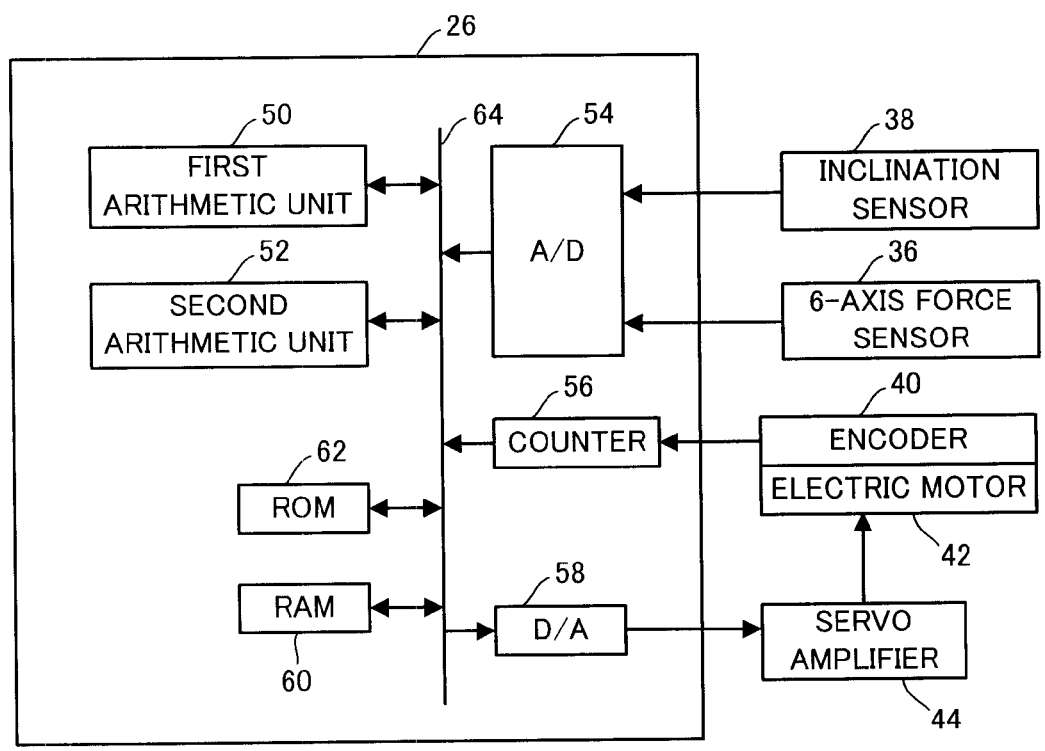
FIG. 2 is a block diagram illustrating the construction of a control unit installed in the robot of FIG. 1.

Referring to FIG. 2, the control unit 26 is constructed of an electronic circuit unit having a microcomputer including a first arithmetic unit 50 and a second arithmetic unit 52 composed of CPUs, an A/D converter 54, a counter 56, a D/A converter 58, a RAM 60, a ROM 62, and a bus line 64 which transfers data among these constituent elements.

In the control unit 26, the outputs of the 6-axis force sensor 36 and the inclination sensor 38 are converted into digital values by the A/D converter 54, and then input to the RAM 60 through the bus line 64. An output of the encoder (rotary encoder) 40 of each joint of the robot 1 is input to the RAM 60 through the counter 56.

The first arithmetic unit 50 generates a desired gait, which will be discussed later, calculates a joint displacement command (the desired value of the rotational angle of each joint), and sends out the calculated joint displacement command to the RAM 60. The second arithmetic unit 52 reads out the joint displacement command from the RAM 60 and an actual joint displacement (the actually measured value of the rotational angle of each joint) measured through the counter 56 from an output of the encoder 40, and calculates a drive command of the electric motor 42 of each joint necessary to cause the actual joint displacement to follow the joint displacement command (a command value that specifies the output torque of the electric motor 42).

Further, the second arithmetic unit 52 outputs the calculated drive command to a servo amplifier 44 for driving the electric motor 42 through the intermediary of the D/A converter 58. At this time, the servo amplifier 44 drives the electric motor 42 (energizes the electric motor 42) on the basis of the input drive command. Thus, the actual joint displacement of each joint is controlled to follow a joint displacement command.

Referring now to the block diagram of FIG. 3, the processing executed by the control unit 26 of the robot 1 in the present embodiment will be explained in more detail. The sections except for the actual robot in FIG. 3 denote the functions implemented by the processing carried out by the control unit 26 (the processing carried out primarily by the first arithmetic unit 50 and the second arithmetic unit 52).

Figure 3:
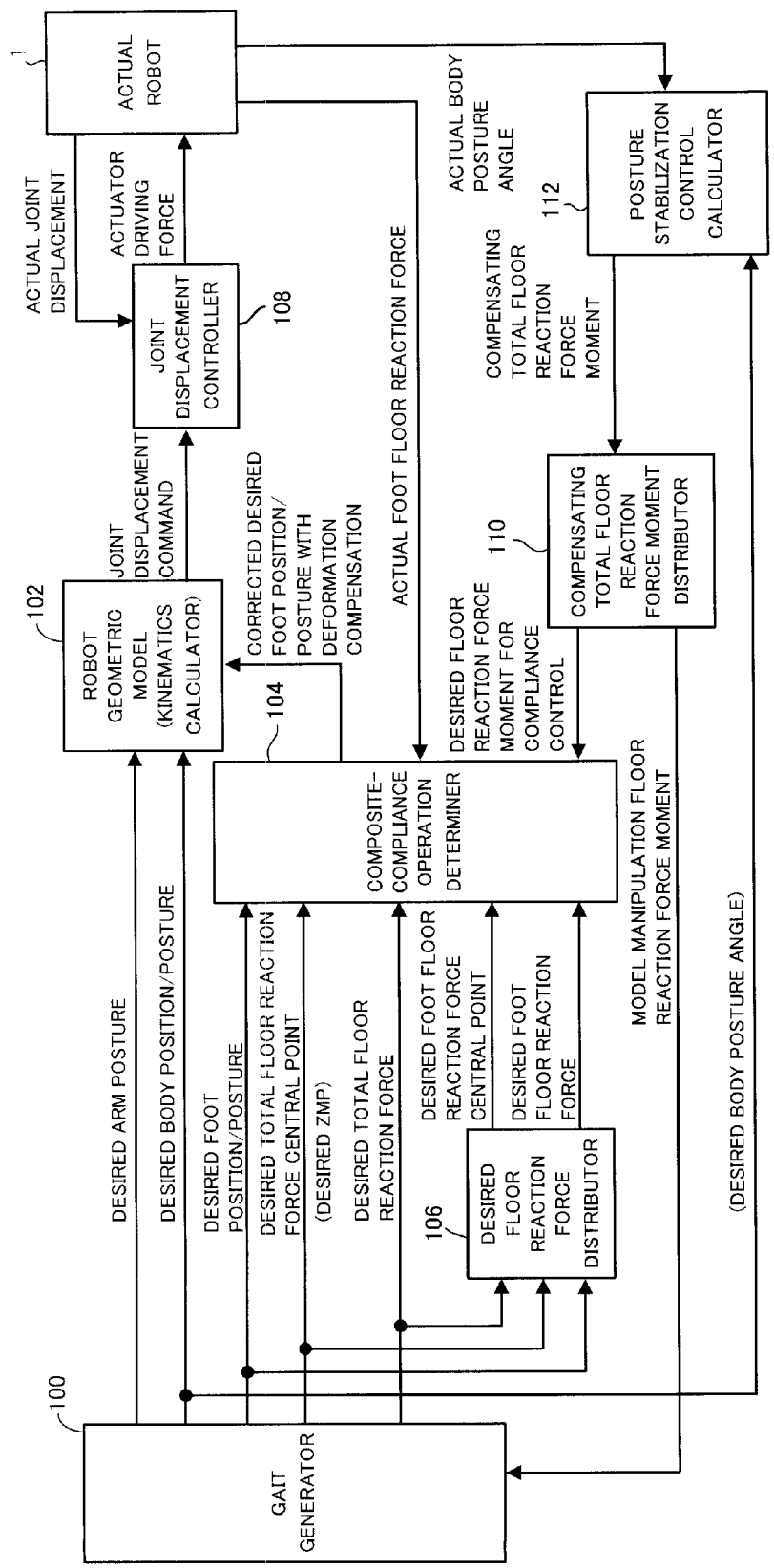
FIG. 3 is a block diagram illustrating the functional construction of the control unit in FIG. 2.

In FIG. 3, for the sake of convenience, it is assumed that the actually measured values (actual joint displacements and the like) recognized by the control unit 26 from the outputs of the aforesaid sensors mounted on the robot 1 are output from the actual robot 1. In the following description, the aforesaid reference characters R and L will be omitted unless it is necessary to distinguish the right leg 2 and the left leg 2.

The control unit 26 is provided with a gait generator 100, which freely generates a desired gait in real time and outputs the generated desired gait, as will be discussed later.

The desired gait output by the gait generator 100 is composed of a desired motion trajectory (the trajectory of a desired motion) that defines the time-series pattern of the desired value of the displacement amount (the rotational angle) of each joint of the robot 1 and a desired trajectory related to an external force to be applied to the robot 1.

According to the present embodiment, the desired motion trajectory is composed of a desired body position/posture trajectory (the trajectories of the desired position and the desired posture of the body 24), a desired foot position/posture trajectory (the trajectories of the desired position and the desired posture of each foot 22), and a desired arm posture trajectory (the trajectory of the desired posture of each arm). Further, the desired trajectory related to an external force is composed of a desired total floor reaction force central point (a desired ZMP) trajectory and a desired total floor reaction force trajectory. If the robot 1 has, in addition to the legs 2 and the arms, any other portions that are movable relative to the body 24, then the desired position/posture trajectories of the movable portions are added to the aforesaid desired motion trajectory.

Here, the terms concerning the aforesaid desired gait will be supplementarily described. In the following description, the term "desired" will be frequently omitted unless there is a possibility of misunderstanding.

The term "trajectory" in a desired gait will mean the pattern of temporal changes (the time-series pattern of instantaneous values).

The position and the velocity of the body 24 will mean the position and its moving speed of a predetermined representative point of the body 24 (e.g., the central point between the right and left hip joints). Similarly, the position and the speed of each foot 22 will mean the position and its moving velocity of a predetermined representative point of each foot 22. In the present embodiment, the representative point of each foot 22 is set at a point on the bottom surface of each foot 22, such as a point at which a perpendicular line from the center of the ankle joint of each of the legs 2 to the bottom surface of each foot 22 intersects with the bottom surface.

The term "posture" will mean a spatial orientation. For example, the posture of the body will be expressed by the inclination angle (posture angle) of the body 24 in the roll direction relative to the vertical direction (about the X-axis) and the inclination angle (posture angle) of the body 24 in the pitch direction (about the Y-axis). The posture of a foot will be expressed by the spatial azimuths of two axes fixedly set on each foot 22. In the present description, a body posture may be referred to as a body posture angle. The body posture may include the rotational angle of the body 24 in the yaw direction (about the Z-axis).

The floor reaction force acting on each foot 22 (a floor reaction force composed of a translational force and a moment) will be referred to as "each foot floor reaction force" and the resultant force of "each foot floor reaction force" of all (two) feet 22R and 22L of the robot 1 will be referred to as "total floor reaction force." The following description, however, will hardly refer to each foot floor reaction force. Hence, the term "floor reaction force" will be regarded to have the same meaning as the term "total floor reaction force" unless otherwise specified.

A desired floor reaction force will be generally expressed by a point of action and a translational force and moment acting on the point. In the present embodiment, however, for the sake of convenience, the point of action will be distinguished from the translational force and the moment acting on the point of action, and the point of action will not be included in a desired floor reaction force. Further, in the present embodiment, a desired floor reaction force central point will be defined as the point of action of a desired floor reaction force. In this case, the moment component of the desired floor reaction force will be zero except for a vertical component (the moment component about the Z-axis).

In the following description, the vertical component and the horizontal component of the translational force component of a floor reaction force (the translational floor reaction force) will be referred to as the floor reaction force vertical component and the floor reaction force horizontal component, respectively. Further, the vertical component and the horizontal component of the moment component of a floor reaction force (the floor reaction force moment) will be referred to as the floor reaction force moment vertical component and the floor reaction force moment horizontal component, respectively.

The ZMP (Zero Moment Point) will mean a point on a floor surface at which the horizontal component of a moment acting about the point (the moment component about the horizontal axis) due to the resultant force of an inertial force generated by a moment of the robot 1 and the gravitational force acting on the robot 1 is zero. In a gait that satisfies a dynamic balance condition, the ZMP and the floor reaction force central point agree with each other. For this reason, in the present embodiment, a desired floor reaction force central point will be frequently referred to as a desired ZMP.

According to the present embodiment, the desired body position/posture, the desired foot position/posture, the desired total floor reaction force central point (the desired ZMP), and the desired total floor reaction force of a desired gait will be described in terms of a supporting leg coordinate system as a global coordinate system fixed to a floor in an operating environment (outside world) of the robot 1, which will be described later. Further, a desired arm posture will be described as a relative posture with respect to the body 24.

A desired body position/posture trajectory and a desired arm posture trajectory of a desired gait generated by the gait generator 100 (the generation processing will be described in detail later) are input to a robot geometric model (kinematics calculator) 102.

Further, a desired foot position/posture trajectory, a desired floor reaction force central point trajectory (a desired ZMP trajectory), and a desired floor reaction force trajectory (more specifically, a desired translational floor reaction force vertical component trajectory, a desired translational floor reaction force horizontal component trajectory, and the trajectory of a desired floor reaction force moment about a desired total floor reaction force central point) are input to a composite-compliance operation determiner 104 and a desired floor reaction force distributor 106.

Then, the desired floor reaction force distributor 106 distributes the desired floor reaction force to the respective feet 22R and 22L to determine the desired foot floor reaction force central point (the desired position of the floor reaction force central point of each of the feet 22R and 22L) and the desired foot floor reaction force (the desired floor reaction force to be applied to the floor reaction force central point of each of the feet 22R and 22L). The trajectories of desired foot floor reaction force central points and the desired foot floor reaction forces, which have been determined, are input to the composite-compliance operation determiner 104. Regarding a desired floor reaction force output from the gait generator 100, only a component necessary for the compliance control by the composite-compliance operation determiner 104 may be output. For example, the output of a desired translational floor reaction force horizontal component from the gait generator 100 may be omitted.

The composite-compliance operation determiner 104 determines a corrected desired foot position/posture with mechanism deformation compensation obtained by correcting a desired foot position/posture. The trajectory of the corrected desired foot position/posture is input to the robot geometric model 102.

The robot geometric model 102 calculates the joint displacement commands of the joints of the two legs 2, 2 (the desired values of the displacement amounts of the joints) that satisfy the desired body position/posture and the corrected desired foot position/posture with mechanism deformation compensation, which have been received, by inverse-kinematics calculation on the basis of a kinematics model (rigid link model) of the robot 1, and then outputs the calculated joint displacement commands to a displacement controller 108. Further, the robot geometric model 102 calculates the joint displacement commands of the joints of the arms that satisfy a desired arm posture, and outputs the calculated joint displacement commands to the displacement controller 108.

Then, the displacement controller 108 uses the joint displacement commands calculated by the robot geometric model 102 as the desired values to carry out follow-up control of the rotational angles of the joints (actual joint displacements) of both legs 2, 2 and both arms of the robot 1 through the intermediary of the servo amplifier 44. More specifically, the displacement controller 108 adjusts the output torque of the electric motor 42 as an actuator driving force such that the actual joint displacements (actually measured values) measured on the basis of the outputs of the encoder 40 agree with the joint displacement commands.

An actual foot floor reaction force, which is the floor reaction force actually acting on each foot 22 of the robot 1 due to an actual motion of the robot 1 subjected to the follow-up control described above, is measured from an output of the 6-axis force sensor 36, and the actually measured value of the actual foot floor reaction force is input to the composite-compliance operation determiner 104.

Further, the actual body posture angle, which is the real posture angle (an inclination angle relative to the vertical direction) of the body 24 of the robot 1, is measured on the basis of an output of the inclination sensor 38, and the actually measured value of the actual body posture angle is input to a posture stabilization control calculator 112. The posture stabilization control calculator 112 also receives, for example, a desired body posture angle (the desired value of the posture angle of the body 24 relative to the vertical direction) of a desired body position/posture generated by the gait generator 100.

Then, the posture stabilization control calculator 112 calculates a body posture angle deviation $\Delta\theta$, which is a difference between an input actual body posture angle (actually measured value) and a desired body posture angle, as an index indicating the degree of difference between the actual posture of the robot 1 and a desired posture. Further, the posture stabilization control calculator 112 calculates a compensating total floor reaction force moment Mdmd, which is the required value of a floor reaction force moment to be additionally applied to the robot 1 about a desired ZMP, on the basis of the calculated body posture angle deviation $\Delta\theta$ by a feedback control law as a required manipulated variable (required feedback manipulated variable) for converging the body posture angle deviation $\Delta\theta$ to zero.

In this case, the PD law, for example, is used as the feedback control law. More specifically, the compensating total floor reaction force moment Mdmd is calculated according to expression 50 given below from the body posture angle deviation $\Delta\theta$ and the temporal change rate thereof (a differentia value) $\Delta\omega$.

$$Mdmd = K1*\Delta\theta + K2*\Delta\omega \qquad \text{Expression 50}$$

In the above expression 50, K1 and K2 denotes a proportional gain and a differential gain, respectively. The values of K1 and K2 in the present embodiment are predetermined values that have been set beforehand.

In this case, to be more specific, the compensating total floor reaction force moment Mdmd is composed of a component Mdmdx in the roll direction (about the X-axis) and a component Mdmdy in the pitch direction (about the Y-axis). The reference characters Mdmdx and Mdmdy mean the required moments about a desired ZMP (more specifically, the required value of a perturbation of a floor reaction force moment about a desired ZMP) necessary for converging the component in the roll direction (about the X-axis) and the component in the pitch direction (about the Y-axis), respectively, of the body posture angle error $\Delta\theta$ to zero.

Then, the component Mdmdx about the X-axis is calculated according to expression 50 on the basis of the components of $\Delta\theta$ and $\Delta\omega$ about the X-axis. The component Mdmdy about the Y-axis is calculated according to expression 50 on the basis of the components of $\Delta\theta$ and $\Delta\omega$ about the Y-axis.

The values of the gains K1 and K2 in expression 50 may be variably set, as appropriate, according to the motional state of the robot 1. For example, the value or values of one or both of K1 and K2 may be variably determined on the basis of the total center of gravity of the robot 1 or the inertial force of the body 24 in the vertical direction. This makes it possible to calculate the value of Mdmd that allows the body posture angle error $\Delta\theta$ to smoothly converge to zero by compensating for the influences of the inertial force in the vertical direction caused by a motion of the robot 1.

As the index that indicates the degree of difference between the actual posture of the robot 1 and a desired posture, in place of the body posture angle error $\Delta\theta$, for example, the positional difference in the horizontal direction between the actual position of the total center of gravity of the robot 1 and the desired position of the total center of gravity defined by a desired gait (more specifically, a desired motion) may be used, and the compensating total floor reaction force moment Mdmd may be calculated according to a feedback control law, such as the PD law, on the basis of the aforesaid positional error.

Further, an external force other than a floor reaction force acting on the robot 1 and the point of action thereof may be measured by an appropriate force sensor or the like installed in the body 24, and the moment acting on the actual robot 1 about a desired ZMP due to the external force may be calculated on the basis of the measured values of the external force and the point of action. Then, the floor reaction force moment obtained by multiplying a floor reaction force moment that balances with (in the opposite direction from) the calculated moment by a positive gain that is 1 or less may be added to the right side of expression 50, thereby calculating the compensating total floor reaction force moment Mdmd.

Figure 4:
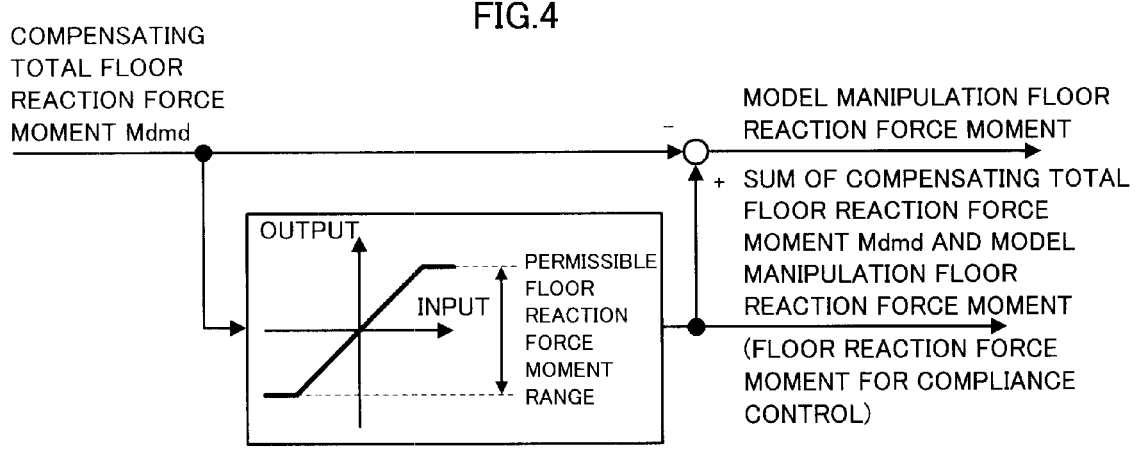
FIG. 4 is a block diagram illustrating the processing by a compensating total floor reaction force moment distributor shown in FIG. 3.

The compensating total floor reaction force moment Mdmd determined as described above by the posture stabilization control calculator 112 is divided into the desired floor reaction force moment for a compliance control ("FRFMCC" in FIG. 4) and a model manipulation floor reaction force moment ("MMFRFM" in FIG. 4) through the intermediary of a compensating total floor reaction force moment distributor 110.

The desired floor reaction force moment for compliance control is a perturbation floor reaction force moment about a desired ZMP to be additionally applied to the actual robot 1 to bring the body posture angle error $\Delta\theta$ close to zero. The model manipulation floor reaction force moment is a perturbation floor reaction force moment about a desired ZMP to be additionally added to the robot 1 on a dynamic model for generating gaits, which will be discussed later, for the same purpose as that of the desired floor reaction force moment for compliance control. The model manipulation floor reaction force moment is, in other words, a perturbation floor reaction force moment generated about the desired ZMP by the motion of a final desired gait determined by the gait generator 100 (a desired gait output by the gait generator 100).

These floor reaction force moments are determined as described below for the respective components in the roll direction (about the X-axis) and the pitch direction (about the Y-axis). First, the model manipulation floor reaction force moment is determined according to expression 52 given below. In expression 52, Mdmd means each component (Mdmdx or Mdmdy) in the roll direction (about the X-axis) and the pitch direction (about the Y-axis). Similarly, the permissible floor reaction force moment range means the permissible range of the floor reaction force moment of each component in the roll direction (about the X-axis) and the pitch direction (about the Y-axis). This permissible floor reaction force moment range indicates the permissible floor reaction force moment range at the current time defined by the permissible floor reaction force moment range parameters determined by the processing carried out by the gait generator 100 in S028 of FIG. 10, which will be hereinafter described.

In the case where Mdmd>Upper limit value of the permissible floor reaction force moment range;

Model manipulation floor reaction force moment=–(*Mdmd*–Upper limit value of the permissible floor reaction force moment range)

In the case where Mdmd<Lower limit value of the permissible floor reaction force moment range;

Model manipulation floor reaction force moment=–(*Mdmd*–Lower limit value of the permissible floor reaction force moment range)

In the case where Lower limit value of the permissible floor reaction force moment range≤Mdmd≤Upper limit value of the permissible floor reaction force moment range;

Model manipulation floor reaction force moment=0    Expression 52

In expression 52 given above, the compensating total floor reaction force moment Mdmd (more specifically, Mdmdx or Mdmdy) itself is compared with the permissible floor reaction force moment range. More generally, however, the object to be compared with the permissible floor reaction force moment range in the above expression 52 is the moment obtained by adding Mdmd to a reference instantaneous value of a floor reaction force moment about a desired ZMP. The reference instantaneous value indicates the moment about the desired ZMP in a desired total floor reaction force generated by the gait generator 100 when it is assumed that the aforesaid body posture angle error $\Delta\theta$ is steadily maintained at zero.

In this case, according to the present embodiment, the reference instantaneous value of the moment about a desired ZMP is steadily zero for the components in both roll direction (about the X-axis) and pitch direction (about Y-axis). Hence, the result obtained by adding Mdmd to the reference instantaneous value is equal to Mdmd. For this reason, in the above expression 52, Mdmd (more specifically, Mdmdx or Mdmdy) is directly compared with the permissible floor reaction force moment range.

Subsequently, the desired floor reaction force moment for compliance control is determined according to expression 54 given below for each component in the roll direction (about the X-axis) and the pitch direction (about the Y-axis). As with the case of expression 50, Mdmd in expression 54 means each component (Mdmdx or Mdmdy) in the roll direction (about the X-axis) and the pitch direction (about the Y-axis).

Desired floor reaction force moment for compliance control=*Mdmd*+Model manipulation floor reaction force moment    Expression 54

Hence, the floor reaction force moments are determined such that the difference between the desired floor reaction force moment for compliance control and the model manipulation floor reaction force moment is equal to Mdmd.

The block diagram of the compensating total floor reaction force moment distributor 110 performing the computation described above is provided in FIG. 4. The arithmetic processing is carried out on each component in the roll direction (about the X-axis) and the pitch direction (about the Y-axis). If the compensating total floor reaction force moment Mdmd (Mdmdx or Mdmdy) stays within a permissible floor reaction force moment range, then Mdmd is immediately determined as the desired floor reaction force moment for compliance control and the model manipulation floor reaction force moment is determined to be zero.

For each component in the roll direction (about the X-axis) and the pitch direction (about the Y-axis), if the compensating total floor reaction force moment Mdmd (Mdmdx or Mdmdy) deviates from a permissible floor reaction force moment range, then the boundary value of either the upper limit value or the lower limit value of the permissible floor reaction force moment range, whichever is closer to Mdmd, is determined as the desired floor reaction force moment for compliance control, and a moment obtained by reversing the sign of a deviation of Mdmd from the permissible floor reaction force moment range (=Mdmd−Boundary value of the permissible floor reaction force moment range) is determined as the model manipulation floor reaction force moment.

Referring back to FIG. 3, the gait generator 100 receives the model manipulation floor reaction force moment determined as described above.

Then, the gait generator 100 generates the motion of a desired gait (a desired motion) by using the dynamic model such that the horizontal component of the floor reaction force moment about the desired ZMP determined by the gait generator 100 provides the model manipulation floor reaction force moment while determining the desired ZMP trajectory. This will be described in more detail hereinafter.

The desired total floor reaction force output to the composite-compliance operation determiner 104 from the gait generator 100 is output, aiming at causing the horizontal component of the floor reaction force moment about the desired ZMP to be zero.

Further, the desired floor reaction force moment for compliance control, which has been determined as described above by the compensating total floor reaction force moment distributor 110, is input to the composite-compliance operation determiner 104. Then, the composite-compliance operation determiner 104 determines the corrected desired foot position/posture with mechanism deformation compensation (trajectory) obtained by correcting the desired foot position/posture such that the actual floor reaction force moment about the desired ZMP approaches the desired floor reaction force moment for compliance control, while causing the motion of the robot 1 to follow the motion of the desired gait generated by the gait generator 100.

In this case, it is virtually impossible to make all states of the foot position/posture of the robot 1 and the floor reaction force agree with desired states, so that a tradeoff thereamong is adopted to achieve maximum possible agreement in a compromising manner. More specifically, the composite-compliance operation determiner 104 imparts a weight to the control error relative to each desired value when determining the corrected desired foot position/posture with mechanism deformation compensation (trajectory) thereby to minimize the weighted average of the control error (or the squared control error).

In other words, the corrected desired foot position/posture with mechanism deformation compensation (trajectory) is determined such that the actual floor reaction force moment about the desired ZMP and the actual foot position/posture of the robot 1 approach the desired floor reaction force moment for compliance control and the desired foot position/posture, respectively, as much as possible. Then, the composite-compliance operation determiner 104 outputs the corrected desired foot position/posture as the final desired values of the foot position/posture to the robot geometric model 102, thereby controlling the operation of the robot 1. More specifically, the composite-compliance operation determiner 104 controls the operation of the actual robot 1 to additionally apply the desired floor reaction force moment for compliance control as an additional external force to the robot 1 while causing the actual motion of the robot 1 to follow the motion of the desired gait.

The aforesaid construction and the operation of the composite-compliance operation determiner 104 or the like are described in detail in, for example, Japanese Patent Application Laid-Open No. 10-277969 filed by the present applicant. Therefore, no further detail of the composite-compliance operation determiner 104 will be given in the present description.

Thus, the operation of the robot 1 is controlled such that no model manipulation floor reaction force moment will be added to the floor reaction force of the actual robot 1 while generating the motion of the desired gait such that a model manipulation floor reaction force moment as the model manipulation external force on the dynamic model of the robot 1 is additionally generated about the desired ZMP. Hence, there will be an imbalance (unbalance) between the motion of the desired gait and the floor reaction force by the model manipulation floor reaction force moment, which is the difference. This is equivalent to applying a floor reaction force moment, which has a sign reversed from the sign of the model manipulation floor reaction force moment, to the actual robot 1 from the viewpoint of the effect for reducing the body posture angle error $\Delta\theta$ to zero.

In other words, determining an appropriate model manipulation floor reaction force moment makes it possible to turn the actual posture of the body 24 of the actual robot 1 into a desired posture and consequently stabilize the posture of the entire actual robot 1, restraining the posture of the entire actual robot 1 from deviating from a desired posture.

In this case, the sum of the model manipulation floor reaction force moment with a reversed sign and the desired floor reaction force moment for compliance control will be a total restoring force (floor reaction force moment) for converging the body posture angle error $\Delta\theta$ to zero. In other words, the difference between the desired floor reaction force moment for compliance control and the model manipulation floor reaction force moment will be the total restoring force.

The following will explain in more detail the processing carried out by the gait generator 100.

First, the basics of the processing carried out by the gait generator 100 will be described.

According to the present embodiment, the operation modes of the robot 1 include an operation mode of both leg alternately leaving from/landing on a floor, in which the robot 1 travels by the two legs 2 and 2 alternately leaving from/landing on a floor (a series of motions consisting of the motion of leaving from a floor and the subsequent motion of landing on the floor), a one-leg hopping operation mode, in which the robot 1 performs a one-leg hopping motion, in which the robot 1 leaves from and lands on a floor with only one leg 2 while the other leg 2 is off the floor, and an emergency operation mode, which is an operation mode of the robot 1 in a situation wherein it is difficult to prevent the posture of the robot 1 from being disturbed in the operation mode of both legs alternately leaving from/landing on a floor or the one-leg hopping operation mode. The operation mode of both legs alternately leaving from/landing on a floor is, in other words, the operation mode for the robot 1 to walk or run.

Then, the gait generator 100 selects among the aforesaid operation modes and generates a desired gait corresponding to the selected operation mode. In the following description, the desired gait associated with the operation mode of both legs alternately leaving from/landing on a floor will be referred to as the gait of both legs alternately leaving from/ landing on a floor, the desired gait associated with the one-leg hopping operation mode will be referred to as the one-leg hopping gait, and the desired gait associated with the emergency operation mode will be referred to as the emergency gait. In this case, the gait of both legs alternately leaving from/landing on a floor includes the desired gait for causing the robot 1 to walk (the walking gait) and the desired gait for causing the robot 1 to run (the running gait).

Here, the basic motion patterns of the robot 1 in the gait of both legs alternately leaving from/landing on a floor, the one-leg hopping gait, and the emergency gait, respectively, will be outlined with reference to FIG. 5 to FIG. 8. Incidentally, in the following description, the term "landing on a floor" may be rephrased to "landing" or "contacting the ground."

Figure 5:
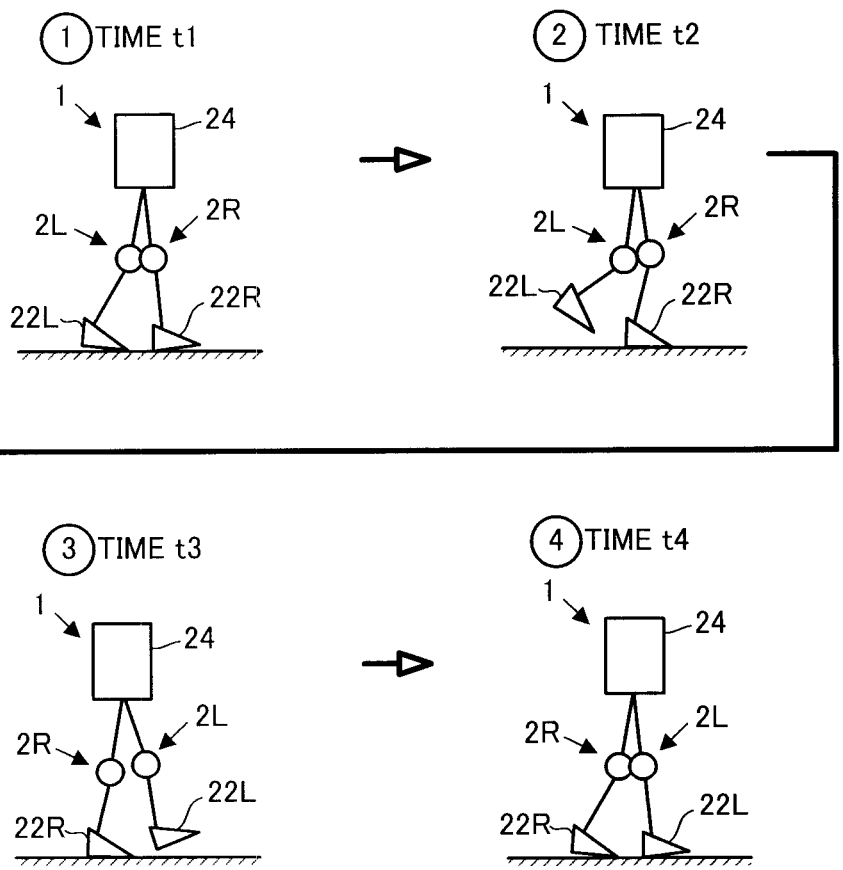
FIG. 5 is an explanatory diagram illustrating the motion pattern of a walking gait.

FIG. 5 illustrates in a time-series manner the instantaneous motional states of the robot 1 in the walking gait of the gait of both legs alternately leaving from/landing on a floor. The state at time t1 in FIG. 5 illustrates the state immediately after one of the legs 2 (the leg 2R in the figure) has been landed on a floor after the state wherein the leg 2R is off the floor. In this state, the other leg 2 (2L) is already on the floor.

In the walking gait, after the state at time t1, the robot 1 moves the other leg 2 (2L) off of the floor while supporting its own weight by the one leg 2 (2R) landed on the floor (the state at time t2). Subsequently, the robot 1 swings out the other leg 2 (2L) to move the foot 22 (22L) of the other leg 2 (2L), which has been left from the floor, forward in the direction in which the robot 1 is advancing while maintaining the one leg 2 (2R) on the floor (the state at time t3).

Next, the robot 1 lands the other leg 2 (2L) on the floor (the state at time t4). At this time, both of the legs 2 and 2 of the robot 1 are on the floor. Thereafter, the one leg 2 (2R) is left from/landed on the floor in the same manner as that described above. The walking gait is a gait in which the series of motions of the two legs 2 and 2 described above is repeated.

Figure 6:
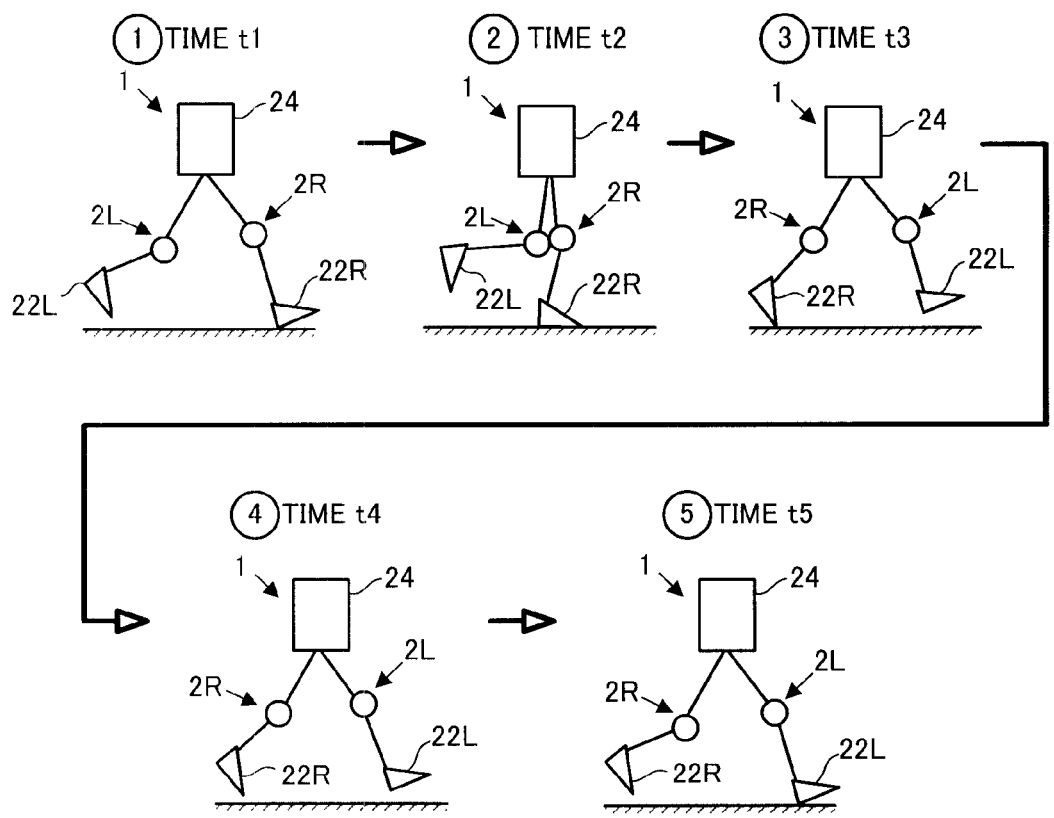
FIG. 6 is an explanatory diagram illustrating the motion pattern of a running gait.

FIG. 6 illustrates in the time-series manner the instantaneous motional states of the robot 1 in the running gait of the gait of both legs alternately leaving from/landing on a floor. The state at time t1 in the figure illustrates a state immediately after the one leg 2 (the leg 2R in the figure) has been landed from the state wherein the one leg 2 is off the floor. In this state, the other leg 2 (2L) is already off of the floor.

In the running gait, after the state at time t1, the robot 1 swings out the other leg 2 (2L) to move the foot 22 (22L) of the other leg 2 (2L), which has been left from the floor, forward in the direction in which the robot 1 is advancing while supporting its own weight by the one leg 2 (2R), which has been landed (states at time t2 and t3). Further, the robot 1 kicks the floor by the foot 22R of the one leg 2 (2R) on the floor while maintaining the other leg (2L) off of the floor (the state at time t3), thereby leaving the one leg 2 (2R) from the floor (time t4). This causes the entire robot 1 to float in the air.

Next, the robot 1 lands the other leg 2 (2L), which has been swung forward in the advancing direction, on the floor while maintaining the one leg 2 (2R) off the floor (the state at time t5). Thereafter, the other leg 2 (2L) is left from the floor, the one leg 2 (2R), which has been left from the floor immediately before the other leg 2 (2L) is landed on the floor, is swung into the air and then landed on the floor in the same manner as that described above. The running gait is a gait in which the series of motions of the two legs 2 and 2 described above is repeated.

Figure 7:
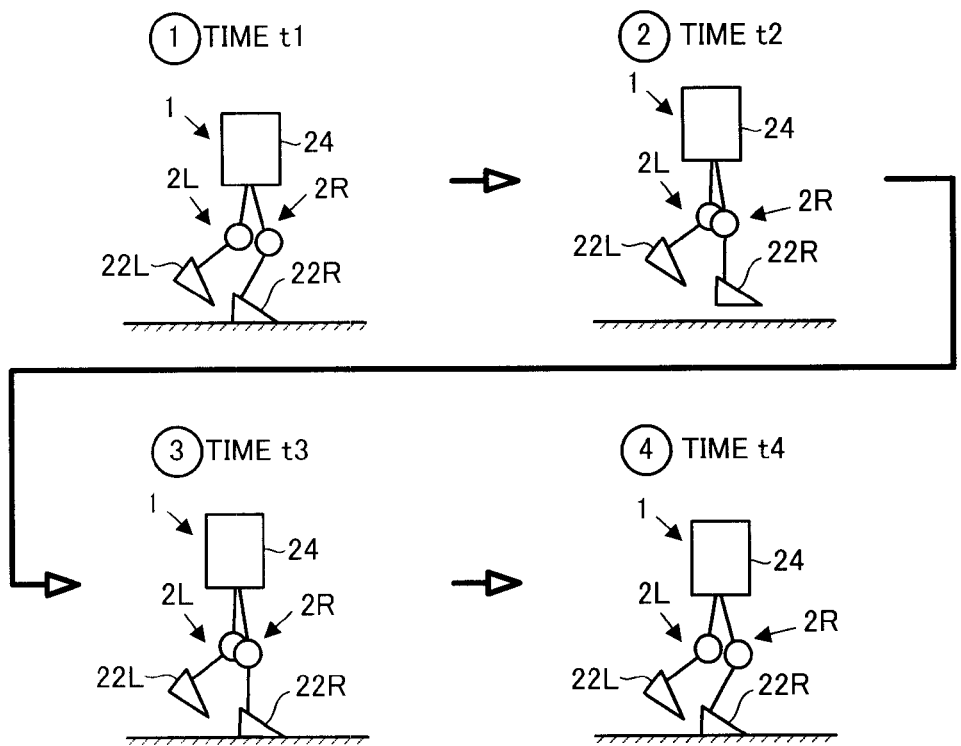
FIG. 7 is an explanatory diagram illustrating a motion pattern of a one-leg hopping gait.

FIG. 7 illustrates in the time-series manner the instantaneous motional states of the robot 1 in the one-leg hopping gait. The state at time t1 in the figure illustrates the state immediately after one leg 2 (the leg 2R in the figure) is landed from the state wherein the leg 2R is left from the floor. In this state at time t1, the other leg 2 (2L) is already off the floor.

In the one-leg hopping gait, following the state at time t1, the robot 1 kicks the floor surface with the foot 22 (22R) of the one leg 2 (2R) on the floor while holding the other leg 2 (2L) off the floor, thereby causing the one leg 2 (2R) to leave the floor so as to float in the air to move in the air toward a desired position (the state at time 2).

Subsequently, the robot 1 lands the one leg 2 (2R) while holding the other leg 2 (2L) off the floor (the state at time t3). At the instant of the landing, in order to reduce the landing impact, the robot 1 bends the one leg 2 (2R) at the knee joint thereof while holding the other leg 2 (2L) off the floor, thereby lowering the total center of gravity of the robot 1 (the state at time t4).

To continue the one-leg hopping motion thereafter, the motion of the one leg 2 (2R) leaving from/landing on the floor will be repeated as described above. The one-leg hopping gait is a gait in which the one leg 2 (2R) is left from/landed on a floor while the other leg 2 (2L) remains off the floor as described above. FIG. 7 illustrates the one-leg hopping gait in which the left leg 2L is kept off the floor. However, the same applies to the one-leg hopping gait in which the right leg 2R is kept off the floor.

Figure 8:
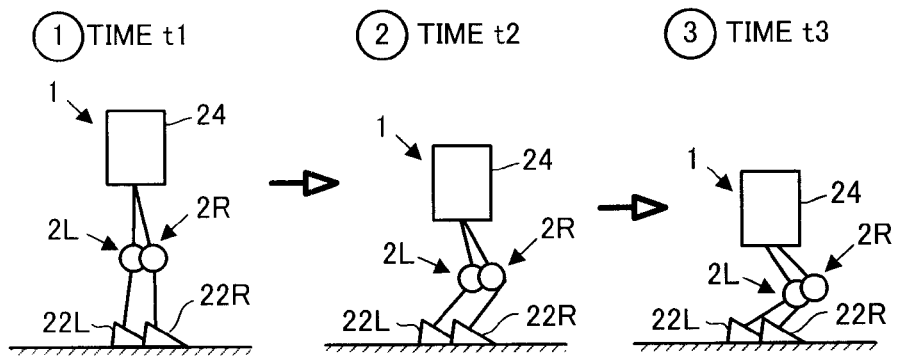
FIG. 8 is an explanatory diagram illustrating the motion pattern of an emergency gait.

FIG. 8 illustrates in the time-series manner the instantaneous motional states of the robot 1 in the emergency gait. In this example, the robot 1 bends both legs 2 and 2 at the knee joints thereof (the states at time t2 and time t3) in the state wherein both legs 2 and 2 are on the floor (the state at time 1), thereby lowering the total center of gravity of the robot 1.

The emergency gait is a gait in which the legs 2 and 2 are bent to lower the total center of gravity of the robot 1 as described above so as to reduce the impact to which the robot 1 would be subjected, thereby minimizing the possibility of damage to the robot 1 even if the robot 1 should fall. Alternatively, the total center of gravity of the robot 1 may be lowered by bending both legs 2 and 2 at the knee joints thereof in the state wherein one of the two legs 2 and 2 is on the floor.

This completes the overview of the motion patterns of the robot 1 in the gait of both legs alternately leaving from/landing on a floor, the one-leg hopping gait, and the emergency gait.

In the following description, in the gait of both legs alternately leaving from/landing on a floor and the one-leg hopping gait, the leg 2 out of the two legs 2 and 2 that supports the self weight of the robot 1 (the leg 2 subjected to a floor reaction force supporting the self weight) may be referred to as the supporting leg or the leg on the supporting leg side, and the leg 2 that is not the supporting leg may be referred to as the free leg or the leg on the free leg side.

In this case, in a running gait or a one-leg hopping gait having a floating period during which both legs 2 and 2 are off a floor, although none of the legs 2 and 2 are the legs supporting the self weight of the robot 1 in the floating period, the leg 2 which was the supporting leg immediately preceding the floating period will be referred to, for the sake of convenience, as the supporting leg or the leg on the supporting leg side also in the floating period.

Further, in the walking gait which has a two-leg supporting period during which both legs 2 and 2 are on a floor, the self weight of the robot 1 is supported by both legs 2 and 2 during the two-leg supporting period, the leg that has landed from an off-the-floor state at the beginning of the two-leg supporting period will be referred to as the supporting leg or the leg on the supporting leg side for the sake of convenience. Further, in the gait of both legs alternately leaving from/landing on a floor and the one-leg hopping gait, the period during which only one leg 2 of the two legs is on a floor will be referred to as a one-leg supporting period.

The one-leg hopping gait is, in other words, a gait that has a floating period and the one-leg supporting period that precedes and follows the floating period, and the supporting leg and the free leg remain to be the same leg 2 in the one-leg supporting period before the floating period and in the one-leg supporting period after the floating period. In comparison thereto, the gait of both legs alternately leaving from/landing on a floor (the walking gait or the running gait) is, in other words, a gait for causing the robot 1 to travel by alternating the supporting leg and the free leg between the two legs 2 and 2.

In this case, the walking gait has the two-leg supporting period and the one-leg supporting period that precedes and follows the two-leg supporting period, and the leg 2 that becomes the supporting leg and the leg 2 that becomes the free leg are switched in the one-leg supporting period that precedes the two-leg supporting period and the one-leg supporting period that follows the two-leg supporting period. The running gait has a floating phase and the one-leg supporting period that precedes the floating phase and the one-leg supporting period that follows the floating phase. In the running gait, the leg 2 that becomes the supporting leg and the leg 2 that becomes the free leg are switched in the one-leg supporting period that precedes the floating phase and the one-leg supporting period that follows the floating phase.

The following will describe the aforesaid supporting leg coordinate system. According to the present embodiment, the supporting leg coordinate system is a coordinate system fixed to a floor, in which the origin thereof is a point at which the normal extended from the center of the ankle of the leg 2 of the supporting leg to a floor surface intersects with the floor surface in a state wherein the position/posture of the foot 22 of the leg 2 on the floor as the supporting leg coincide with the position/posture that cause substantially the entire bottom surface of the foot 22 is in contact (close contact) with the floor surface in a posture parallel to the floor surface (hereinafter, the position/posture of the foot 22 of the supporting leg in this state will be referred to as the basic landing position/posture). The horizontal plane passing the origin is defined as an XY plane. In this case, the X-axis direction and the Y-axis direction of the supporting leg coordinate system indicate the longitudinal direction and the lateral direction, respectively, of the foot 22 of the supporting leg (more specifically, the foot 22 observed by projecting the foot 22 onto the horizontal plane). Further, the Z-axis direction indicates the vertical direction.

Thus, the supporting leg coordinate system in the present embodiment is a 3-axis orthogonal coordinate system (an XYZ coordinate system) in which the position of the origin thereof and the directions of the X-axis and the Y-axis are defined according to the aforesaid relationship with the basic landing position/posture of the foot 22 of the leg 2 on the floor as the supporting leg.

The desired foot position/posture of the supporting leg in contact with a floor do not always have to coincide with the basic landing position/posture at certain time while the supporting leg is in contact with the floor. In this case, the basic landing position/posture that define the supporting leg coordinate system mean the basic landing position/posture that can be achieved by turning the foot 22 on the floor in a desired gait such that the foot 22 does not virtually slip (the position/posture in which substantially the entire bottom surface of the foot 22 comes in contact with the floor surface).

Supplementarily, the origin of the supporting leg coordinate system does not have to be the aforesaid point, and the origin may alternatively be a point on the floor surface that has been shifted from the aforesaid point. Further, the supporting leg coordinate system in the present embodiment will be updated each time the supporting leg lands. However, the position of the origin of the supporting leg coordinate system and the postures of the coordinate axes may be maintained to be constant.

The dynamic model of the robot 1 used for the gait generation processing in the present embodiment will be described with reference to FIG. 9. The dynamic model is the same as that illustrated in FIG. 10 of the aforesaid Japanese Patent No. 3674788, so that the dynamic model will be only briefly described in the present embodiment.

Figure 9:
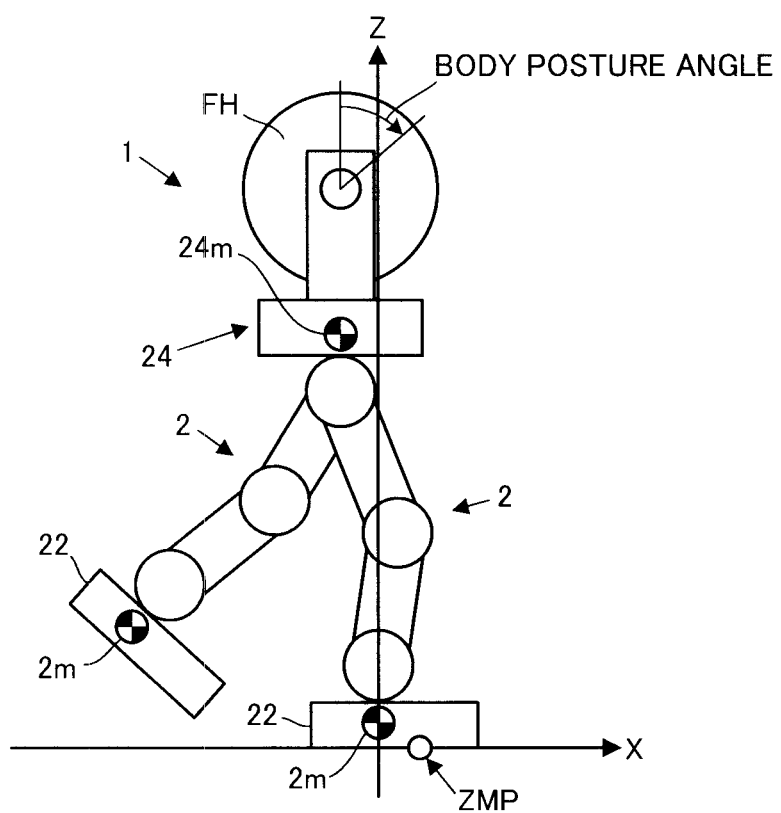
FIG. 9 is a diagram illustrating a dynamic model used for generating a gait.
Figure 10:
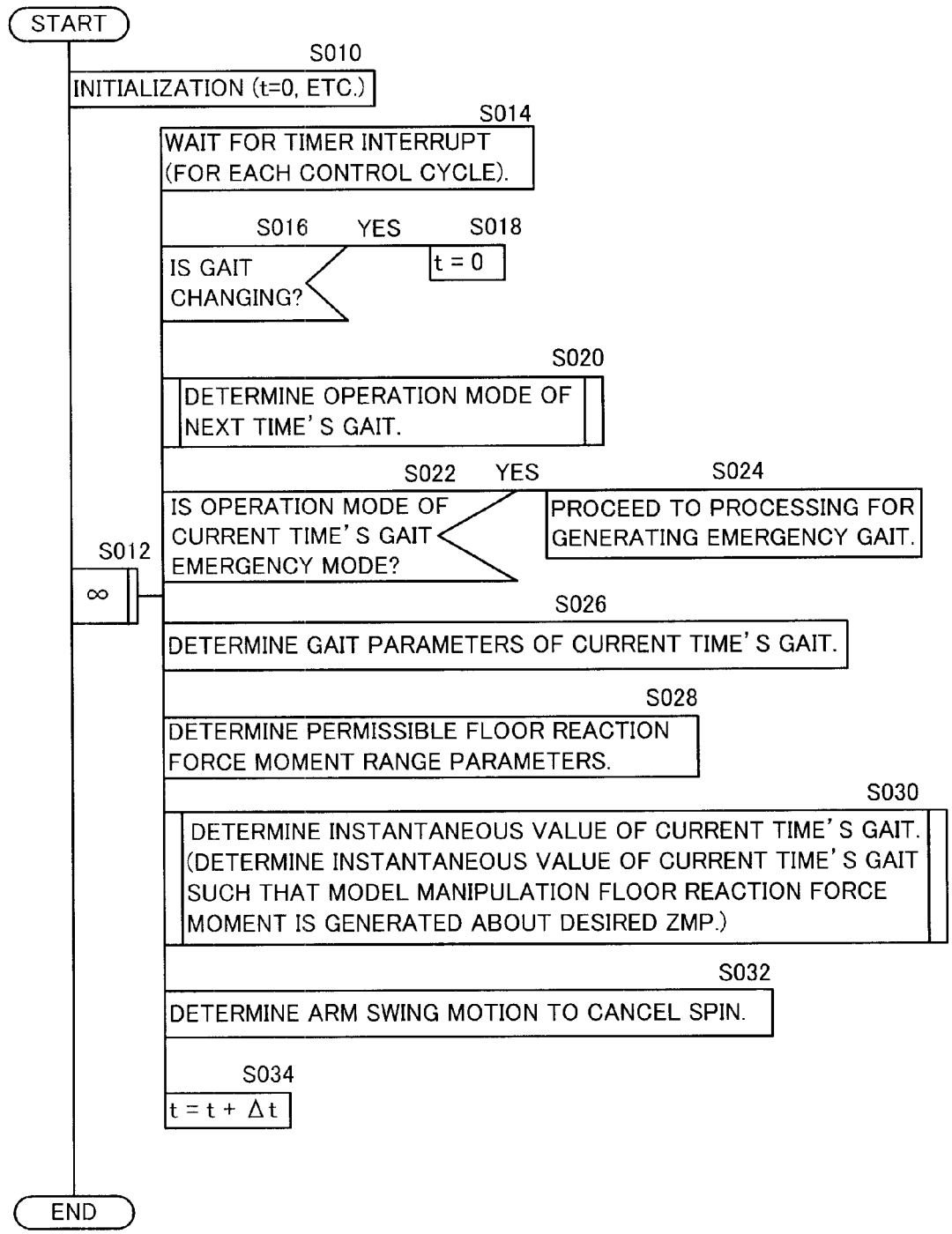
FIG. 10 is a flowchart illustrating the main routine processing carried out by the gait generating device shown in FIG. 3.

Referring to FIG. 9, the dynamic model of the robot 1 used for the gait generation processing in the present embodiment is the same as the dynamic model illustrated in, for example, FIG. 10 of the aforesaid Japanese Patent No. 3674788. More specifically, the dynamic model is a model formed of a total of three mass points, namely, two mass points $2m$ and $2m$ corresponding to the two legs 2 and 2 of the robot 1 and a mass point $24m$ corresponding to the body 24, and a flywheel FH having an inertia (inertial moment) and no mass.

The mass of the body mass point $24m$ includes the masses of the legs 2, 2 and portions (e.g., the arms) connected or fixed to the body 24.

The dynamic model is constructed such that the dynamics of the legs 2 and 2 (the dynamics of the mass points $2m$ and $2m$) and the dynamics of the body 24 (the dynamics of the mass point $24m$ and the flywheel FH) do not interfere with each other, and the dynamics of the entire robot 1 is represented by the linear connection thereof.

The behaviors of the dynamic model (the dynamics of the robot on the dynamic model) are mathematized as shown below. However, for the purpose of simplifying the description, only a dynamic equation on a sagittal plane (a plane that includes the X-axis and the Z-axis of the supporting leg coordinate system) will be described, omitting a dynamic equation on a lateral plane (a YZ plane that includes the Y-axis and the Z-axis of the supporting leg coordinate system).

For the convenience of description, the variables and parameters related to the dynamic model are defined as follows.

Zsup: Vertical position of the mass point of a supporting leg
Zswg: Vertical position of the mass point of a free leg
Zb: Vertical position of the body mass point
ZGtotal: Vertical position of total center of gravity
Xsup: Horizontal position of the mass point of the supporting leg
Xswg: Horizontal position of the mass point of the free leg
Xb: Horizontal position of the body mass point
XGtotal: Horizontal position of total center of gravity
θby: Body posture angle (inclination angle) about Y-axis relative to vertical direction
mb: Mass of body mass point
msup: Mass of the mass point of the supporting leg
mswg: Mass of the mass point of the free leg
mtotal: Total mass of the robot (=mb+msup+mswg)
J: Inertial moment of flywheel FH
Fx: Horizontal component of floor reaction force
Fz: Vertical component of floor reaction force
My: Floor reaction force moment about a desired ZMP (more specifically, a component about the Y-axis of the floor reaction force moment)

According to the present embodiment, the position of the mass point $2m$ of each leg 2 is defined by the position and the posture of the foot 22 of the leg 2. Similarly, the position of the body mass point $24m$ is defined by the position and the posture of the body 24. Further, it is assumed that the rotational angle of the flywheel FH coincides with a body posture angle.

On an arbitrary variable A, dA/dt denotes a first-order differential value of A, and d2A/dt2 denotes a second-order differential value of A. Accordingly, if the variable A denotes a displacement, then dA/dt means a velocity, and d2A/dt2 means acceleration. Reference character "g" denotes a gravitational acceleration constant. Here, "g" takes a positive value.

The dynamic equations of the dynamic model (the dynamics of the robot on the dynamic model) are given by the following expressions 01, 02 and 03.

$$Fz = mb*(g + d\,2Zb/dt2) + \\ msup*(g + d\,2Zsup/dt2) + mswg*(g + d\,2Zswg/dt2)$$ Expression 01

$$Fx = mb*d\,2Xb/dt2 + \\ msup*d\,2Xsup/dt2 + mswg*d\,2Xswg/dt2$$ Expression 02

$$My = -mb*(Xb - Xzmp)*(g + d\,2Zb/dt2) + \\ mb*(Zb - Zzmp)*d\,2Xb/dt2 - \\ msup*(Xsup - Xzmp)*(g + d\,2Zsup/dt2) + \\ msup*(Zsup - Zzmp)*d\,2Xsup/dt2 - \\ mswg*(Xswg - Xzmp)*(g + d\,2Zswg/dt2) + \\ mswg*(Zswg - Zxmp)*d\,2Xswg/dt2 + \\ J*d\,2\theta by/dt2$$ Expression 03

Further, the following relational expressions hold for the position of the total center of gravity of the robot 1.

$$ZGtotal = (mb*Zb + msup*Zsup + mswg*Zswg)/mtotal$$ Expression 04

$$XGtotal = (mb*Xb + msup*Xsup + mswg*Xswg)/mtotal$$ Expression 05

The above has described the dynamic model used for the gait generation processing by the gait generator 100. In this dynamic model, the motion for changing the body posture angle of the robot 1 without moving the total center of gravity of the robot 1 (i.e., without causing a change in the translational floor reaction force acting on the robot 1) is expressed in terms of the rotational motion of the flywheel FH. Further, the translational motion of the body 24 of the robot 1 is expressed as the translational motion of the body mass point 24b.

Supplementarily, the dynamic model may be different from the one illustrated in FIG. 10 of the aforesaid Japanese Patent No. 3674788. For example, a dynamic model expressing the dynamics of the robot 1 based on a multi-mass-point model having a mass point in each link of the robot 1 may be used.

The processing by the gait generator 100 will now be outlined. The gait generator 100 receives, in addition to the aforesaid model manipulation floor reaction force moment, the information on a floor configuration and instruction information regarding the traveling mode of the robot 1 (e.g., the information regarding the instructions on the traveling route, the traveling velocity and a traveling plan of the robot 1). Then, based mainly on the received data, the gait generator 100 selectively determines the operation mode of the robot 1 that enables the robot 1 to continue its motion (travel) without disturbing the posture thereof as much as possible, and generates a desired gait corresponding to the determined operation mode. In this case, for the gait of both legs alternately leaving from/landing on a floor and the one-leg hopping gait corresponding to the operation mode of both legs alternately leaving from/landing on a floor and the one-leg hopping operation mode, respectively, the gait generator 100 generates a desired gait for one step in order, taking the gait for the one step as a unit.

Here, in the present embodiment, the term "the gait for one step" in the gait of both legs alternately leaving from/landing on a floor means the gait for the period from the instant one of the legs 2 lands on a floor to the instant the other leg 2 subsequently lands on the floor. In the one-leg hopping gait, the term "the gait for one step" means the period from the instant one of the legs 2 that acts as the supporting leg lands on a floor to the instant this one leg 2 lands on the floor next.

In the following description, a desired gait (a desired gait for one step) which is about to be generated anew will be referred to as "a current time's gait," a next desired gait will be referred to as "a next time's gait," and the further next desired gait will be referred to as "a next but one time's gait." A desired gait generated immediately preceding a current gait will be referred to as "a last time's gait."

In the processing for generating the current time's gait, the gait generator 100 determines current time's gait parameters (the gait parameters of the current time's gait) as the parameters that define some constituent elements of the current time's gait, such as a desired foot position/posture trajectory, a desired floor reaction force vertical component trajectory, and a desired ZMP trajectory in both the gait of both legs alternately leaving from/landing on a floor and the one-leg hopping gait.

In this case, the gait generator 100 determines the current time's gait parameters such that the several predetermined restrictive conditions are satisfied so as to enable the robot 1 to continue its motion without causing the posture of the robot 1 to be disturbed when the actual motion of the robot 1 is made to follow the motion of the current time's gait (the gait of both legs alternately leaving from/landing on a floor or the one-leg hopping gait). Then, the gait generator 100 uses the current time's gait parameters and the dynamic model to sequentially generate the instantaneous value of the current time's gait.

The following will describe in detail the gait generation processing carried out by the gait generator 100 with reference to FIG. 10 to FIG. 38. The gait generator 100 carries out the gait generation processing (the main routine processing) illustrated by the flowchart (structured flowchart) in FIG. 10 thereby to generate a desired gait (more specifically, a gait of both legs alternately leaving from/landing on a floor or a one-leg hopping gait).

First, in S010, various initializing operations, such as initializing time t to zero, are performed. At the same time, the state amounts indicating the motions, such as body position/posture, are converted from the supporting leg coordinate system of a last time's gait to the supporting leg coordinate system of a current time's gait. This processing is carried out at the time of a startup or the like of the gait generator 100.

Subsequently, the gait generator 100 proceeds to S014 via S012 wherein the gait generator 100 waits for a timer interrupt at each control cycle (the arithmetic processing cycle in the flowchart of FIG. 10). The control cycle is denoted by Δt.

Subsequently, the gait generator 100 proceeds to S016 to determine whether a gait changeover has taken place. At this time, if the gait has changed, then the gait generator 100 proceeds to S020 after the processing in S018. In this case, the gait generator 100 initializes time t to zero in S018. If it is determined in S016 that the gait has not changed, then the gait generator 100 immediately proceeds to S020.

Here, the phrase "the gait changeover" means the timing at which the generation of a last time's gait is completed and the generation of a current time's gait is about to begin. Supplementarily, if the gait has not changed, then the rest of the current time's gait generated until immediately before by the processing in S020 and after will be generated without performing the initialization. However, the current time's gait parameters determined in S026 do not necessarily coincide with the values obtained until immediately before. For example, the current time's gait to be generated would deviate from the gait that gradually approaches a normal gait, which will be discussed hereinafter, unless the model manipulation floor reaction force moment at immediately before is zero, so that the current time's gait parameters would be changed.

Subsequently, in S020, the gait generator 100 determines the operation mode of the next time's gait. The processing in S020 will now be outlined. In a situation wherein it is determined that the robot 1 can continuously travel at a stable posture by the motion of the robot 1 in the operation mode of both legs alternately leaving from/landing on a floor (the walking operation or the running operation, which will be hereinafter generically referred to as the operation mode of both legs alternately leaving from/landing on a floor in some cases), the gait generator 100 selects the operation mode of both legs alternately leaving from/landing on a floor as the operation mode for the next time's gait. The motion of the robot 1 in the operation mode of both legs alternately leaving from/landing on a floor comes in the walking mode and the running mode, and whether the walking mode or the running mode has been selected (i.e., whether a walking gait or a running gait has been generated) is determined on the basis of, for example, the traveling velocity of the robot 1 required in instruction information, which will be discussed hereinafter.

Further, the gait generator 100 selects the one-leg hopping operation mode as the operation mode for the next time's gait in a situation wherein the gait generator 100 determines that it will be difficult for the robot 1 to continue to travel in a stable posture by the motion of the robot 1 in the operation mode of both legs alternately leaving from/landing on a floor and that the motion of the robot 1 in the one-leg hopping operation mode will enable the robot 1 to continue to travel in a stable posture.

Further, the gait generator 100 selects the emergency operation mode as the operation mode for the next time's gait in a situation wherein the gait generator 100 determines that it will be difficult for the robot 1 to continue to travel in a stable posture by the motion of the robot 1 neither in the operation mode of both legs alternately leaving from/landing on a floor nor the one-leg hopping operation mode.

Figure 11:
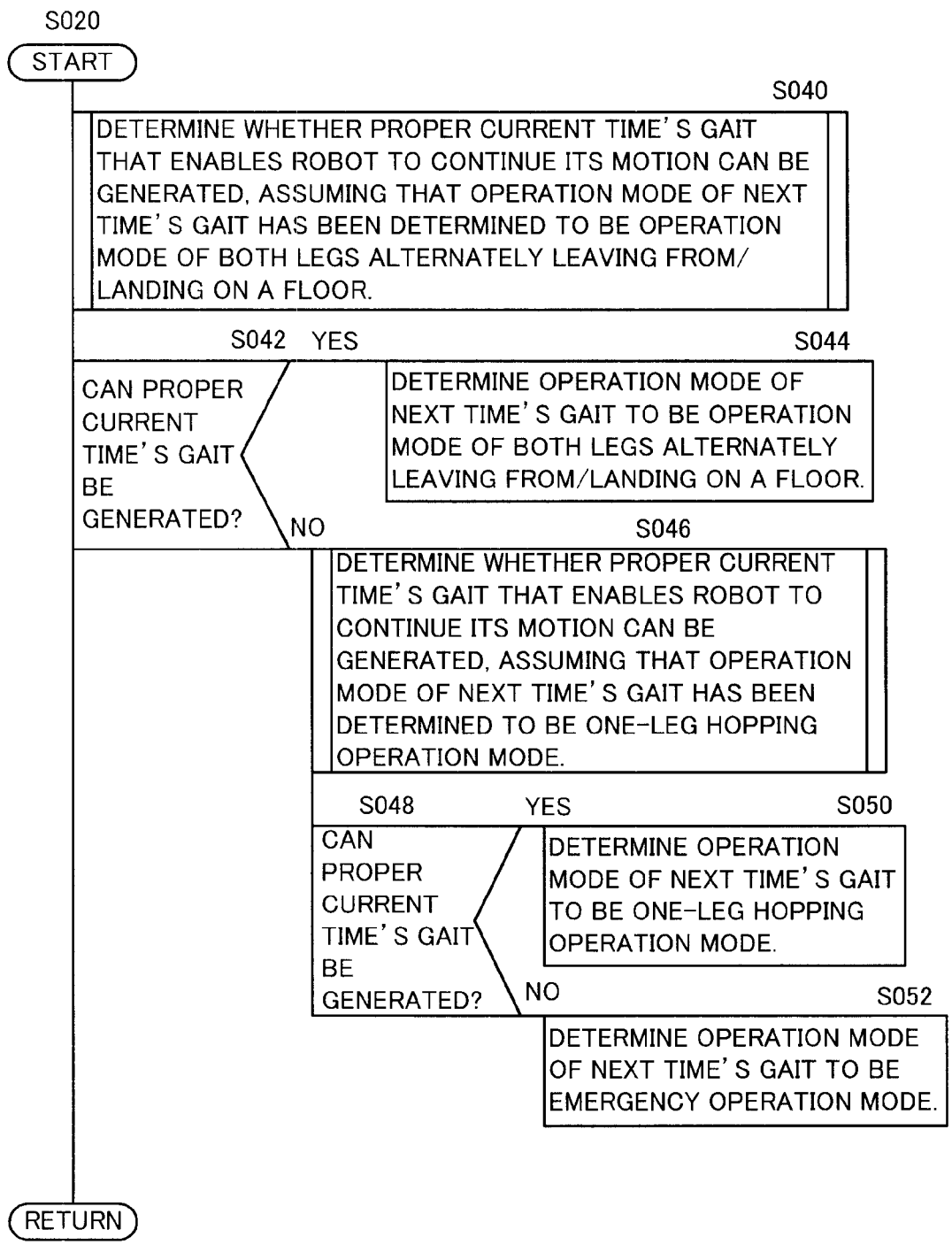
FIG. 11 is a flowchart illustrating the subroutine processing in S020 of FIG. 10.

To be more specific, the processing in S020 for determining the operation mode for the next time's gait as described above is carried out as illustrated by the flowchart of FIG. 11.

First, the gait generator 100 carries out in S040 the processing for determining whether it is possible to generate an appropriate current time's gait that enables the robot 1 to continue its motion in a stable posture, assuming that the operation mode of both legs alternately leaving/landing on a floor has been selected as the operation mode for the next time's gait. In the following description, specific processing will be described by taking, as a major example, a case where the motion in the operation mode of both legs alternately leaving from/landing on a floor is the running motion.

Figure 12:
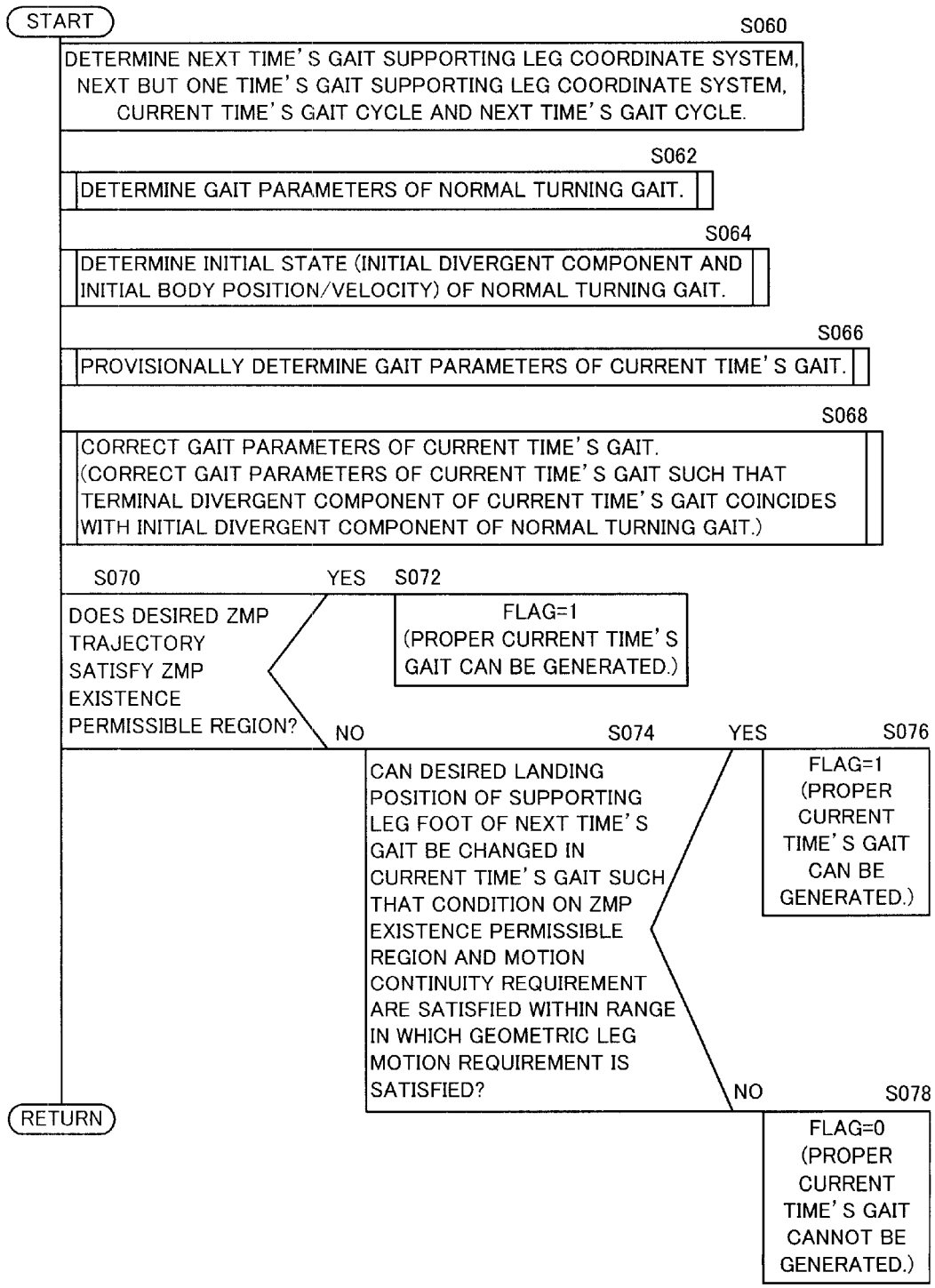
FIG. 12 is a flowchart illustrating the subroutine processing in S040 or S046 of FIG. 11.

In this step S040, the processing illustrated by the flowchart of FIG. 12 is carried out. More specifically, the gait generator 100 first determines in S060 a next time's gait supporting leg coordinate system, a next but one time's gait supporting leg coordinate system, a current time's gait cycle, and a next time's gait cycle that define the desired landing position/posture of the foot 22 of the leg 2 expected to be the supporting leg in the next time's gait (one step ahead), the desired landing position/posture of the foot 22 of the leg 2 expected to be the supporting leg in the next but one time's gait (two steps ahead), the desired landing time of the foot 22 of the leg 2 expected to be the supporting leg of the next time's gait, and the desired landing time of the foot 22 of the leg expected to be the supporting leg of the next but one time's gait, respectively.

Here, the landing position/posture of the foot 22 may be, for example, the position/posture at the instant of landing of the foot 22. However, in the description of the present embodiment, for the sake of understanding, the landing position/posture of the foot 22 will mean the position/posture of the foot 2 in the state wherein substantially the entire bottom surface of the foot 22 is in contact with a floor surface when the foot 22 is landed and then turned without causing the foot 22 to slip, i.e., the landing position/posture of the foot 22 will mean the aforesaid basic landing position/posture. Further, the landing time of the foot 22 in the description of the present embodiment will mean the time of the instant the foot 22 lands. The position/posture of the foot 22 at the instant of landing may coincide with the basic landing position/posture.

Determining the supporting leg coordinate system will specifically mean determining the position of the origin of the supporting leg coordinate system and the posture of the supporting leg coordinate system (the direction of each coordinate axis). In this case, the supporting leg coordinate system and the basic landing position/posture are defined by the relationship described above, so that determining the supporting leg coordinate system is equivalent to determining the desired landing position/posture of the foot 22 of the leg 2 that will be the supporting leg.

Further, the current time's gait cycle is the duration from the start to the end of a current time's gait, and the next time's gait cycle is the duration from the start to the end of a next time's gait. Hence, determining the current time's gait cycle and the next time's gait cycle is equivalent to determining the desired landing time of the foot 22 of the supporting leg in the next time's gait and the desired landing time of the foot 22 of the supporting leg in the next but one time's gait.

In S060, the supporting leg coordinate system and the gait cycle are determined on the basis of the instruction information related to the motion of the robot 1 (the information instructing, for example, the traveling route, the traveling velocity, the traveling direction, and the traveling plan of the robot 1) supplied from, for example, a controller, a server or the like outside the robot 1 to the control unit 26, or stored and retained beforehand in the control unit 26, and the operation mode of the current time's gait finally determined at the time of the processing for generating a last time's gait.

In this case, the legs 2 of the robot 1 are subjected to the geometric (kinematic) restrictions attributable primarily to the joints of the legs 2 and the constructions of the actuators that drive the joints, enabling the legs 2 to move only within the movable range defined by the restrictions. The restrictive condition (hereinafter referred to as the geometric leg motion requirement) is, for example, a restrictive condition that the displacement amount (the rotational angle) of each joint does not deviate from a predetermined range defined on the basis of the constructions or the like of the joints and the driving systems thereof and that the right and left legs 2R and 2L do not interfere with each other.

Thus, the gait generator 100 restricts the landing position/posture (specifically, the relative landing position/posture with respect to the supporting leg coordinate system in each gait) of the foot 22 of the supporting leg in the next gait following each gait and each gait cycle to predetermined ranges. Further, in S060, the gait generator 100 determines the supporting leg coordinate systems of the next time's gait and the next but one time's gait and the gait cycles of the current time's gait and the next time's gait such that the requirements on the traveling route, the traveling velocity and the like defined by the aforesaid instruction information are satisfied as much as possible within the aforesaid restrictions.

To be more specific, according to the present embodiment, the geometrically permissible landing region 22G, which is the permissible region of the desired landing position of the foot 22 of the leg 2 expected to be the supporting leg in a next time's gait and the next but one time's gait, is set on a floor surface recognized from the Information on a floor configuration in the operating environment of the robot 1 in order to determine the supporting leg coordinate system of a next time's gait and the supporting leg coordinate system of a next but one time's gait within the range in which the geometric leg motion requirement can be satisfied. The information on a floor configuration is the information input as appropriate to the control unit 26 from a server or the like outside the robot 1, or the information acquired by the control unit 26 through a visual sensor, such as an imaging camera mounted on the robot 1 or from a map.

The geometrically permissible landing regions 22G are the regions wherein the positions/postures (the relative positions/postures with respect to the supporting leg coordinate system of each gait) and the shapes corresponding to each of the gait of both legs alternately leaving from/landing on a floor and the one-leg hopping gait determined are determined beforehand, as illustrated in, for example, FIGS. 13(a) and 13(b) and FIG. 14.

FIG. 13(a) illustrates the geometrically permissible landing region 22LG (22LG is used to indicate left leg 2L) of the left leg 2L, which will be the next supporting leg in the state wherein the current supporting leg is the right leg 2R in the gait of both legs alternately leaving from/landing on a floor. FIG. 13(b) illustrates the geometrically permissible landing region 22RG (22RG is used to indicate right leg 2R) of the right leg 2R, which will be the next supporting leg in the state wherein the current supporting leg is the left leg 2L in the gait of both legs alternately leaving from/landing on a floor. These geometrically permissible landing regions 22LG, 22RG are laterally symmetrical with respect to the supporting leg coordinate systems. Incidentally, these geometrically permissible landing regions 22LG, 22RG may alternatively be set to differ, depending on whether the gait of both legs alternately leaving from/landing on a floor is a walking gait or a running gait.

Further, FIG. 14 illustrates the geometrically permissible landing region 22RHG of the right leg 2R (or the geometrically permissible landing region 22LHG of the left leg 2L) which will be the next supporting leg in a state wherein the current supporting leg is the right leg 2R (or the left leg 2L) in a one-leg hopping gait. Incidentally, the illustrated geometrically permissible landing region 22RHG in the one-leg hopping gait has the same position/posture and shape relative to the supporting leg coordinate system regardless of whether the supporting leg 2 is the right or left leg. Alternatively, however, the shape of the region when the supporting leg is the right leg 2R and the shape of the region when the supporting leg is the left leg 2L may be symmetrical.

The geometrically permissible landing region 22G that restricts the desired landing position of the foot 22 of the supporting leg in the next time's gait is set on the supporting leg coordinate system of the current time's gait according to the operation mode of the current time's gait. More specifically, if the operation mode of the current time's gait is the operation mode of both legs alternately leaving from/landing on a floor. then the geometrically permissible landing region 22G is set as illustrated in FIG. 13(a) or FIG. 13(b) depending on whether the supporting leg of the current time's gait is the right leg 2R or the left leg 2L. If the operation mode of the current time's gait is the one-leg hopping operation mode, then the geometrically permissible landing region 22HG is set as illustrated in FIG. 14.

The geometrically permissible landing regions 22G, 22HG illustrated in FIG. 13 and FIG. 14 apply to a case where the floor surfaces are flat. If the region of a floor surface in which the leg or legs 2 of the robot 1 can be landed is limited, as in the case where the information on a floor configuration indicates a floor surface with stepping-stones or with an obstacle installed thereon, then the region wherein the limited region of the floor surface and the regions illustrated in FIG. 13 and FIG. 14 overlap with each other may be set as the geometrically permissible landing region 22G, 22HG.

Further, in order to restrict the desired landing posture of the foot 22 of the supporting leg in a next time's gait so as to satisfy the aforesaid geometric leg motion requirement, the gait generator 100 also sets a permissible landing posture range, which is the permissible range of the desired landing posture (a permissible landing posture range observed in the current time's gait supporting leg coordinate system). The permissible landing posture range is determined according as, for example, whether the operation mode of the current time's gait is the operation mode of both legs alternately leaving from/landing on a floor or the one-leg hopping operation mode and whether the supporting leg 2 in the current time's gait is the right leg or the left leg.

Subsequently, the gait generator 100 determines whether the desired landing position (the landing position observed in the current time's gait supporting leg coordinate system) of the foot 22 of the supporting leg in the next time's gait defined by the aforesaid instruction information and the operation mode of the current time's gait would deviate from the geometrically permissible landing region 22G set as described above. If the gait generator 100 determines that the desired landing position would deviate form the geometrically permissible landing region 22G, then the gait generator 100 limits the desired landing position to a position within the geometrically permissible landing region 22G (e.g., a position within the geometrically permissible landing region 22G that is closest to the landing position defined by the instruction information and the operation mode of the current time's gait) and determines the position of the origin of the next time's gait supporting leg coordinate system on the basis of the limited desired landing position.

Further, the gait generator 100 determines whether the desired landing posture (the landing posture observed in the current time's gait supporting leg coordinate system) of the foot 22 of the supporting leg in the next time's gait defined by the aforesaid instruction information and the operation mode of the current time's gait would deviate from the permissible landing posture range set as described above. If the gait generator 100 determines that the desired landing posture would deviate form the permissible landing posture range, then the gait generator 100 limits the desired landing posture to a posture within the permissible landing posture range (e.g., a posture within the permissible landing posture range that is closest to the landing posture defined by the instruction information and the operation mode of the current time's gait) and determines the posture (the directions in the X-axis and the Y-axis) of the next time's gait supporting leg coordinate system on the basis of the limited desired landing posture.

In a case other than the cases described above, the gait generator 100 determines the next time's gait supporting leg coordinate system on the basis of the desired landing position/posture of the foot 22 of the supporting leg in the next time's gait defined by the aforesaid instruction information and the operation mode of the current time's gait.

The gait generator 100 determines the next time's gait supporting leg coordinate system as described above and then sets the geometrically permissible landing region 22G that restricts the desired landing position of the foot 22 of the supporting leg in the next but one time's gait on the next time's gait supporting leg coordinate system. In this case, in S060 carried out during the processing in S040, the geometrically permissible landing region 22G that limits the expected landing position of the foot 22 of the supporting leg in the next but one time's gait is the region set on the assumption that the operation mode in the next time's gait will be the operation mode of both legs alternately leaving from/landing on a floor, i.e., the geometrically permissible landing region 22G illustrated in FIG. 13(a) or FIG. 13(b).

Further, the gait generator 100 sets the permissible landing posture range that limits the desired landing posture of the foot 22 of the supporting leg in the next but one gait on the next time's gait supporting leg coordinate system, assuming that the operation mode of the next time's gait is the operation mode of both legs alternately leaving from/landing on a floor. The setting method is the same as that in the case where the permissible landing posture range has been set on the current time's gait supporting leg coordinate system.

Subsequently, in the same manner as that for determining the next time's gait supporting leg coordinate system, the gait generator 100 uses the geometrically permissible landing region 22G and the permissible landing posture range to determine the next but one time's gait supporting leg coordinate system such that the landing position/posture coincide with or approximate to, as much as possible, the landing position/posture defined by the aforesaid instruction information and the operation mode of the next time's gait while restricting the landing position/posture of the foot 22 of the supporting leg in the next but one time's gait.

The geometrically permissible landing region 22G of the foot 22 of the leg 2 that will become the supporting leg in each gait may be set to change according to the landing posture of the foot 22. If the floor surface has stepping-stones or if the floor surface has an obstacle, then the geometrically permissible landing region 22G may be determined by reflecting the information on the floor configuration. If, for example, the leg 2 of the robot 1 cannot be landed on a floor surface or the floor surface has a region in which the leg 2 should not be landed, then the geometrically permissible landing region 22G may be set such that the region is excluded.

Further, regarding the gait cycle, the gait generator 100 determines whether the current time's gait cycle defined by the aforesaid instruction information and the operation mode of the current time's gait and the next time's gait cycle defined by the aforesaid instruction information and the operation mode of the next time's gait deviate from a permissible gait cycle range, which is a predetermined permissible range for restricting the displacement velocity or the like of a joint of each of the legs 2 in the current time's gait and the next time's gait, respectively.

If the current time's gait cycle or the next time's gait cycle deviates from the permissible gait cycle range, then the gait generator 100 forcibly limits the gait cycles to cycles within the permissible gait cycle range (e.g., cycles within the permissible gait cycle range that are closest to the gait cycle defined by the instruction information). If the current time's gait cycle defined by the aforesaid instruction information and the operation mode of the current time's gait and the next time's gait cycle defined by the aforesaid instruction information and the operation mode of the next time's gait do not deviate from the permissible gait cycle range, then the gait generator 100 determines the respective gait cycles directly as the current time's gait cycle and the next time's gait cycle, respectively.

The permissible gait cycle ranges of the current time's gait cycle and the next time's gait cycle are determined on the basis of the operation modes of the current time's gait and the next time's gait, respectively.

Figure 15:
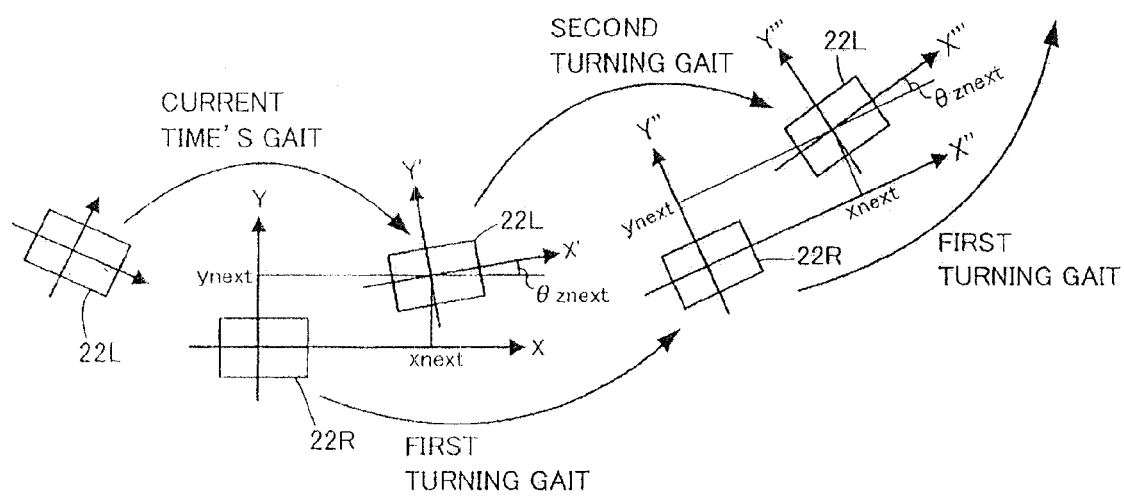
FIG. 15 is a diagram illustrating the landing position/posture of a foot of a robot and a supporting leg coordinate system in the gait of both legs alternately leaving from/landing on a floor.

The above has described in detail the processing in S060 carried out during the processing in S040. FIG. 15 illustrates the examples of the next time's gait supporting leg coordinate system and the next but one time's gait supporting leg coordinate system determined as described above. According to the illustrated examples, the operation mode of the current time's gait and the last time's gait is the same operation mode (the operation mode of both legs alternately leaving from/landing on a floor) as the operation mode of the next time's gait.

Supplementarily, the supporting leg coordinate system and the gait cycle determined in S060 are tentative and may be changed before the current time's gait is finalized.

Subsequently, the gait generator 100 proceeds to S062 wherein the gait generator 100 determines the gait parameters of a normal turning gait as a virtual cyclic gait following the current time's gait (a virtual cyclic gait, which is the future converging target of the current time's gait). The gait parameters in the present embodiment include a foot trajectory parameter that defines the desired foot position/posture trajectory in the normal turning gait, a reference body posture trajectory parameter that defines a reference body posture trajectory, an arm posture trajectory parameter that defines a desired arm posture trajectory, a ZMP trajectory parameter that defines a desired ZMP trajectory, a floor reaction force vertical component trajectory parameter that defines a desired floor reaction force vertical component trajectory, and a parameter that defines the permissible range of a desired floor reaction force horizontal component.

Here, the above term "the normal turning gait" means a cyclic gait in which no discontinuity occurs in the motional state of the robot 1 (the motional state, including the position/posture of each portion of the robot 1 and the changing rates thereof) at the boundary of a gait when the gait is repeated (the boundary of the gait of each cycle), as described in the embodiment of the aforesaid Japanese Patent No. 3674788. In other words, "the normal turning gait" is a cyclic gait that makes it possible to repeat the motion of the same pattern without causing discontinuity in a gait trajectory.

In the present embodiment, the normal turning gait, which is a cyclic gait, is a gait that covers two steps of the robot 1, i.e., a gait that consists of a first turning gait following a current time's gait and a second turning gait that follows the first turning gait. These two turning gaits constitute one-cycle gait. The normal turning gait repeats the one-cycle gait at certain intervals.

The operation mode of the robot 1 in the first turning gait and the second turning gait of the normal gait should coincide with the operation mode of the next time's gait.

To supplementarily describe the normal turning gait (hereinafter referred to simply as the normal gait in some cases), in a gait wherein the supporting leg and the free leg are alternately switched between the two legs, as in the gait of both legs alternately leaving from/landing on a floor (the walking gait or the running gait), the gait for one cycle of the normal gait is required to include a gait for at least two steps.

Meanwhile, in the one-leg hopping gait in which the supporting leg and the free leg are retained by the same leg 2, the gait for one cycle of the normal gait may be a gait for one step. According to the present embodiment, however, the gait for one cycle of the normal gait is a gait for two steps even in the one-leg hopping gait in order to match the processing for generating the one-leg hopping gait with the processing for generating the gait of both legs alternately leaving from/landing on a floor. In this case, according to the present embodiment, the first turning gait and the second turning gait (more precisely, a first turning gait observed from a next time's gait supporting leg coordinate system and a second turning gait observed from a next but one time's gait supporting leg coordinate system) in the normal gait of the one-leg hopping gait are the gaits of the same pattern.

In the present embodiment, regardless of whether the gait of both legs alternately leaving from/landing on a floor or the one-leg hopping gait is generated, the divergent component defined by expression 10 given below is used as an index for generating a desired gait that enables the robot 1 to accomplish a continuous motion, as with the embodiment in the aforesaid Japanese Patent No. 3674788. Incidentally, $\omega 0$ denotes a predetermined value.

Divergent component=Horizontal position of body mass point+Horizontal velocity of body mass point/$\omega 0$         Expression 10

Further, the gait generator 100 determines the initial divergent component of the normal gait (the value of the divergent component at the start time of the normal gait), and then generates a current time's gait, aiming to make the terminal divergent component of the current time's gait (the value of the divergent component at the end time of the current time's gait) meet the above initial divergent component. Thus, the current time's gait that can be converged to a normal gait in the future is generated.

Figure 16:
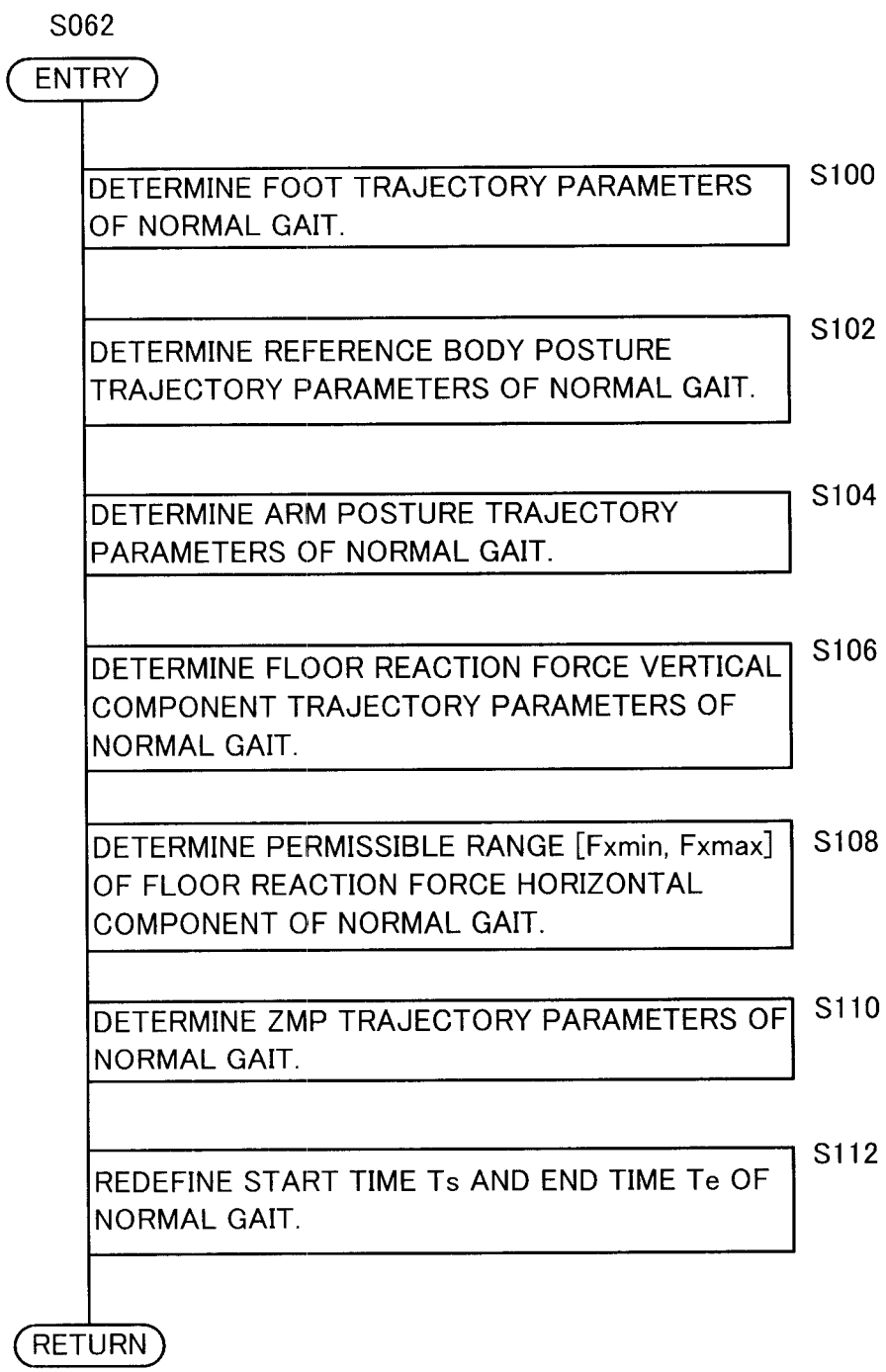
FIG. 16 is a flowchart illustrating the subroutine processing in S062 of FIG. 12.

Returning to the main subject, in S062, the gait generator 100 carries out the subroutine processing illustrated in the flowchart of FIG. 16. The processing illustrated by the flowchart of FIG. 12 is carried out during the processing in S040 on the assumption that the operation mode of the next time's gait is the operation mode of both legs alternately leaving from/landing on a floor, so that the operation mode of the normal gait is accordingly the operation mode of both legs alternately leaving from/landing on a floor. Hence, the normal gait in the description of the processing in S040 is a gait of both legs alternately leaving from/landing on a floor.

First, in S100, the gait generator 100 determines a foot trajectory parameter of the gait parameters of the normal gait such that the foot position/posture trajectory connects in the order of the current time's gait, the first turning gait, and the second turning gait.

In the present embodiment, the foot position/posture trajectory in each gait is generated using a finite-duration setting filter, as with the case where a foot position/posture trajectory is generated in the embodiment of the aforesaid Japanese Patent No. 3674788. Therefore, the foot trajectory parameter of the normal gait is constructed of the position/posture of each of the supporting leg foot and the free leg foot at the start and the end of each of the first turning gait and the second turning gait and the gait cycle of each turning gait.

The method for setting the foot trajectory parameter when the normal gait is the gait of both legs alternately leaving from/landing on a floor (the walking gait or the running gait) may be the same as the method described by the applicant of the present application in, for example, the aforesaid Japanese Patent No. 3674788 or Japanese Patent No. 3726081.

Here, taking a case where the normal gait is the running gait as an example, a further specific method for setting the foot trajectory parameter will be described below with reference to FIG. 15.

In the following description, the foot 22 of the leg 2 on the supporting leg side will be referred to as the supporting leg foot 22, while the foot 22 of the leg 2 on the free leg side will be referred to as the free leg foot 22. The "start" and the "end" of a gait will mean the start time and the end time, respectively, of the gait or instantaneous gaits at the start time and the end time.

In the foot trajectory parameter, the free leg foot position/posture at the start of the first turning gait are defined as the supporting leg foot position/posture at the end of the current gait observed from a next gait supporting leg coordinate system.

In this case, in the running gait, the supporting leg foot 22 at the end of the current gait is moving in the air. Further, the supporting leg foot position/posture at the end of the current gait is determined by generating a foot position/posture trajectory (more specifically, a trajectory observed from the next time's gait supporting leg coordinate system) from the supporting leg foot position/posture at the start of the current gait (=the free leg foot position/posture at the end of a last time's gait) to a free leg foot position/posture at the end of the next time's gait, which is determined on the basis of the desired landing position/posture of the supporting leg foot 22 in the next but one time's gait (the free leg foot in the next time's gait) (or the position/posture of the next but one time's gait supporting leg coordinate system), to the end of the current time's gait. In this case, according to the present embodiment, the foot position/posture trajectory is generated by using a finite-duration setting filter, as with the case where the foot position/posture trajectory is generated in the embodiment of the aforesaid Japanese Patent No. 3674788.

The free leg foot position/posture at the end of the next time's gait are the position/posture of the supporting leg foot 22 in the next but one time's gait (the free leg foot 22 in the next time's gait) in a state wherein the toes thereof are up while the heel thereof is in contact with the ground, and are determined such that the position/posture obtained by turning the foot 22 in the pitch direction from the above position/posture without causing the foot 22 to slip until substantially the entire bottom surface of the foot 22 comes in contact with the ground coincide with the aforesaid basic landing position/posture corresponding to the next but one time's gait supporting leg coordinate system.

Further, the supporting leg foot position/posture at the start of the first turning gait are the free leg foot position/posture at the end of the current time's gait observed from the next time's gait supporting leg coordinate system. In this case, the free leg foot position/posture at the end of the current time's gait are the position/posture of the free leg foot 22 in the current time's gait (the supporting leg foot 22 in the next time's gait) in a state wherein the toes thereof are up while the heel thereof is in contact with the ground, and are determined such that the position/posture obtained by turning the foot 22 in the pitch direction from the above position/posture without causing the foot 22 to slip until substantially the entire bottom surface of the foot 22 comes in contact with the ground coincide with the aforesaid basic landing position/posture corresponding to the next time's gait supporting leg coordinate system.

The free leg foot position/posture at the end of the first turning gait are the free leg foot position/posture at the end of the next time's gait observed from the next time's gait supporting leg coordinate system.

At the end of the first turning gait, the supporting leg foot 22 is off the floor and in the air. In order to determine the trajectory after the supporting leg foot 22 leaves the floor, the supporting leg coordinate system of a next but two time's gait corresponding to the desired landing position/posture of the supporting leg foot 22 in the first turning gait (the free leg foot 22 in the second turning gait) after the supporting leg foot 22 leaves the floor is set as illustrated in FIG. 15. The supporting leg coordinate system of the next but two time's gait is determined such that the relative position/posture relationship between the supporting leg coordinate system of the next but one time's gait and the supporting leg coordinate system of the next but two time's gait (the position/posture relationship expressed by xnext, ynext and θznext in FIG. 15) coincides with the relative position/posture relationship between the supporting leg coordinate system of the current time's gait and the supporting leg coordinate system of the next time's gait.

The supporting leg foot position/posture at the end of the first turning gait are determined by generating a foot position/posture trajectory from the supporting leg foot position/posture at the start of the first turning gait to the free leg foot position/posture at the end of the next but one time's gait determined on the basis of the aforesaid supporting leg coordinate system of next but two time's gait (more specifically, the trajectory observed from the supporting leg coordinate system of the next time's gait) until the end of the first turning gait by using the aforesaid finite-duration setting filter, as with the case where the supporting leg foot position/posture at the start of the first turning gait have been determined. In this case, the free leg foot position/posture at the end of the next but one time's gait are the position/posture of the supporting leg foot 22 in the next but two time's gait (the free leg foot 22 in the next but one time's gait) in a state wherein the toes thereof are up while the heel thereof is in contact with the ground, and are determined such that the position/posture obtained by turning the foot 22 in the pitch direction from the above position/posture without causing the foot 22 to slip until substantially the entire bottom surface of the foot 22 comes in contact with the ground coincide with the aforesaid basic landing position/posture corresponding to the supporting leg coordinate system of the next but two time's gait.

The free leg foot position/posture at the start of the second turning gait are the supporting leg foot position/posture at the end of the first turning gait observed from the supporting leg coordinate system of the next but one time's gait. The supporting leg foot position/posture at the start of the second turning gait are the free leg foot position/posture at the end of the first turning gait observed from the supporting leg coordinate system of the next but one time's gait.

The free leg foot position/posture at the end of the second turning gait are the free leg foot position/posture at the end of the current time's gait observed from the current time's gait supporting leg coordinate system. The supporting leg foot position/posture at the end of the second turning gait are the supporting leg foot position/posture at the end of the current time's gait observed from the supporting leg coordinate system of the current time's gait.

The gait cycles of the first turning gait and the second turning gait are set to be the same as the next time's gait cycle. The gait cycles of the first turning gait and the second turning gait do not necessarily have to be the same; however, both cycles are preferably determined on the basis of at least the next time's gait cycle.

This completes the description of the example of the foot trajectory parameter determined in S100 when the normal gait is the running gait.

Subsequently, the gait generator 100 proceeds to S102 wherein the gait generator 100 determines the reference body posture trajectory parameters that define the reference body posture trajectory to be followed by the body posture in the normal gait. The reference body posture trajectory corresponds to a long-term follow target of the body posture of the robot 1.

If the normal gait is the gait of both legs alternately leaving from/landing on a floor, then the reference body posture according to the present embodiment is set, for example, to the posture angle of the body 24 in a state wherein the direction of the body trunk axis of the body 24 of the robot 1 agrees with the vertical direction (the body posture angle when the robot 1 stands in an upright posture: the posture angle will be zero hereinafter). Then, the value of the posture angle is determined as the reference body posture trajectory parameter. The reference body posture angle in each turning gait of the normal gait does not necessarily have to be constant.

Subsequently, the gait generator 100 proceeds to S104 to determine arm posture trajectory parameters other than those related to the angular momentum changes of both arms about the Z axis (or the body trunk axis). For example, the parameters defining the trajectory of the relative center-of-gravity position of an entire arm in relation to the body 24 are determined as the arm posture trajectory parameters. In this case, according to the present embodiment, the relative center-of-gravity position of the entire arm is set to be maintained constant relative to the body 24.

Subsequently, the gait generator 100 proceeds to S106 to determine floor reaction force vertical component trajectory parameters. To be more specific, if the normal gait is, for example, the running gait, then the floor reaction force vertical component trajectory of the normal gait is set according to a pattern illustrated in, for example, FIG. 17. According to the pattern, in both the first turning gait and the second turning gait, the floor reaction force vertical component changes in a trapezoidal shape in a one-leg supporting period, and the floor reaction force vertical component is maintained at zero in a floating phase. The time of a breakpoint of the pattern and the height (peak value) of the trapezoidal portion are determined as the floor reaction force vertical component trajectory parameters.

The floor reaction force vertical component trajectory parameters are determined such that the mean value of the floor reaction force vertical components in the period equivalent to one cycle of the normal gait has the same magnitude as that of the gravitational force acting on the entire robot 1 and is in the opposite direction. This is because it is required to satisfy a condition that the initial state (the initial state of the first turning gait observed from the supporting leg coordinate system of the first turning gait of a normal gait) on all state amounts of the normal gait (the motional state amounts, including the position, the posture, and the velocity, of each portion of the robot 1) and the terminal state (the terminal state of the second turning gait observed from the supporting leg coordinate system of the first turning gait that follows the second turning gait of the normal gait) agree with each other (the condition will be hereinafter referred to as the boundary condition of a normal gait).

Incidentally, the floor reaction force vertical component trajectory when the normal gait is the walking gait may be set according to, for example, the pattern illustrated in FIG. 42 of the aforesaid Japanese Patent No. 3674788. Alternatively, the floor reaction force vertical component when the normal gait is the walking gait may be set, for example, to a constant value (a constant value having the same magnitude as that of the gravitational force acting on the entire robot 1) throughout the normal gait.

Subsequently, the gait generator 100 proceeds to S108 to set the permissible range [Fxmin, Fxmax] of the floor reaction force horizontal component (more specifically, the parameter defining the floor reaction force horizontal component) on the basis of the floor reaction force vertical component trajectory set as described above.

The permissible lower limit value Fxmin of the floor reaction force horizontal component and the permissible upper limit value Fxmax of the floor reaction force horizontal component, which are the boundary values of the permissible range [Fxmin, Fxmax], are set such that the magnitudes thereof (in absolute values) do not exceed the upper limit value of the magnitude of the frictional force that can be generated between the supporting leg foot 22 and the floor surface.

For example, Fxmin and Fxmax are set according to expressions 12a and 12b given below on the basis of the floor reaction force vertical component determined in S106. Here, for the sake of convenience of explanation, the floor surface is assumed to be a horizontal plane.

$$Fxmin = -ka^* \mu^* \text{Vertical component of floor reaction force} \quad \text{Expression 12a}$$

$$Fxman = ka^* \mu^* \text{Vertical component of floor reaction force} \quad \text{Expression 12b}$$

In these expressions 12a and 12b, "ka" denotes a positive constant (<1) and "μ" denotes the frictional coefficient between the foot 22 and the floor surface. In this case, for example, the values of expressions 12a and 12b (ka*μ) may be used as the parameters that define the permissible range of the floor reaction force horizontal component.

Figure 18:
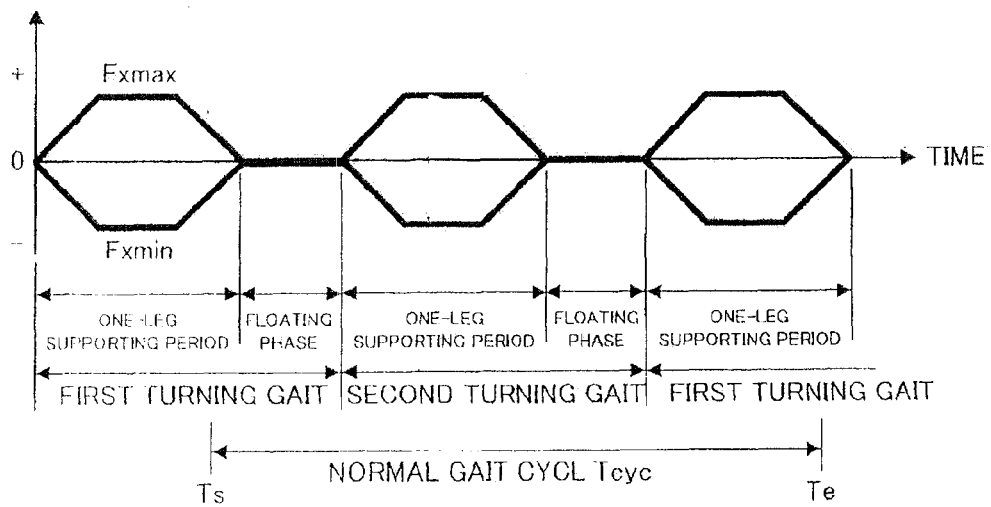
FIG. 18 is a graph illustrating an example of setting the permissible range of a floor reaction force horizontal component in the normal gait (the running gait or the one-leg hopping gait)

FIG. 18 illustrates, as an example, the permissible range [Fxmin, Fxmax] set as described above in the case where the normal gait is the running gait. The broken lines on the negative side in FIG. 18 denotes the permissible lower limit value of the floor reaction force horizontal component Fxmin, while the broken lines on the positive side denotes the permissible upper limit value of the floor reaction force horizontal component Fxmax.

The permissible range of the floor reaction force horizontal component [Fxmin, Fxmax] may be set by a different method as long as the range remains within the limits of the frictional force that can be generated between the foot 22 and the floor surface.

Subsequently, the gait generator 100 proceeds to S110 to determine ZMP trajectory parameters, which define a desired ZMP trajectory in a normal gait. The desired ZMP trajectory is determined such that the desired ZMP lies within a so-called supporting polygon (a smallest convex polygon that includes the ground contact surface (the surface in contact with a floor) of the robot 1), has a high stability allowance, and does not develop a sudden change.

Having a high stability allowance refers to a state wherein a desired ZMP lies at a position that is not excessively close to the boundary of the supporting polygon (the position in the vicinity of the center of the supporting polygon). More specifically, the supporting polygon provides the region of the surface of contact between the floor surface and the foot 22 of the leg 2 of the robot 1 in contact with the floor in a one-leg supporting period, while the supporting polygon provides the region formed of the combined surfaces of contact between the feet 22 and 22 of the two legs 2 and 2 and the floor surface in a two-leg supporting period.

Figure 19:
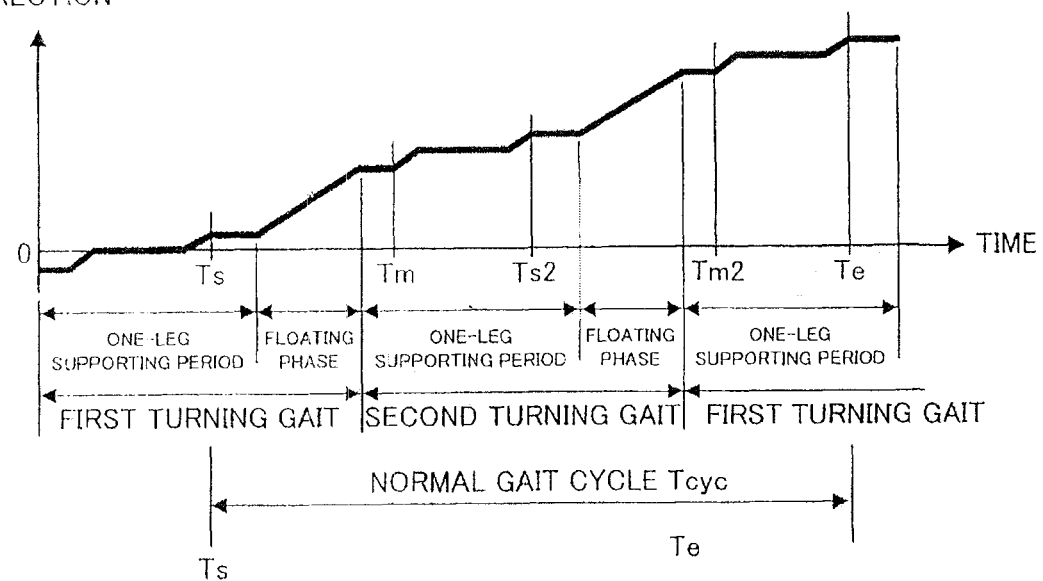
FIG. 19 is a graph illustrating an example of setting a desired ZMP trajectory in a normal gait (running gait)

As an example, the desired ZMP trajectory (specifically, the position of the desired ZMP in the X-axis direction) in the case where the normal gait is the walking gait is set according to the pattern illustrated in, for example, FIG. 19. According to this pattern, in both the first turning gait and the second turning gait, the position of the desired ZMP in the X-axis direction is set such that the position moves from the heel side to the toe side of the supporting leg foot 22 in the one-leg supporting period. In the one-leg supporting period, during the period in which substantially the entire bottom surface of the supporting leg foot 22 is in contact with the ground (in contact with a floor surface), the position of the desired ZMP in the X-axis direction is retained constant. In a floating phase, the position of the desired ZMP in the X-axis direction is set such that the position continuously moves to the position at which the next one-leg supporting period begins (the position on the heel side of the next supporting leg).

Although not shown, the position of the desired ZMP in the Y-axis direction in the running gait is set such that, for example, the position is maintained at the same position (a position right below an ankle joint) as the position of the ankle joint of a supporting leg in the Y-axis direction in the one-leg supporting period. Further, in the floating phase, the position of the desired ZMP in the Y-axis direction is set such that the position continuously moves to the position at which the next one-leg supporting period begins (the position of the ankle joint of the next supporting leg in the Y-axis direction).

According to the present embodiment, the position and the time of the broken dots of the ZMP trajectory set as described above are set as the parameters of the ZMP trajectory.

Subsequently, the gait generator 100 proceeds to S112 to re-define start time Ts and end time Te of one cycle of the normal gait as described below.

Figure 17:
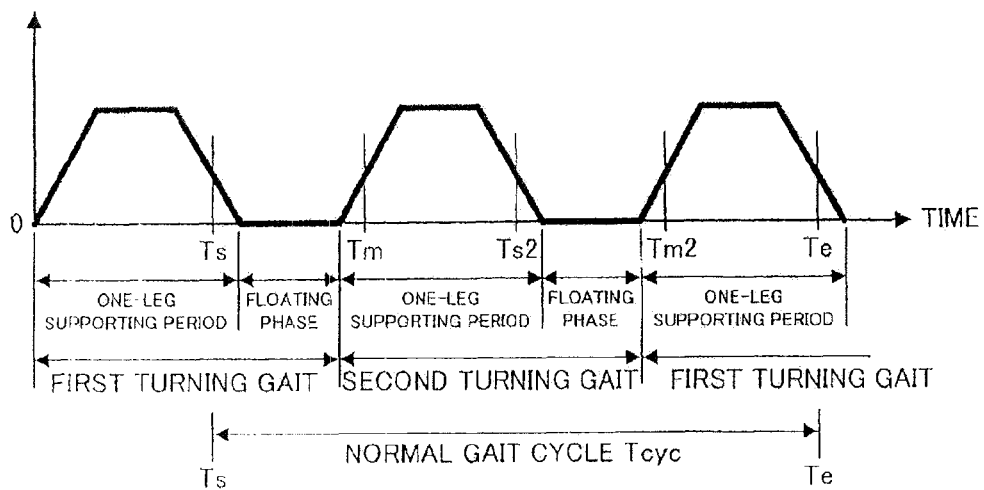
FIG. 17 is a graph illustrating an example of setting a desired floor reaction force vertical component trajectory in a normal gait (the running gait or the one-leg hopping gait)

In the present embodiment, in order to allow the normal gait to be easily determined, the start time Ts and the end time Te of one step of the normal gait are defined as illustrated in FIG. 17 until the normal gait is determined, for the sake of convenience. More specifically, time Ts at which the floor reaction force vertical component reduces to a certain extent in the latter half of the one-leg supporting period of the first turning gait is set as the start time Ts of the normal gait.

Further, the time obtained by adding one cycle Tcyc (the time equivalent to the total sum of the first turning gait and the second turning gait) of the normal gait to the start time Ts is set as the end time Te of the normal gait.

According to the present embodiment, after the normal gait is determined, the start time of the normal gait is returned to the original time (the time at which the supporting leg foot 22 landed). In the following description the original start time of the normal gait is set to zero so as to be distinguished from the aforesaid start time Ts, which is used until the normal gait is determined.

This completes the detailed description of the processing in S062 of FIG. 12 carried out in S040.

Returning to FIG. 12, after carrying out the processing in S062 as described above, the gait generator 100 proceeds to S064 to calculate the initial states of the normal gait. To be more specific, the initial states calculated here includes the initial body position and velocity (the initial body position and the initial body velocity), the initial divergent component, and the initial body posture angle and its angular velocity of the normal gait. These initial states are calculated exploratorily by the processing illustrated by the flowchart of FIG. 20.

First, in S200, the gait generator 100 determines the initial states (the states at the start time Ts) of the desired foot position/posture, the desired arm posture, and the desired body posture angle of the normal gait on the basis of the normal gait parameters (the normal gait parameters determined in S062 of FIG. 12). Here, the state means the set of a position or a posture and the temporal change rate thereof (the changing velocity of a position or a posture).

In this case, the initial states of the foot position/posture of a supporting leg and the initial states of the foot position/posture of a free leg are determined on the basis of the foot trajectory parameters determined in S100 of FIG. 16.

To be more specific, regarding the initial states of the foot position/posture of the supporting leg, the position/posture trajectory of the supporting leg foot 22 from the supporting leg foot position/posture at the start of the first turning gait to the supporting leg foot position/posture at the end of the first turning gait is generated using the finite-duration setting filter. Then, the position and the posture at the start time Ts in the foot position/posture trajectory and the changing velocities (the temporal change rates) of the position and the posture are determined as the initial states of the foot position/posture of the supporting leg.

Similarly, regarding the initial states of the foot position/posture of the free leg, the position/posture trajectory of the free leg foot 22 from the free leg foot position/posture at the start of the first turning gait to the free leg foot position/posture at the end of the first turning gait is generated using the finite-duration setting filter. Then, the position and the posture at the start time Ts in the foot position/posture trajectory and the changing velocities of the position and the posture are determined as the initial states of the foot position/posture of the free leg.

The initial state of the desired arm posture is determined by determining the arm posture (e.g., the position of the total center of gravity of both arms relative to the body 24) at time Ts on the basis of the arm posture trajectory parameter determined in S104 of FIG. 16 and the changing rate thereof.

Further, the reference body posture angle at time Ts defined by the reference body posture trajectory parameters determined in S102 of FIG. 16 and the angular velocity thereof are determined as the initial states of the desired body posture angle. In the present embodiment, the reference body posture angle when the normal gait is the gait of both legs alternately leaving from/landing on a floor takes a constant value, so that the initial state of the angular velocity of the desired body posture angle is zero.

Subsequently, the gait generator 100 proceeds to S202 to provisionally determine (Xs, Vxs) (Xs: horizontal position; Vxs: horizontal velocity), which are the candidates of the initial body horizontal position/velocity (the candidates of the horizontal position and the horizontal velocity of the body 24 at time Ts). The candidates (Xs, Vxs) provisionally determined here may be arbitrary and may be provisionally determined as, for example, the candidates (Xs, Vxs) of the body horizontal position/velocity in the initial state (the state at time Ts) of the normal gait determined when the last time's gait was generated.

To simplify the description, an example will be taken in which the initial state (the initial body horizontal position/velocity) of a normal gait in the X-axis direction on a sagittal plane (an XZ plane) is explored. However, in effect, the initial state of the normal gait (the initial state that satisfies the aforesaid boundary condition of the normal gait) must be explored separately or simultaneously in the X-axis direction and the Y-axis direction on both the position and the velocity.

As an exploratory determining technique, a method in which a pseudo Jacobian (sensitivity matrix) is determined and a next candidate is determined by a steepest descent method or the like, or a simplex method may be used. In the present embodiment, for example, the steepest descent method is used.

Subsequently, the gait generator 100 proceeds to S206 via S204 to determine initial body vertical position/velocity (Zs, Vzs), which is a pair of the vertical position (the position in the Z-axis direction) Zs and the vertical velocity (the velocity in the Z-axis direction) Vzs of the body 24 at the start time (time Ts) of the normal gait.

In the present embodiment, the initial body vertical velocity Vzs is determined, for example, as described below.

The following expression applies to the kinetic relationship for the robot 1.

Terminal total center of gravity vertical position − Expression 13
Initial total center of gravity vertical position =
Second-order integration of (Floor reaction force
vertical component/Overall mass of the robot) +
Second-order integration of gravitational acceleration +
Initial total center of gravity vertical
velocity ∗ Duration of one cycle (where the gravitational acceleration in expression 13 takes a negative value)

In the normal gait, a terminal total center of gravity vertical position and an initial total center of gravity vertical position coincide with each other, so that the right side of the above expression 13 must become zero. Thus, the initial total center of gravity vertical velocity can be determined from the relationship.

To be more specific, first, the floor reaction force vertical component calculated on the basis of the floor reaction force vertical component trajectory parameters set in S106 of FIG. 16 described above is divided by the overall mass of the robot 1, and then the obtained result is subjected to the second-order integration in the period of one cycle of the normal gait (the period from time Ts to time Te), thereby determining the total center of gravity movement amount (the first term of the right side of expression 13) based on the floor reaction force vertical component.

Further, the gravitational velocity is subjected to the second-order integration in the period of one cycle of the normal gait thereby to determine the total center of gravity movement amount (the second term of the right side of expression 13) based on the gravitational force. Then, the sign of the sum of the total center of gravity movement amount based on the floor reaction force and the total center of gravity movement amount based on the gravitational force, which have been determined as described above, is reversed, and the sum with the reversed sign is divided by the time of one cycle Tcyc of the normal gait to determine the initial total center of gravity vertical velocity.

Subsequently, in order to determine an initial body vertical position Zs, the total center of gravity vertical velocity at time 0 is determined according to expression 14 given below. In this case, the total center of gravity vertical velocity at time Ts in the following expression 14 is substituted by the value determined as described above according to expression 13. Further, the integration period is a period from time 0 to time Ts.

$$\begin{aligned}
&\text{Total center of gravity vertical velocity at time } Ts - \quad\text{Expression 14}\\
&\quad\text{Total center of gravity vertical velocity at time } 0 =\\
&\quad\quad\text{First-order integration of (Floor reaction force}\\
&\quad\quad\text{vertical component/Total mass of the robot)} +\\
&\quad\quad\text{First-order integration of gravitational acceleration}
\end{aligned}$$

(where the gravitational acceleration takes a negative value)

Subsequently, the body vertical position at time 0 is determined using, for example, the body height determining method previously proposed in Japanese Patent Application Laid-Open No. 10-86080 filed by the present applicant. At this time, the body vertical position (the body height) that prevents the knees of the legs 2, 2 from being fully stretched at time 0 is determined on the basis of the foot position/posture at time 0 (the supporting leg foot position/posture at the start of the first turning gait and the free leg foot position/posture at the start of the first turning gait determined in S100 of FIG. 16) and a predetermined geometric condition regarding the bending angle of the knee of each leg 2.

To be more specific, if the knee bending angle of the leg 2 on the supporting leg side is denoted by θsup and the knee bending angle of the leg 2 on the free leg side is denoted by θswg, then the body vertical position is determined such that, for example, the sum of the reciprocals of the sine values of the knee bending angles θsup and θswg is a predetermined value (a finite value). Here, the knee bending angles θsup and θswg denote the angles of the axial centers of the cruses relative to the axial centers of the thighs of the legs 2, and increase from zero as the knees are bent from the state wherein the legs 2 are fully stretched.

Subsequently, the total center of gravity vertical position at time 0 is determined from the body vertical position, the foot position/posture or the like at time 0 determined as described above. For example, the total center of gravity vertical position at time 0 is determined using a kinematics model based on the aforesaid expression 04 corresponding to the model illustrated in FIG. 9.

To be more specific, the vertical position of a body mass point 24m is determined from the body vertical position and the body posture angle at time 0. Further, the vertical positions of the supporting leg mass point 2m and the free leg mass point 2m are determined from the supporting leg foot position/posture and the free leg foot position/posture at time 0 (these are the supporting leg foot position/posture at the start of the first turning gait and free leg foot position/posture at the start of the first turning gait set in S100 of FIG. 16). Then, the vertical positions of the body mass point 24m, the supporting leg mass point 2m, and the free leg mass point 2m determined as described above are substituted into Zb, Zsup and Zswg of the above expression 04 thereby to determine the total center of gravity vertical position (ZGtotal of expression 04). A more precise model of the robot 1 (e.g., a model having a mass point corresponding to each link of the robot 1) may be used to determine the total center of gravity vertical position at time 0, considering also the body horizontal position and an arm posture at time 0.

Subsequently, in the aforesaid expression 13, the total center of gravity vertical position at time 0 determined as described above is substituted into the initial total center of gravity vertical position of the left side of the expression 13, and the total center of gravity vertical velocity at time 0 determined as described above is substituted into the initial total center of gravity vertical velocity of the right side of the expression 13. Further, the time of one cycle of the expression 13 is denoted by Ts (=duration from time 0 to time Ts) and the integration period is defined as the period from time 0 to time Ts so as to calculate the value of the terminal total center of gravity vertical position of the left side of expression 13. The calculated value indicates the initial (time Ts) total center of gravity vertical position.

Further, the initial (time Ts) body vertical position Zs is determined using a model of the robot 1 (e.g., the kinematics model based on expression 04) from the above determined initial (time Ts) total center of gravity vertical position and the foot position/posture at time Ts (the foot position/posture in the initial state determined in S200).

To be more specific, the vertical positions of the supporting leg mass point 2m and the free leg mass point 2m of the model illustrated in FIG. 9 are determined from the foot positions/postures of the supporting leg and the free leg at time Ts. Then, these vertical positions and the initial (time Ts) total center of gravity vertical position determined as described above are applied to expression 04 so as to determine the vertical position (Zb in expression 04) of the body mass point 24m. Further, the initial (time Ts) body vertical position Zs is determined from the vertical position of the body mass point 24m and the body posture at time Ts (the body posture in the initial state determined in S200). In this case also, a more precise model may be used to determine the initial body vertical position Zs, considering the body horizontal position and the arm posture.

Further, the initial (time Ts) body vertical velocity is determined using a model of the robot 1 (e.g., the kinematics model based on expression 04) mainly from the initial state of the foot position/posture determined in the above S200 and the initial total center of gravity vertical velocity determined in S206.

To be more specific, the initial total center of gravity vertical velocity determined on the basis of the aforesaid expression 13 and the vertical velocities of the supporting leg mass point 2m and the free leg mass point 2m defined by the initial states of the foot positions/postures of the supporting leg and the free leg, respectively, are applied to an expression obtained by subjecting both sides of expression 04 to temporal differentiation, thereby determining the vertical velocity of the body mass point 22m. Then, the body vertical velocity is determined from the vertical velocity of the body mass point 22m and the initial state of the body posture angle (determined in either S200 or S208, which will be discussed hereinafter).

Alternatively, in addition to the initial states of the foot positions/postures and the initial total center of gravity vertical velocity, the initial state of the arm posture (the one determined in S200), the provisionally determined initial state of the body horizontal position (the latest one provisionally determined in S202 or S216, which will be discussed later, or S218), and the initial body vertical position determined as described above may be taken into account when determining the initial body vertical velocity that satisfies the initial total center of gravity vertical velocity determined as described above by using a more precise model of the robot 1.

After the processing in S206, the gait generator 100 proceeds to S208 to provisionally generate a gait as a candidate of the normal gait (a gait for one cycle of the normal gait). More specifically, the desired ZMP, the desired floor reaction force vertical component, the desired foot position/posture, the reference body posture, the desired arm posture and the permissible range of the floor reaction force horizontal component at each instant (time at each predetermined notch time) from the start time Ts to the end time Te are sequentially determined on the basis of the gait parameters of the normal gait determined in S062 of FIG. 12.

Then, the body position/posture is sequentially determined using the dynamic model (the model shown in FIG. 9) such that the dynamic balance condition, which is related to the determined desired ZMP and desired floor reaction force vertical component, and the condition of the permissible range of the floor reaction force horizontal component are satisfied. Thus, the normal gait for one cycle from the start time Ts to the end time Te is generated.

In this case, the body horizontal position/velocity (Xs, Vxs) and the body vertical position/velocity (Zs, Vzs) are set to the initial (time Ts) states of the body 24. The body posture is generated such that the body posture coincides with the reference body posture as much as possible.

The generation of the normal gait in S208 is performed only in the gait generator 100 and the generated normal gait is not output from the gait generator 100.

Figure 21:
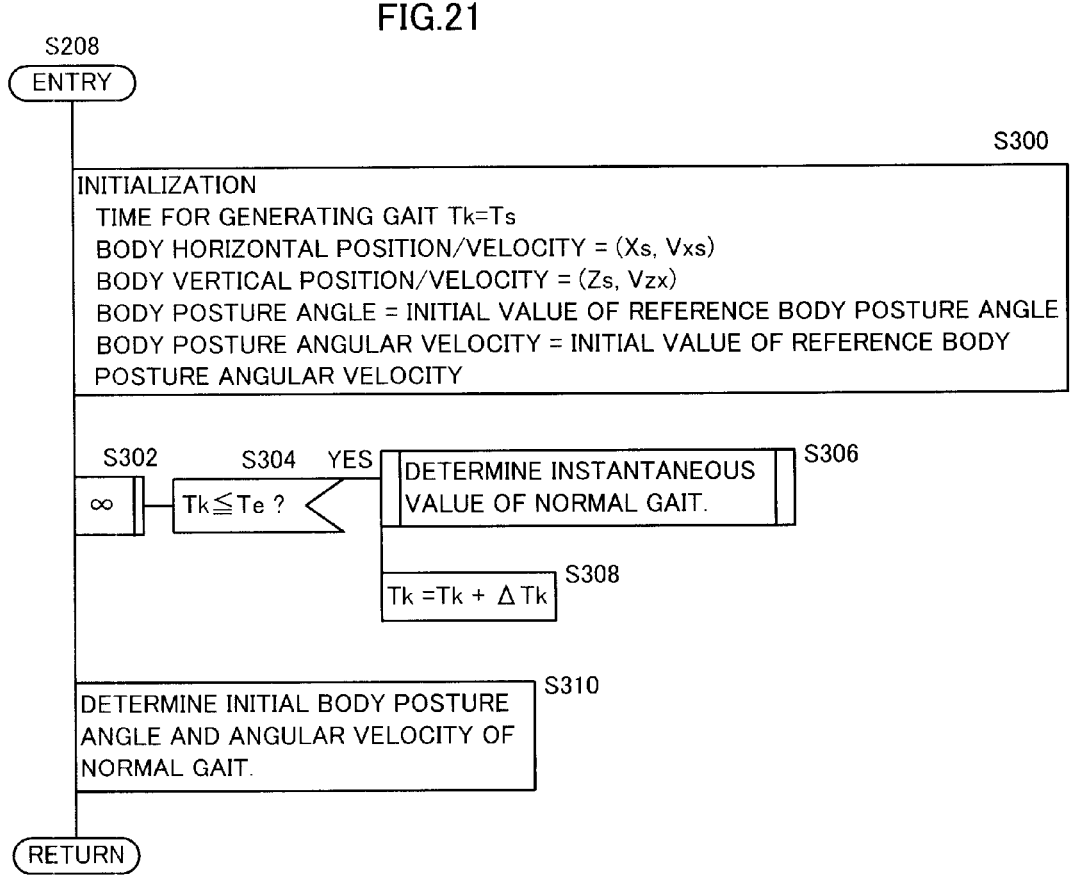
FIG. 21 is a flowchart illustrating the subroutine processing in S208 of FIG. 20.

To be more specific, the processing in S208 is executed as illustrated by the flowchart of FIG. 21.

The gait generator 100 first carries out various types of initialization in S300.

More specifically, the start time Ts of a normal gait is substituted into the time Tk for generating a gait. Further, the latest candidate value (the latest candidate value determined in S202 of FIG. 20 or S216 or S218, which will be discussed later) of the initial (time Ts) body horizontal position/velocity (Xs, Vxs) is substituted into the body horizontal position/velocity, and the latest value (the latest value determined in S206 of FIG. 20) of the initial (time Ts) body vertical position/velocity (Zs, Vzs) is substituted into the body vertical position/velocity. Further, the initial value of a reference body posture angle (the reference body posture at time Ts) is substituted into the body posture angle and the initial value of a reference body posture angular velocity (the reference body posture angular velocity at time Ts) is substituted into the body posture angular velocity. Supplementarily, as will be discussed hereinafter, the initial value of the initial (time Ts) body posture angular velocity is eventually changed, so that the initial value of the body posture angular velocity may be set to a value that is different from the initial value of the reference body posture angular velocity.

Subsequently, the gait generator 100 proceeds to S304 via S302 to determine whether the time Tk (the current value) for generating a gait is time before end time Te (=Ts+Tcyc), i.e., whether Tk≤Te. If the determination result is affirmative, then the gait generator 100 carries out the processing of S306 to S316 (the details will be discussed later) so as to determine the instantaneous value of the gait at time Tk.

Subsequently, the gait generator 100 proceeds to S308 to increase the time Tk for generating a gait by predetermined notch time ΔTk and then carries out the determination in S304 again. Here, the notch time ΔTk may be set to agree with, for example, a control cycle Δt. However, in order to reduce the calculation volume, ΔTk may be set to be longer than Δt.

If the determination result in S304 is negative, then the gait generator 100 proceeds to S310. By the processing described above, the normal gaits are generated from the start (time Ts) to the end (time Te) before the gait generator 100 proceeds to S310.

The detailed explanation of the processing for determining the instantaneous values of the normal gait in S306 will be given below with reference to the flowcharts of FIG. 22 and FIG. 23.

Figure 22:
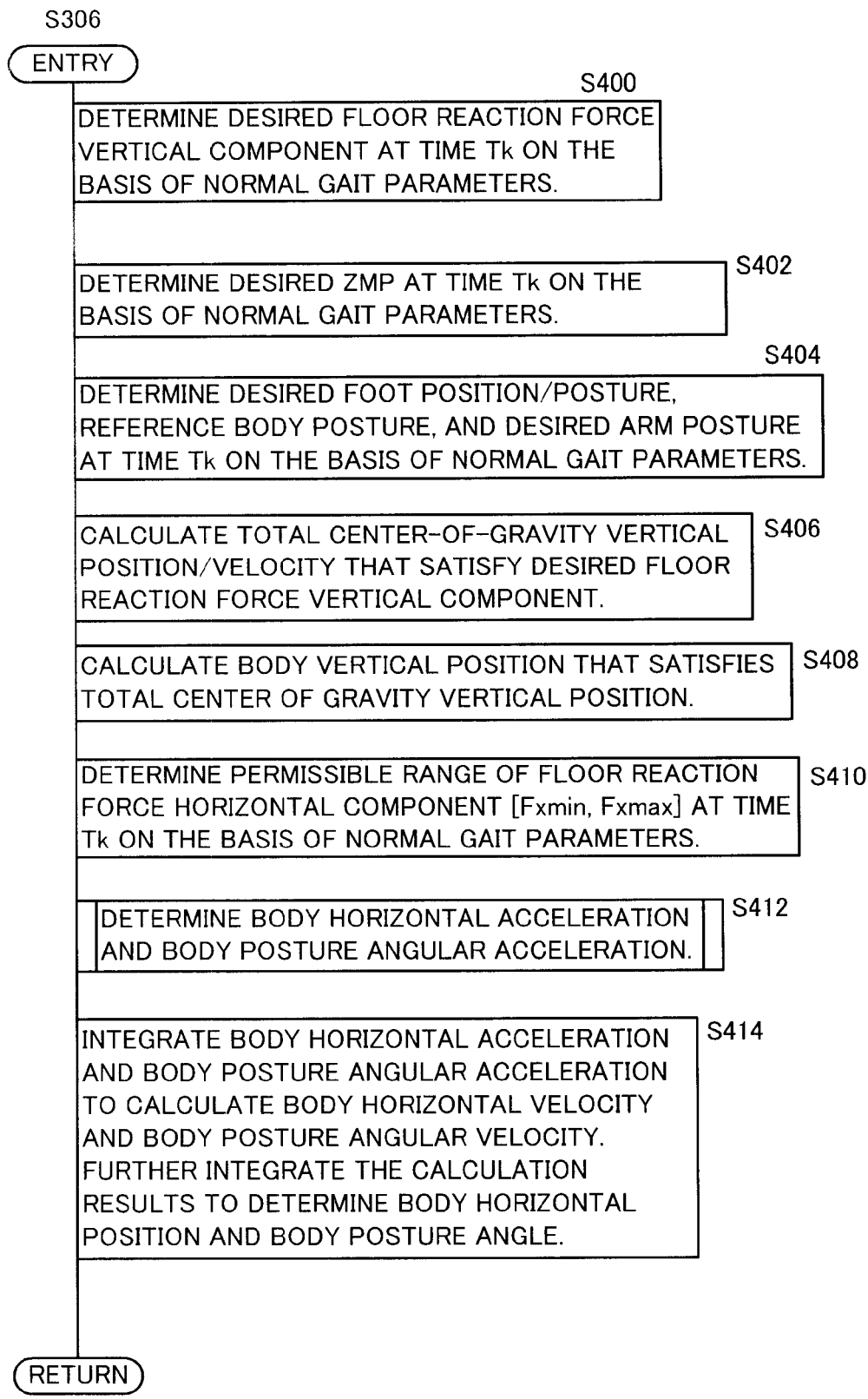
FIG. 22 is a flowchart illustrating the subroutine processing in S306 of FIG. 21.

The processing in S306 will be carried out as illustrated by the flowchart of FIG. 22.

First, in S400, the gait generator 100 determines an instantaneous value of the desired floor reaction force vertical component shown in FIG. 17 at time Tk on the basis of the normal gait parameters (more specifically, the floor reaction force vertical component trajectory parameters).

The gait generator 100 then proceeds to S402 to determine an instantaneous value of the desired ZMP at time Tk on the basis of the normal gait parameters (more specifically, the ZMP trajectory parameters).

Subsequently, the gait generator 100 proceeds to S404 to determine the instantaneous values of the desired foot position/posture, the reference body posture, and the desired arm posture, respectively, at time Tk on the basis of the normal gait parameters (more specifically, the foot trajectory parameter, the reference body posture trajectory parameter, and the arm posture trajectory parameter). Regarding the desired arm posture, however, more specifically, the total center of gravity positions of both arms are determined, whereas the motions of the arms (arm swinging motions) that lead to changes in the angular momentums about the vertical axis (or the body trunk axis of the body 24) are not yet determined.

Figure 20:
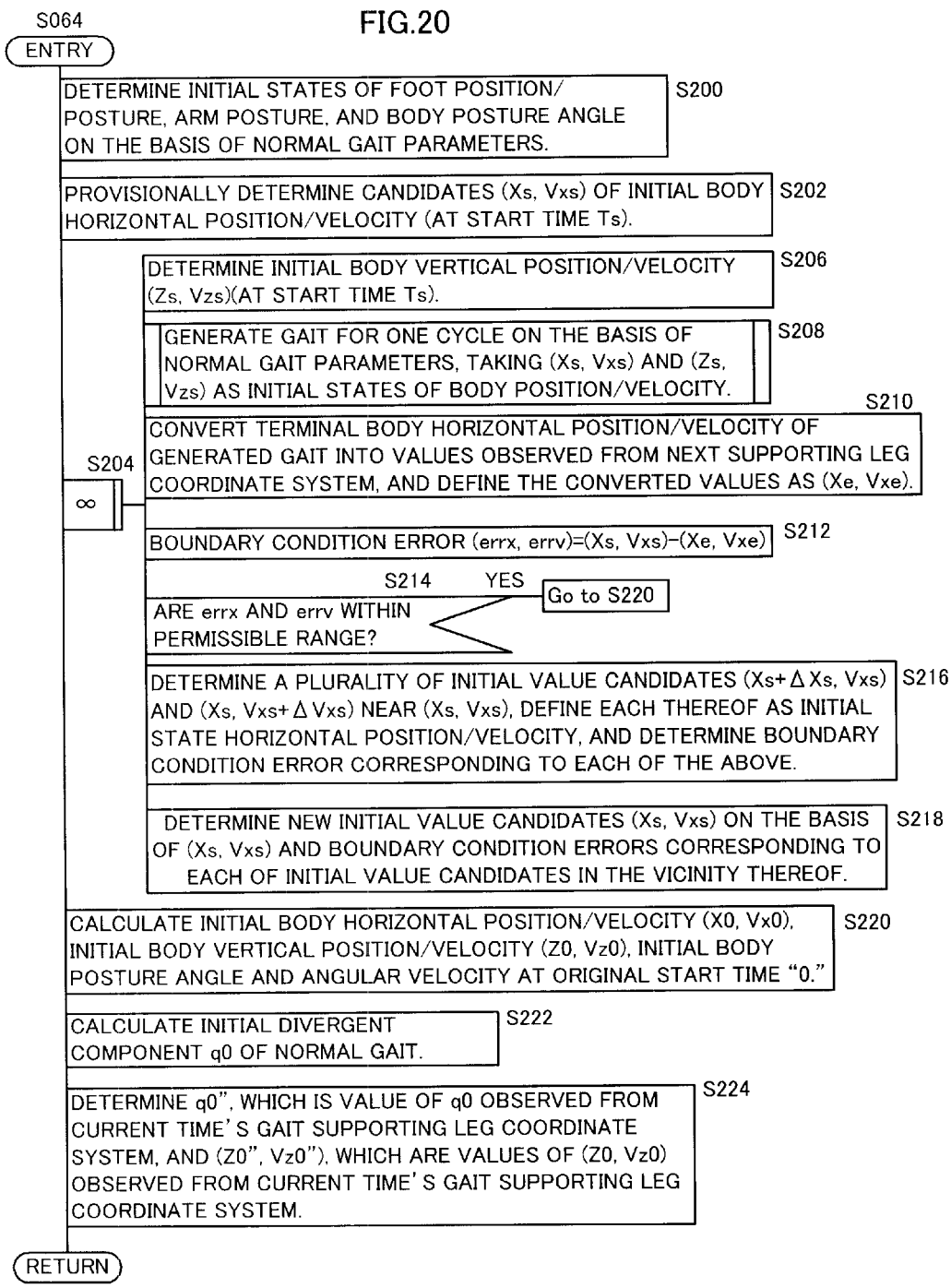
FIG. 20 is a flowchart illustrating the subroutine processing in S064 of FIG. 12.

The instantaneous values of the desired foot position/posture at time Tk are determined using the finite-duration setting filter, as with the case where the foot position/posture at the start time Ts are determined in S200 of FIG. 20.

Subsequently, the gait generator 100 proceeds to S406 to calculate the instantaneous values (the instantaneous value at time Tk) of the total center of gravity vertical position/posture that satisfy the desired floor reaction force vertical component (that causes the sum of the inertial force in the vertical direction of the robot 1 and the gravitational force to balance with the desired floor reaction force vertical component).

To be more specific, the total sum of the floor reaction force vertical component (≥0) and the gravitational force acting on the entire robot 1 (gravitational force<0 in this case) is divided by the total mass of the robot 1 to determine the total center of gravity vertical velocity (the acceleration of the total center of gravity in the vertical direction) of the robot 1.

Then, the total center of gravity vertical acceleration is integrated to calculate the total center of gravity vertical velocity at time Tk. Further, the total center of gravity vertical velocity is integrated to calculate the total center of gravity vertical position at time Tk. More specifically, these calculations are accomplished by expressions 15 and 16 given below.

$$\begin{aligned}\text{Total center of gravity vertical velocity at time } Tk = \\ \text{Total center of gravity vertical} \\ \text{velocity at time } (Tk - \Delta Tk) + \\ ((\text{Floor reaction force vertical component at} \\ \text{time } Tk / \text{Total mass of the robot}) + \\ \text{Gravitational acceleration}) * \Delta Tk\end{aligned} \quad \text{Expression 15}$$

$$\begin{aligned}\text{Total center of gravity vertical position at time } Tk = \\ \text{Total center of gravity vertical position} \\ \text{at time}(Tk - \Delta Tk) + \text{Total center of} \\ \text{gravity vertical velocity at time } Tk * \Delta Tk\end{aligned} \quad \text{Expression 16}$$

The gravitational acceleration in expression 15 takes a negative value.

Subsequently, the gait generator 100 proceeds to S408 to calculate the body vertical position that satisfies the total center of gravity vertical position at time Tk. To be more specific, the body vertical position is calculated according to, for example, the aforesaid expression 04 related to the model shown in FIG. 9. The vertical positions of the supporting leg mass point 2m and the free leg mass point 2m are determined from the desired foot positions/postures of the supporting leg and the free leg at time Tk. Then, these vertical positions of the supporting leg mass point 2m and the free leg mass point 2m and the vertical position of the total center of gravity at time Tk determined in S406 are applied to expression 04 so as to determine the vertical position of the body mass point 24m. Further, the body vertical position is determined on the basis of the determined body mass point 24m and the desired body posture angle at time (Tk−ΔTk) (or the predicted value of the desired body posture angle at time Tk).

Alternatively, the body vertical position may be determined using a model having a more precise model (e.g., a model having mass points corresponding to individual links of the robot 1).

Subsequently, the gait generator 100 proceeds to S410 to calculate the instantaneous values of the permissible range of the floor reaction force horizontal component [Fxmin, Fxmax] illustrated in FIG. 18 at time Tk on the basis of the normal gait parameters (more specifically, the parameters that define the permissible range of the floor reaction force horizontal component).

The gait generator 100 then proceeds to S412 to determine the body horizontal acceleration and the body posture angular acceleration at time Tk. In this case, the body horizontal acceleration and the body posture angular velocity are determined such that a condition that the floor reaction force horizontal component Fx balancing out the horizontal inertial force of the robot 1 does not deviate the permissible range [Fxmin, Fxmax] and a condition that the body posture angular velocity at the start time Ts of the normal gait agrees with the body posture angular velocity at the end time Te thereof are satisfied in addition to satisfying the desired ZMP (more specifically, satisfying a condition that the horizontal component of a moment generated about a desired ZMP due to the resultant force of the inertial force generated by a desired motion of the robot 1 and the gravitational force acting on the robot 1).

Figure 23:
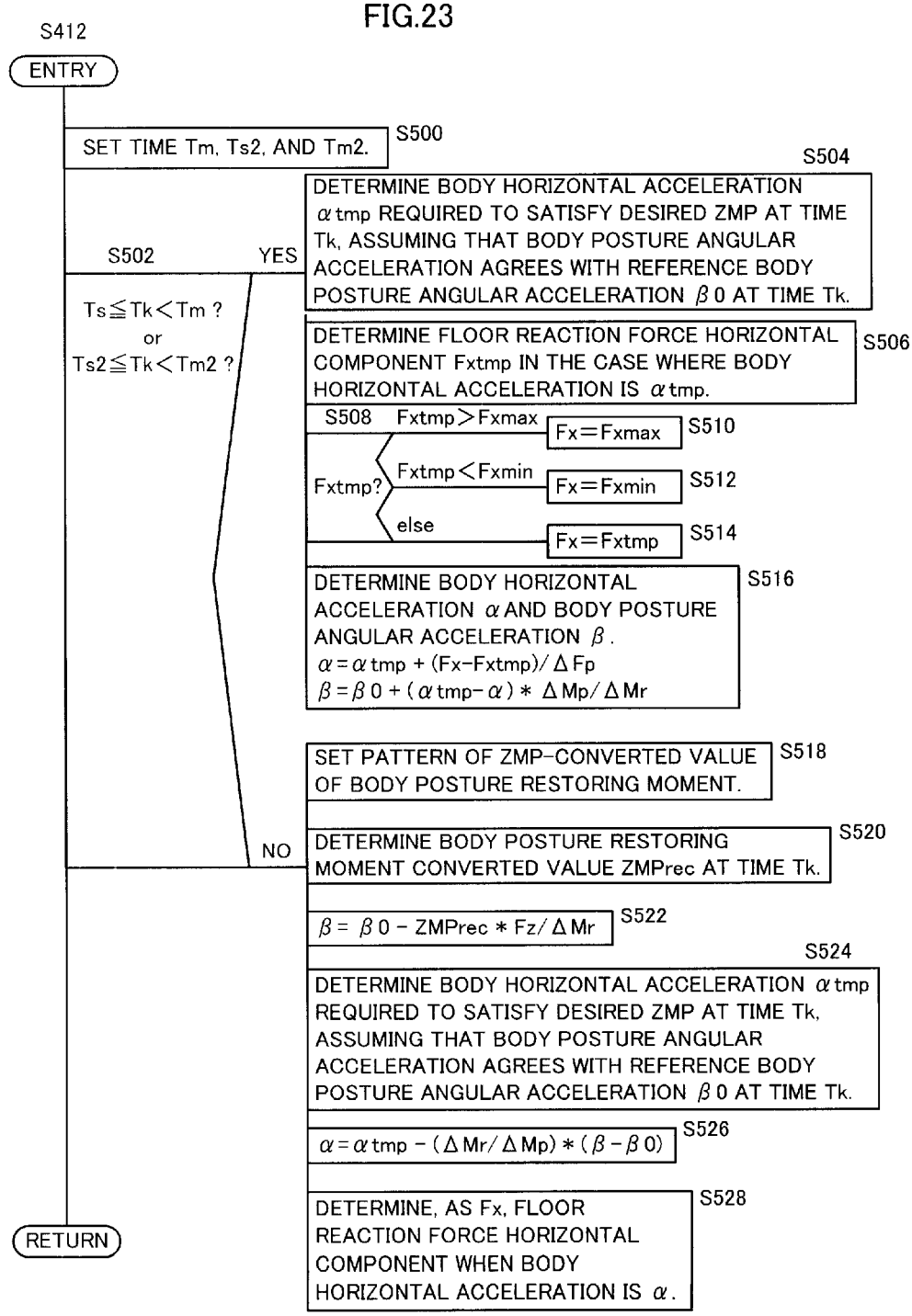
FIG. 23 is a flowchart illustrating the subroutine processing in S412 of FIG. 22.

As an example, in the case where the normal gait is a running gait, the processing in S412 is carried out as illustrated by the flowchart of FIG. 23.

First, in S500, the gait generator 100 sets time Tm, Ts2, and Tm2 shown in FIG. 17. In the present embodiment, time Tm is set to the time at which the floor reaction force vertical component has increased to a predetermined magnitude immediately after the second turning gait starts. Time Ts2 is set to the time at which the floor reaction force vertical component has decreased to a certain extent in the latter half of a one-leg supporting period of the second turning gait. Time Tm2 is set to the time at which the floor reaction force vertical component has increased to a predetermined magnitude immediately after the first turning gait starts after the floating phase of the second turning gait.

Subsequently, the gait generator 100 proceeds to S502 to determine whether the current time Tk is either the time within the period from time Ts to Tm or the time within the period from time Ts2 to Tm2. If the determination result in S502 is affirmative (if the permissible range of the floor reaction force horizontal component at time Tk is relatively narrow or zero), then the gait generator 100 proceeds to S504. If the determination result in S502 is negative (if the permissible range of the floor reaction force horizontal component at time Tk is relatively wide), then the gait generator 100 proceeds to S518.

In the aforesaid S504, the gait generator 100 determines the body horizontal acceleration required to satisfy the desired ZMP at time Tk as αtmp on the assumption that the body posture angular acceleration at time Tk agrees with a reference body posture angular acceleration β0 (the angular acceleration of the reference body posture defined by the reference body posture trajectory parameters of the normal gait). The αtmp is determined using, for example, the aforesaid expression 03 related to the dynamic model illustrated in FIG. 9.

More specifically, for example, the time series of the desired foot position/posture determined by the current time Tk is used to determine the vertical accelerations of the supporting leg mass point 2m and the free leg mass point 2m at the current time Tk. In addition, the vertical positions of the supporting leg mass point 2m and the free leg mass point 2m are determined from the desired foot position/posture at the current time Tk.

Further, the desired body vertical position at the current time Tk is used to determine the vertical position of the body mass point 24m, and the time-series value of the desired body vertical position determined by the current time Tk is used to determine the vertical acceleration of the body mass point 24m at the current time Tk.

Then, the determined values are substituted into the aforesaid expression 03, and a body mass point horizontal acceleration d2Xb/dt2 calculated according to an expression, in which My and d2θby/dt2 of the expression 03 coincide with 0 and β0, respectively, is determined as the body horizontal acceleration αtmp.

According to the present embodiment, in the case where the normal gait is the gait of both legs alternately leaving from/landing on a floor, the reference body posture angle of the normal gait is a constant value as described above, so that the reference body posture angular acceleration β0 is always zero.

Supplementarily, the body horizontal acceleration αtmp that causes the horizontal component of a floor reaction force moment about a desired ZMP to become zero may be exploratorily determined using a more precise dynamic model.

Subsequently, the gait generator 100 proceeds to S506 to determine the floor reaction force horizontal component Fxtmp at time Tk by using a dynamic model in the case where the body horizontal acceleration is αtmp. In the present embodiment, Fxtmp is determined using expression 02 of the aforesaid dynamic model. More specifically, Fxtmp is determined according to the following expression 17, in which d2Xsup/dt2 and d2Xswg/dt2 denote the horizontal acceleration of a supporting leg foot mass point and the horizontal acceleration of a free leg foot mass point, respectively, at time Tk.

$$Fxtmp = mb*\alpha tmp + msup*d2Xsup/dt2 + mswg*d2Xswg/dt2 \qquad \text{Expression 17}$$

Subsequently, the gait generator 100 proceeds to S508 to determine the magnitude relationship between Fxtmp and the upper limit value Fxmax and the lower limit value Fxmin of the permissible range of the floor reaction force horizontal component at the current time Tk. Based on the determination result, the gait generator 100 determines the body horizontal acceleration α, the floor reaction force horizontal component Fx generated by the body horizontal acceleration α, and the body posture angular acceleration β as described below (S508 to S516).

If the relationship denoted by Fxtmp>Fxmax applies, then the gait generator 100 proceeds to S510 to determine Fx according to the following expression.

$$Fx = Fxmax \qquad \text{Expression 18}$$

If the relationship denoted by Fxtmp<Fxmin applies, then the gait generator 100 proceeds to S512 to determine Fx according to the following expression.

$$Fx = Fxmin \qquad \text{Expression 19}$$

If Fxtmp lies within the permissible range of the floor reaction force horizontal component [Fxmin, Fxmax], then the gait generator 100 proceeds to S514 to determine Fx according to the following expression.

$$Fx = Fxtmp \qquad \text{Expression 20}$$

In every case, the gait generator 100 subsequently proceeds to S516 to determine the body horizontal acceleration α and the body posture angular acceleration β according to the following expressions 21 and 22, respectively.

$$\alpha = \alpha tmp + (Fx - Fxtmp)/\Delta Fp \qquad \text{Expression 21}$$

$$\beta = \beta 0 + (\alpha tmp - \alpha) * \Delta Mp / \Delta Mr \qquad \text{Expression 22}$$

Here, ΔFp denotes the change amount in the floor reaction force horizontal component when the body horizontal acceleration is changed by a unit acceleration, ΔMp denotes the change amount in the horizontal component of a floor reaction force moment about a desired ZMP when the body horizontal acceleration is changed by a unit acceleration, and ΔMr denotes a change amount of the horizontal component of a floor reaction force moment about a desired ZMP when the body posture angular acceleration is changed by a unit angular acceleration without perturbing the total center of gravity of the robot 1. These ΔFp, ΔMp, and ΔMr take values determined according to 02a, 03a and 04a, respectively, given below on the basis of the aforesaid expressions 02, 03 and 04 related to the dynamic model shown in FIG. 9 according to the present embodiment.

$$\Delta Fp = mb \qquad \text{Expression 02a}$$

$$\Delta Mp = mb * (Zb - Zzmp) \qquad \text{Expression 03a}$$

$$\Delta Mr = J \qquad \text{Expression 04a}$$

Supplementarily, to enhance the accuracy of the kinetic calculation, it is preferable to determine the body posture angular acceleration β as described above, and then to determine the body horizontal acceleration α that satisfies the desired ZMP by a motion, which combines the body posture angular acceleration β and the body horizontal acceleration α, in an analytical or exploratory manner by using a more precise dynamic model. In this case, as an exploratory determining technique, for example, a method in which a pseudo Jacobian (sensitivity matrix) is determined and a next candidate is determined by the pseudo-Newton method or the like, or a simplex method may be used.

Alternatively, in order to strictly prevent the floor reaction force horizontal component Fx from exceeding the permissible range of the floor reaction force horizontal component [Fxmin, Fxmax], the pair of the body horizontal acceleration α and the body posture angular acceleration β may be determined in the exploratory manner in S510 such that Fx=Fxmax applies and the horizontal component of the floor reaction force moment about the desired ZMP is zero. Similarly, in S512, the pair of α and β may be determined in an exploratory manner such that Fx=Fxmin applies and the horizontal component of the floor reaction force moment about the desired ZMP is zero.

If the processing in S504 to S514 described above causes Fxtmp to fall within the permissible range [Fxmin, Fxmax], then Fxtmp will be directly adopted as Fx. If Fxtmp exceeds the upper limit value Fxmax of the permissible range [Fxmin, Fxmax] or if Fxtmp is lower than the lower limit value Fxmin, then each Fx will be forcibly limited to Fxmax and Fxmin, respectively. Especially in the floating phase of the normal gait of the running motion or the one-leg hopping motion, Fxmax=Fxmin=0 always applies, so that Fx=0 results.

Further, the body posture angular acceleration β is determined such that a floor reaction force moment is generated, which cancels the floor reaction force moment generated about the desired ZMP due to restricting the body horizontal acceleration α so as to prevent Fx from exceeding the permissible range [Fxmin, Fxmax].

This completes the description of the processing carried out in the case where time Tk is time within the period from time Ts to Tm or time within the period from time Ts2 to Tm2.

If the determination result in S502 is negative (Tm≤Tk<Ts2 or Tm2≤Tk<Te), then the gait generator 100 carries out the following processing. First, the gait generator 100 proceeds to S518 and sets the pattern of a ZMP-converted value (hereinafter referred to as the body posture restoring moment ZMP-converted value and abbreviated to ZMPrec) of a floor reaction force moment for generating a body posture angular acceleration for returning the body posture angular velocity to an initial value (the value at time Ts if current time Tk is before time Ts2 or the value at time Ts2 if current time Tk is not before time Ts2) by time Ts2 if current time Tk is before time Ts2 or by time Te if current time Tk is not before time Ts2.

In this case, the processing in the period wherein current time Tk is time Tm2 and after is the same as the processing in the period wherein current time Tk is Ts2 and before. Hence, the following will representatively describe the processing in the case of the period wherein current time Tk is time Ts2 and before.

The value at time Tk in the body posture angular acceleration pattern for returning the body posture angular velocity to the initial value (the value at time Ts) by time Ts2 after time Tm will be denoted by β(k).

At this time, a floor reaction force moment β(k)*ΔMr is generated due to the aforesaid β(k). As a result, if the floor reaction force vertical component at time Tk is denoted by Fz(k), then the horizontal position of ZMP(k) calculated from the motion of the robot 1 will deviate from the desired ZMP by ΔZMP(k) determined according to the following expression.

$$\Delta ZMP(k) = -\beta(k) * \Delta Mr / Fz(k) \qquad \text{Expression 23}$$

Thus, if the pattern of ΔMr and the pattern of Fz(k) are determined (or known), then the body posture angular velocity can be reset to the body posture angular velocity in the initial (time Ts) state of a reference body posture trajectory by generating the body posture angular acceleration pattern that satisfies expression 23 by properly setting the pattern of ΔZMP(k).

The aforesaid body posture restoring moment ZMP-converted value (ZMPrec) means the ΔZMP(k) properly set as described above. Strictly speaking, ΔMr in expression 23 does not take a fixed value. In the present embodiment, however, ΔMr is defined approximately as a fixed value (=J).

In this case, the relationship between β(k) and ZMPrec is given by the following expression 24.

$$\beta(k) = -ZMPrec * Fz(k) / \Delta Mr \qquad \text{Expression 24}$$

Hereinafter, the β(k) will be referred to as the body posture restoring angular acceleration.

Figure 24:
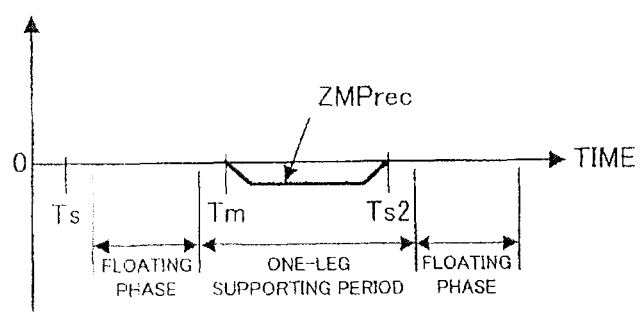
FIG. 24 is a graph illustrating an example of setting the pattern of a body posture restoring moment ZMP conversion value set in S518 of FIG. 23.

According to the present embodiment, the pattern of the aforesaid ZMPrec is formed to, for example, a trapezoidal shape as illustrated in FIG. 24. Then, the gait generator 100 determines the parameters (e.g., the height of the trapezoid) that define the pattern of ZMPrec such that the integrated value of the body posture angular acceleration β from time Ts to time Ts2 becomes zero in order to cause the body posture angular velocity at time Ts2 to agree with the body posture angular velocity at time Ts.

More specifically, the parameters that define the pattern of ZMPrec are determined such that the integrated value obtained by integrating the angular acceleration of the total sum of β(k) determined on the basis of ZMPrec according to expression 24 and the reference body posture angular acceleration β0 in the period from time Tm to time Ts2 agrees with the value obtained by multiplying the integrated value of the body posture angular acceleration β (the angular acceleration determined as described above in S504 to S516 of FIG. 23) in the period from time Ts to time Tm by −1.

In this case, according to the present embodiment, the gait generator 100 sets the time of breakpoint in the trapezoidal pattern of ZMPrec to specified (known) time between time Tm and time Ts2 and defines the height of the trapezoidal pattern as an unknown parameter defining the pattern. Then, the gait generator 100 determines the height of the pattern of ZMPrec that satisfies the aforesaid relationship. Thus, the height of the trapezoidal pattern is calculated as the parameter that defines the pattern of ZMPrec.

Subsequently, the gait generator 100 proceeds to S520 and calculates the body posture restoring moment ZMP-converted value ZMPrec at time Tk on the basis of the pattern of ZMPrec determined as described above.

Then, the gait generator 100 proceeds to S522 to calculate the body posture angular acceleration β at time Tk by adding the body posture restoring angular acceleration β(k) calculated according to the aforesaid expression 24 from the value of ZMPrec at time Tk to the reference body posture angular acceleration β0 at time Tk.

More specifically, β is calculated according to expression 24a given below.

$$\beta = \beta 0 + \beta(k) = \beta 0 - ZMPrec * Fz(k) / \Delta Mr \qquad \text{Expression 24a}$$

Subsequently, the gait generator 100 proceeds to S524 to carry out the same processing as that in S504 described above, thereby to determine, as αtmp, the body horizontal acceleration required to satisfy the desired ZMP at time Tk, assuming that the body posture angular acceleration at time Tk agrees with the reference body posture angular acceleration β0 at time Tk.

Subsequently, the gait generator 100 proceeds to S526 and calculates the body horizontal acceleration α according to expression 25 given below.

$$\alpha = \alpha tmp - (\Delta Mr / \Delta Mp) * (\beta - \beta 0) = \qquad \text{Expression 25}$$
$$\alpha tmp - (\Delta Mr / \Delta Mp) * \beta(k)$$

The gait generator 100 further proceeds to S528 and uses a dynamic model to determine the floor reaction force horizontal component Fx at time Tk in the case where the body horizontal acceleration is the α determined as described above. In this case, Fx is calculated according to the following expression 26 obtained by replacing αtmp of the right side of the aforesaid expression 17 by α.

$$Fx = mb*\alpha + msup*d2Xsup/dt2 + mswg*d2Xswg/dt2 \qquad \text{Expression 26}$$

Supplementarily, in order to enhance the accuracy of the kinetic calculation, it is preferable to determine the body posture angular acceleration β as described above, and then to determine the body horizontal acceleration α that satisfies the desired ZMP by a motion, which combines the body posture angular acceleration β and the body horizontal acceleration α, in an analytical or exploratory manner by using a more precise dynamic model in S526 after determining the body posture angular acceleration β as described above.

The processing in S518 to S528 described above is the processing carried out if the determination result in S502 is negative (Tm≤Tk<Ts2 or Tm2≤Tk<Te).

In this case, the permissible range of the floor reaction force horizontal component is sufficiently wide in the period from time Tm to time Ts2 and the period from time Tm2 to Te, so that it is possible to prevent the floor reaction force horizontal component Fx from deviating from the permissible range [Fxmin, Fxmax] even when the body posture angular acceleration β is determined to restore the body posture angular velocity while satisfying the desired ZMP.

Supplementarily, if the normal gait is a walking gait, then the frictional force that can be generated between the robot 1 and a floor surface will be relatively large (the permissible range of the floor reaction force horizontal component Fx will be relatively large) throughout the period of one cycle of the normal gait, so that even when the body horizontal acceleration is calculated by the same processing as that in S504, the floor reaction force horizontal component Fx corresponding to the calculated body horizontal acceleration is generally considered to remain within the limit of the frictional force that can be generated between the robot 1 and the floor surface.

Accordingly, in the case where the normal gait is a walking gait, in S412 of FIG. 22, for example, the body horizontal acceleration may be determined only by the processing in S504 to cause the body posture angular acceleration to agree with the reference body posture angular acceleration. Alternatively, however, also in the case where the normal gait is a walking gait, the same processing as that for a running gait may be carried out to determine the body horizontal acceleration and the body posture angular acceleration.

Subsequently, the gait generator 100 proceeds to S414 of FIG. 22 to determine the body horizontal velocity at time Tk by sequentially integrating, from time Ts to current time Tk, the body horizontal acceleration determined in S412. Further, the gait generator 100 sequentially integrates, from time Ts to current time Tk, the body horizontal velocity thereby to determine the body horizontal position at time Tk.

The gait generator 100 determines the body posture angular velocity at time Tk by sequentially integrating, from time Ts to current time Tk, the body posture angular acceleration determined in S412. Further, the gait generator 100 sequentially integrates, from time Ts to current time Tk, the body posture angular velocity thereby to determine the body posture angle at time Tk.

After carrying out the processing in S306 of FIG. 21 for determining the instantaneous values of the normal gait as described above, the gait generator 100 proceeds to S308 to increment the value of the gait generation time Tk by the notch time ΔTk.

Then, returning to S304, the gait generator 100 repeats the processing in S306 and S308 as long as the condition given in S304 holds. When the condition given in S304 no longer holds, i.e., when the end time Te (=Ts+Tcyc) is reached and the generation of the normal gait is completed, the gait generator 100 proceeds to S310.

In S310, the gait generator 100 corrects the initial (time Ts) body posture angle and the initial (time Ts) body posture angular velocity mainly on the basis of the body posture angle at the end time Te of the normal gait (hereinafter referred to as the provisional gait in some cases) generated by the processing in S300 to S308 as described above. This correction is made to satisfy the boundary condition of the normal gait related to the body posture angle and the angular velocity thereof (the condition that the body posture angle and the angular velocity thereof agree with each other at the start and the end of the normal gait).

In the present embodiment, the correction is made according to, for example, expressions 30 and 31 given below.

New initial body posture angular velocity =      Expression 30
    Initial body posture angular
    velocity of provisional gait −
(Terminal body posture angle of provisional gait −
    Initial body posture angle
        of provisional gait)/Tcyc New initial body posture angle =      Expression 31
    Initial value of reference body posture angle The terms "initial" and "terminal" in the above expressions 30 and 31 mean Time Ts and Te, respectively.

In the present embodiment, the initial body posture angle has been set to coincide with the initial value of the reference body posture angle, as indicated by expression 31. Alternatively, however, the initial body posture angle may be set such that, for example, the mean value of the body posture angles of the normal gait coincides with the initial value of the reference body posture angle. Further alternatively, the initial body posture angle may be set such that the mean value of the maximum and minimum values of the body posture angle of the normal gait coincides with the initial value of the reference body posture angle.

After completing the processing in S310 of FIG. 21, the gait generator 100 proceeds to S210 of FIG. 20. In this step S210, the gait generator 100 converts the terminal body horizontal position/velocity (the body horizontal position and the body horizontal velocity at time Te) of the normal gait (provisional gait) generated in S208 into values observed from the supporting leg coordinate system corresponding to the supporting leg at that instant, the values being denoted by (Xe, Vxe), in which Xe denotes the terminal body horizontal position and Vxe denotes the terminal body horizontal velocity.

Subsequently, the gait generator 100 proceeds to S212 to calculate the differences between the initial body horizontal position/velocity (Xs, Vxs) and the terminal body horizontal position/velocity (Xe, Vxe) as boundary condition errors (errx, errv). In a normal gait, the boundary condition must be satisfied, so that the boundary condition errors (errx, errv) must be zero or substantially zero.

Subsequently, the gait generator 100 proceeds to S214 to determine whether the boundary condition errors (errx, errv) calculated in S212 lie within a preset permissible range. Alternatively, instead of determining whether the boundary condition errors (errx, errv) lie within the permissible range as described above, the divergent component defined by the aforesaid expression 10 and the convergent component defined by an expression obtained by replacing "+" in the right side of the aforesaid expression 10 by "−" may be used to determine whether the difference between an initial divergent component (=Xs+Vxs/ω0) and a terminal divergent component (=Xe+Vxe/ω0) and the difference between an initial convergent component (=Xs−Vxs/ω0) and a terminal convergent component (=Xe−Vxe/ω0) lie within certain respective permissible ranges.

If the determination result in S214 is negative, then the gait generator 100 proceeds to S216 to determine, in an exploratory manner, (Xs, Vxs) that causes the boundary condition error (errx, errv) to become zero or substantially zero. In this step S216, the gait generator 100 determines a plurality of (two in the present embodiment) initial value candidates (Xs+ΔXs, Vxs) and (Xs, Vxs+ΔVxs) in the vicinity of (Xs, Vxs). Here, ΔXs and ΔVxs mean predetermined minute change amounts relative to Xs and Vxs, respectively.

Then, the normal gait is generated by the same processing as that in the aforesaid S208, taking these initial value candidates as the initial states of the body horizontal position/velocity. Further, values (Xe+ΔXe1, Vxe+ΔVxe1) and (Xe+ΔXe2, Vxe+ΔVxe2) are determined by converting the terminal body position/velocity of the generated normal gait into the values observed from the supporting leg coordinate system corresponding to the supporting leg at that instant (time Te). Here, (Xe+ΔXe1, Vxe+ΔVxe1) means the terminal body position/velocity corresponding to (Xs+ΔXs, Vxs), and (Xe+ΔXe2, Vxe+ΔVxe2) means the terminal body position/velocity corresponding to (Xs, Vxs+ΔVxs). In the processing for generating the normal gait (provisional gait) in this case, the initial states (the states at time Ts) of variables except for the body horizontal position/velocity may be set to be the same as in the case where, for example, the initial value candidates of the body horizontal position/velocity are (Xs, Vxs).

Further in S216, the same processing as that in the aforesaid S210 is carried out to determine the difference between each initial value candidate and its corresponding terminal body position/velocity, that is, the boundary condition errors (errx, errv) corresponding to the initial value candidates (Xs+ΔXs, Vxs) and (Xs, Vxs+ΔVxs), respectively.

Subsequently, the gait generator 100 proceeds to S218 to determine the next initial value candidates of (Xs, Vxs) by an exploratory method on the basis of the body horizontal position/velocity boundary condition errors relative to (Xs, Vxs) and the initial value candidates (Xs+ΔXs, Vxs) and (Xs, Vxs+ΔVxs) in the vicinity thereof (to determine the pseudo Jacobian (sensitivity matrix) and then determine the next candidates by a steepest descent method or the like, or a simplex method).

More specifically, a sensitivity matrix is determined. The sensitivity matrix indicates the degree of change in the body horizontal position/velocity boundary condition error observed when the body horizontal position and the body horizontal velocity are changed from their initial value candidates (Xs, Vxs) by minute amounts on the basis of the boundary condition errors relative to (Xs, Vxs) and the initial value candidates (Xs+ΔXs, Vxs) and (Xs, Vxs+ΔVxs) in the vicinity thereof. Then, based on the sensitivity matrix, initial value candidates (Xs, Vxs) that reduce the boundary condition errors are newly determined. After determining the new initial value candidates (Xs, Vxs) of the body horizontal position/velocity as described above, the gait generator 100 returns to S206.

As long as the determination result given in S214 is negative, the gait generator 100 repeats the processing in S206 to S218. In this case, in S300 during the processing in S208 for generating the normal gait corresponding to new initial value candidates (Xs, Vxs) of the body horizontal position/velocity, the initial value of the body posture angular velocity is set to the one which is determined in S310 in the processing carried out in S208 and which corresponds to the previous initial value candidates (Xs, Vxs) of the body horizontal position/velocity rather than the initial value of the reference body posture angular velocity.

If the determination result in S214 turns to be affirmative, then the gait generator 100 leaves the repetition loop (S204) and proceeds to S220. The provisional gait generated immediately before the gait generator 100 leaves the repetition loop of S204 will be obtained as the normal gait that satisfies the boundary condition.

In S220, the gait generator 100 determines the initial body horizontal position/velocity (X0, Vx0) at the original start time 0 (the end time of a current time's gait), the initial body vertical position/velocity (Z0, Vz0) at start time 0, and the initial body posture angle at start time 0 and the angular velocity thereof.

To be more specific, (X0, Vx0) and (Z0, Vz0) are determined to be the values obtained by converting the body horizontal position/velocity and the body vertical position/velocity determined at the time of the instant when the second turning gait is switched to the first turning gait, i.e., when time Tk=Tcyc (=Te−Ts), in S408 and S414 shown in FIG. 22 into the values observed from the supporting leg coordinate system corresponding to the supporting leg of the first turning gait that starts at time Tcyc. Similarly, the initial body posture angle and the angular velocity thereof at start time 0 are determined to be values obtained by converting the body posture angle and the angular acceleration determined at time Tcyc into the values observed from the supporting leg coordinate system corresponding to the supporting leg of the first turning gait from time Tcyc.

Subsequently, the gait generator 100 proceeds to S222 to calculate a normal gait initial divergent component q[0] according to the following expression 40 which corresponds to the aforesaid expression 10.

$$q[0]=X0+V0/\omega0 \quad \text{Expression 40}$$

Further, the gait generator 100 proceeds to S224 to determine, as q"[0], the value obtained by converting the normal gait initial divergent component q[0] into a value observed from a current time's gait supporting leg coordinate system. Further, the gait generator 100 determines the values obtained by converting the initial body vertical position/velocity (Z0, Vz0) into the values observed from the current time's gait supporting leg coordinate system as (Z0", Vz0").

Supplementarily, (Z0", Vz0") coincide with the body vertical position/velocity at the end of the second turning gait observed from the supporting leg coordinate system (the next but one time's gait supporting leg coordinate system illustrated in FIG. 15) of the second turning gait. Further, q"[0] coincides with the terminal divergent component of the second turning gait observed from the supporting leg coordinate system of the second turning gait. Hence, the coincident relationships may be used to calculate (Z0", Vz0") and q"[0].

This completes the processing in S064 of FIG. 12, i.e., the subroutine processing for determining the initial state of the normal gait.

Subsequently, the gait generator 100 proceeds to S066 of FIG. 12 to determine the gait parameters of the current time's gait, some of the gait parameters being provisionally determined. The processing in S066 is carried out according to the flowchart shown in FIG. 25. Here, as an example, the processing illustrated by the flowchart of FIG. 25 will be described in the case where a current time's gait is a running gait.

First, in S600, the gait generator 100 determines the foot trajectory parameter of the current time's gait such that the foot position/posture trajectory of a current time's gait uninterruptedly leads into the foot position/posture trajectory of a normal gait. For example, in the case where the current time's gait is a running gait, the foot trajectory parameter will be determined as described below.

The free leg foot position/posture at the start of a current time's gait are set to the position/posture of the foot 22 of the leg 2, which acts as the free leg in the current time's gait, at the end of a last time's gait (the position/posture observed from the current time's gait supporting leg coordinate system). Similarly, the supporting leg foot position/posture at the start of a current time's gait are set to the position/posture of the foot 22 of the leg 2, which acts as the supporting leg in the current time's gait, at the end of a last time's gait (the position/posture observed from the current time's gait supporting leg coordinate system).

Further, the free leg foot position/posture at the end of the current time's gait are set to the supporting leg foot position/posture at the start of the first turning gait observed in the current time's gait supporting leg coordinate system (the position/posture of the foot 22 of the leg 2, which is expected to be the supporting leg in the next time's gait, at the start of a normal gait). Similarly, the supporting leg foot position/posture at the end of the current time's gait are set to the free leg foot position/posture at the start of the first turning gait observed in the current time's gait supporting leg coordinate system (the position/posture of the foot 22 of the leg 2, which is expected to be the free leg in the next time's gait, at the start of a normal gait).

Subsequently, the gait generator 100 proceeds to S602 to determine the reference body posture trajectory parameter of the current time's gait such that the reference body posture trajectory of the current time's gait uninterruptedly leads into the reference body posture trajectory of a normal gait.

As an example, if the current time's gait is a running gait, then the reference body posture of the current time's gait is set to the same body posture angle as that of a normal gait, that is, zero.

Subsequently, the gait generator 100 proceeds to S604 to determine the arm posture trajectory parameters of the current time's gait in the same manner as that for the arm posture trajectory parameters of a normal gait. The arm posture trajectory parameters of the current time's gait are determined such that the arm posture trajectory of the current time's gait uninterruptedly leads into the arm posture trajectory of the normal gait. It should be noted that the arm posture trajectory parameters determined here are motional parameters other than those related to changes in the angular momentums of both arms about the Z-axis (or the body trunk axis), as with the case where the arm posture trajectory parameter of a normal gait is determined (more specifically, the parameters that defines the trajectories of the relative center-of-gravity positions of both arms in relation to the body 24).

Subsequently, the gait generator 100 proceeds to S606 to determine the floor reaction force vertical component trajectory parameters of the current time's gait. As an example, if the current time's gait is a running gait, then the floor reaction force vertical component trajectory parameters of the current time's gait are determined such that the floor reaction force vertical component trajectory defined by the parameters exhibits the same pattern as that of the floor reaction force vertical component trajectory of each turning gait of the normal gait illustrated in FIG. 17. In other words, the floor reaction force vertical component trajectory parameters of the current time's gait are determined such that the floor reaction force vertical component trajectory changes according to the pattern illustrated in FIG. 26.

In this case, the floor reaction force vertical component trajectory parameters are determined such that the total center of gravity vertical position/velocity and the floor reaction force vertical component trajectory of the current time's gait will uninterruptedly leads into the normal gait.

To be more specific, first, the initial total center of gravity vertical position/velocity of the normal gait observed from a current time's gait supporting leg coordinate system are determined using a kinematics model of the robot 1 on the basis of initial motional states, including the body position/posture at the start of the normal gait and the changing rates thereof, which have been finally determined by the processing in S064 of FIG. 12.

For example, the total center of gravity vertical position at the start of the normal gait observed from the current time's gait supporting leg coordinate system is determined according to the aforesaid expression 04 on the basis of the vertical position of a body mass point of the model shown in FIG. 9 that corresponds to the body vertical position at the start of the normal gait observed from the current time's gait supporting leg coordinate system, and the vertical position of a supporting leg mass point and the vertical position of a free leg mass point of the model in FIG. 9 corresponding to the foot positions at the start of the normal gait observed from the current time's gait supporting leg coordinate system.

Further, the total center of gravity vertical velocity at the start of the normal gait observed from the current time's gait supporting leg coordinate system is determined according to an expression, which is obtained by differentiating both sides of the aforesaid expression 04, on the basis of the vertical velocity of a body mass point of the model shown in FIG. 9 that corresponds to the body vertical velocity of the normal gait observed from the current time's gait supporting leg coordinate system, and the vertical velocity of a supporting leg mass point and the vertical velocity of a free leg mass point of the model in FIG. 9 corresponding to the foot vertical velocities at the start of the normal gait observed from the current time's gait supporting leg coordinate system.

The initial total center of gravity vertical position/velocity may be calculated from the initial motional states of the normal gait by using a more precise model.

Then, the initial vertical position/velocity of the total center of gravity of the normal gait determined as described above are substituted into the terminal vertical position/velocity of the total center of gravity of the aforesaid expression 13 and the following expression 41. Further, the vertical position/velocity of the total center of gravity at the end of the last time's gait (more specifically, the values obtained by observing the vertical position of the total center of gravity and the vertical velocity of the total center of gravity at the end of the last time's gait from the current time's gait supporting leg coordinate system) are substituted into the initial vertical position/velocity of the total center of gravity of the aforesaid expression 13 and the following expression 41 so as to determine the floor reaction force vertical component trajectory parameters of the current time's gait such that the relationships indicated by expression 13 and expression 41 are satisfied. The integration in expression 13 and expression 41 is performed from the start to the end of the current time's gait.

Terminal total center of gravity vertical velocity−  Expression 41
Initial total center of gravity vertical velocity =
First-order integration of (Floor reaction force -continued
vertical component/Mass of the robot) +
First-order integration of gravitational acceleration The gravitational acceleration in expression 41 takes a negative value.

Figure 26:
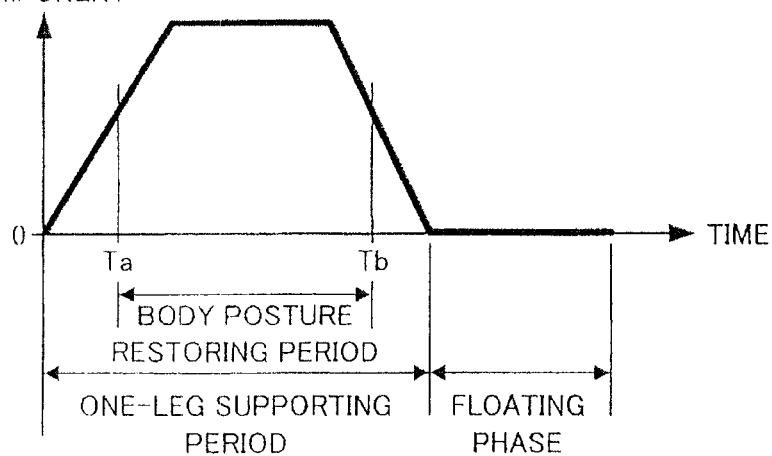
FIG. 26 is a graph illustrating an example of setting a floor reaction force vertical component of a current time's gait (a running gait or a one-leg hopping gait)

More specifically, first, at least two parameters of the floor reaction force vertical component trajectory parameters, such as the time of breakpoints, which define the floor reaction force vertical component pattern illustrated in FIG. 26 are taken as independent unknown variables, and the values of the unknown variables are determined according to a simultaneous equation consisting of expression 13 and expression 41.

The height (the peak value of a floor reaction force vertical component) and the width thereof (the duration of a one-leg supporting period) of the trapezoid in FIG. 26, for example, may be selected as the parameters defined to be the unknown variables. In this case, the inclinations of both sides of the trapezoid in FIG. 26 take predetermined values on the basis of a current time's gait cycle or the like, or the times of the breakpoints of the floor reaction force vertical component pattern, excluding the time at which a one-leg supporting period is switched to a floating phase, are set to predetermined values on the basis of a current time's gait cycle or the like.

Subsequently, the gait generator 100 proceeds to S608 to determine the permissible range of a floor reaction force horizontal component [Fxmin, Fxmax] (to be specific, the parameter that defines the pattern of the permissible range of the floor reaction force horizontal component).

For example, if the current time's gait is a running gait, the permissible range of a floor reaction force horizontal component [Fxmin, Fxmax] of the current time's gait is determined in the same manner as that for the permissible range of the floor reaction force horizontal component of each turning gait illustrated in FIG. 18. The permissible range of the floor reaction force horizontal component is set according to, for example, the pattern illustrated in FIG. 27. In the present embodiment, the permissible range of the floor reaction force horizontal component is determined according to the aforesaid expressions 12a and 12b from the floor reaction force vertical component trajectory previously determined in S606.

Subsequently, the gait generator 100 proceeds to S610 to provisionally determine the ZMP trajectory parameter that defines the ZMP trajectory of the current time's gait.

In this case, the ZMP trajectory parameter is provisionally determined such that the desired ZMP defined thereby exhibits a high stability allowance and continuously changes in a supporting polygon in the current time's gait from the desired ZMP at the end of the last time's gait to the desired ZMP at the start of the normal gait without developing a sudden change.

Figure 28:
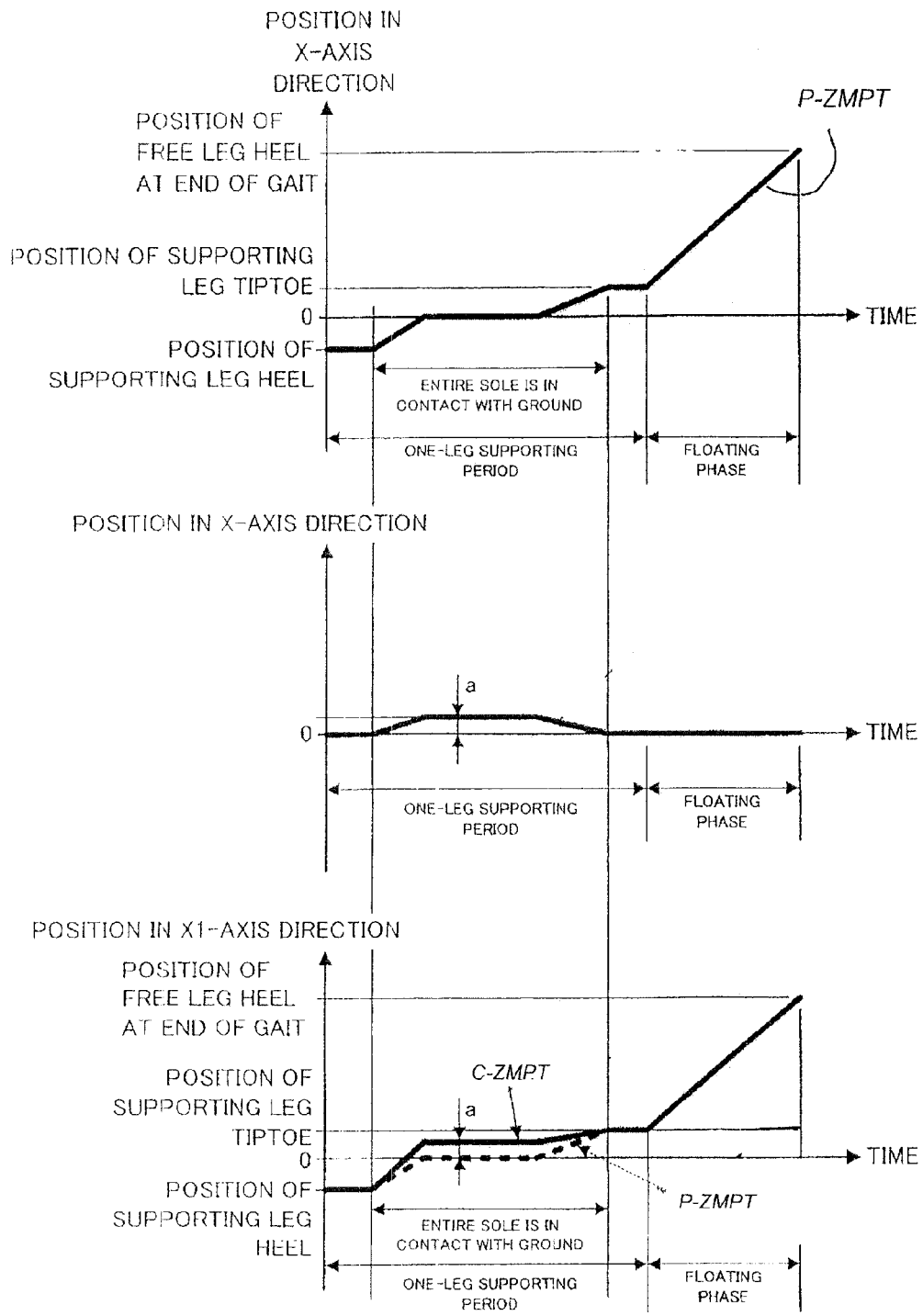
FIG. 28 is a graph for explaining a provisional desired ZMP trajectory of a current time's gait (a running gait) and the processing for correcting the same.

For example, if the current time's gait is a running gait, then the desired ZMP trajectory of the current time's gait is set according to the same pattern as the pattern in each turning gait previously described about the case where the normal gait is a running gait. The position in the X-axis direction of the desired ZMP trajectory of a current time's gait is determined, for example, as illustrated in FIG. 28. The same applies to the position in the Y-axis direction of the desired ZMP trajectory of the current time's gait. Then, the positions and time of the breakpoints of the desired ZMP trajectory are determined as the desired ZMP trajectory parameters of the current time's gait.

Supplementarily, the ZMP trajectory parameters of the current time's gait determined in S610 are simply provisionally determined and will be corrected, as will be discussed later. Accordingly, the ZMP trajectory of the current time's gait defined by the ZMP trajectory parameters provisionally determined in S610 as described above will be hereinafter referred to as the provisional desired ZMP trajectory P-ZMPT of the current time's gait.

Subsequently, the gait generator 100 proceeds to S612 to determine a body posture restoring period [Ta, Tb]. The start time Ta of the body posture restoring period corresponds to Tm in the second turning gait of the normal gait, while the end time Tb of the body posture restoring period corresponds to Ts2 in the second turning gait of the normal gait. The time Ta and time Tb are set in the same manner as that for Tm and Ts2, respectively. Thus, the body posture restoring period [Ta, Tb] is determined as illustrated in FIG. 26.

This completes the description of the processing carried out in S066.

Returning to FIG. 12, after carrying out the processing in S066 (the processing for determining or provisionally determining the gait parameters of the current time's gait) as described above, the gait generator 100 proceeds to S068 to correct the gait parameters of the current time's gait (determine the current time's gait parameters). The gait parameters to be corrected here are the ZMP trajectory parameters that define the aforesaid provisional desired ZMP trajectory P-ZMPT. By the processing in this step S068, the ZMP trajectory parameters are corrected to cause the body position/posture trajectories of the current time's gait to continue to or gradually approximate to a normal gait.

Figure 29:
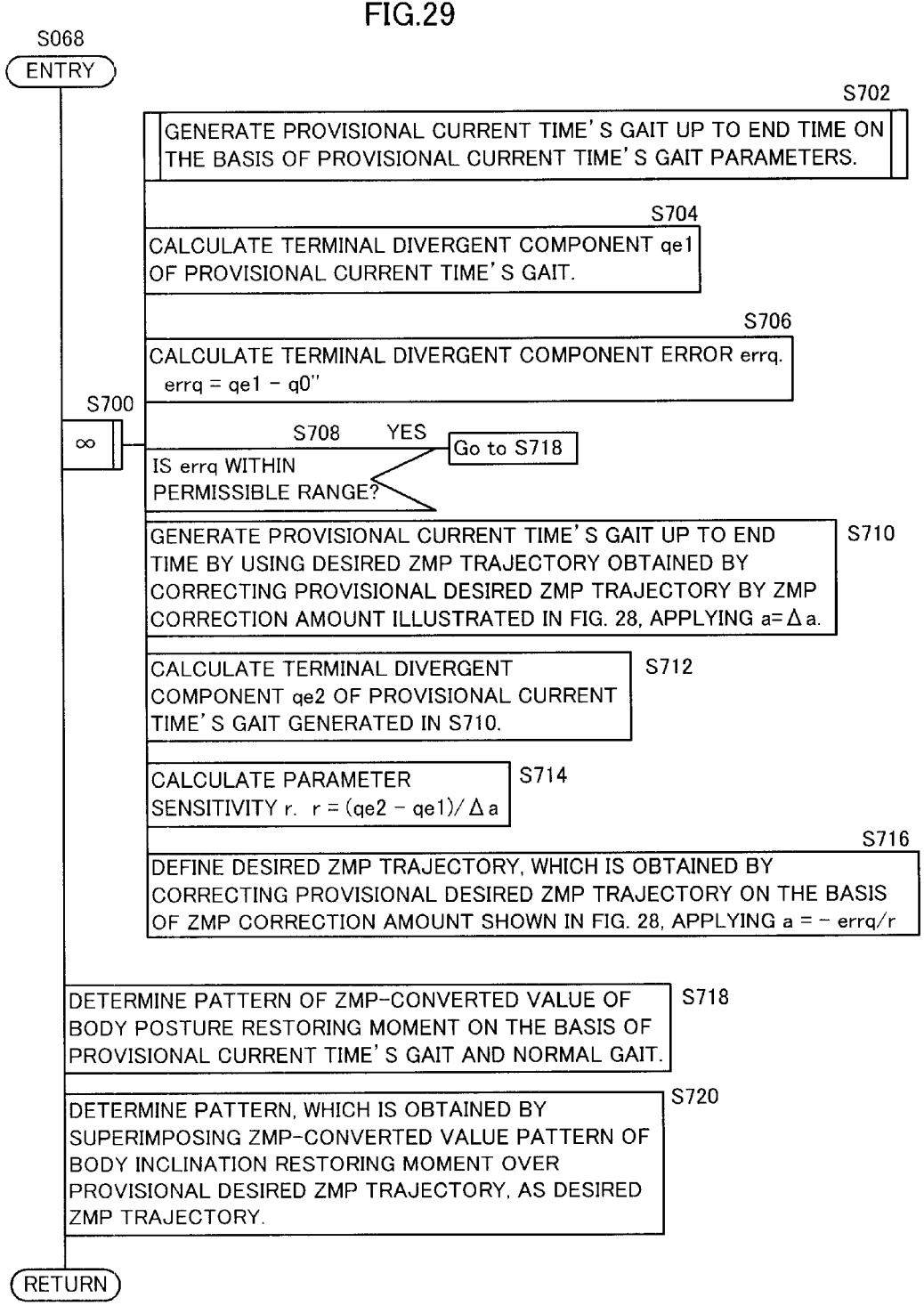
FIG. 29 is a flowchart illustrating the subroutine processing in S068 of FIG. 12.

To be more specific, the processing in this step S068 is carried out according to the flowchart of FIG. 29.

First, the gait generator 100 proceeds to S702 via S700 to generate a provisional current time's gait to the end of the current time's gait on the basis of the provisional current time's gait parameters. The provisional current time's gait parameters mean a set of the ZMP trajectory parameters that define the provisional desired ZMP trajectory P-ZMPT (the provisional desired ZMP trajectory P-ZMPT determined in S066 or S716, which will be described later) and the gait parameters except for the ZMP trajectory parameters that have been determined in S066 as described above.

Figure 30:
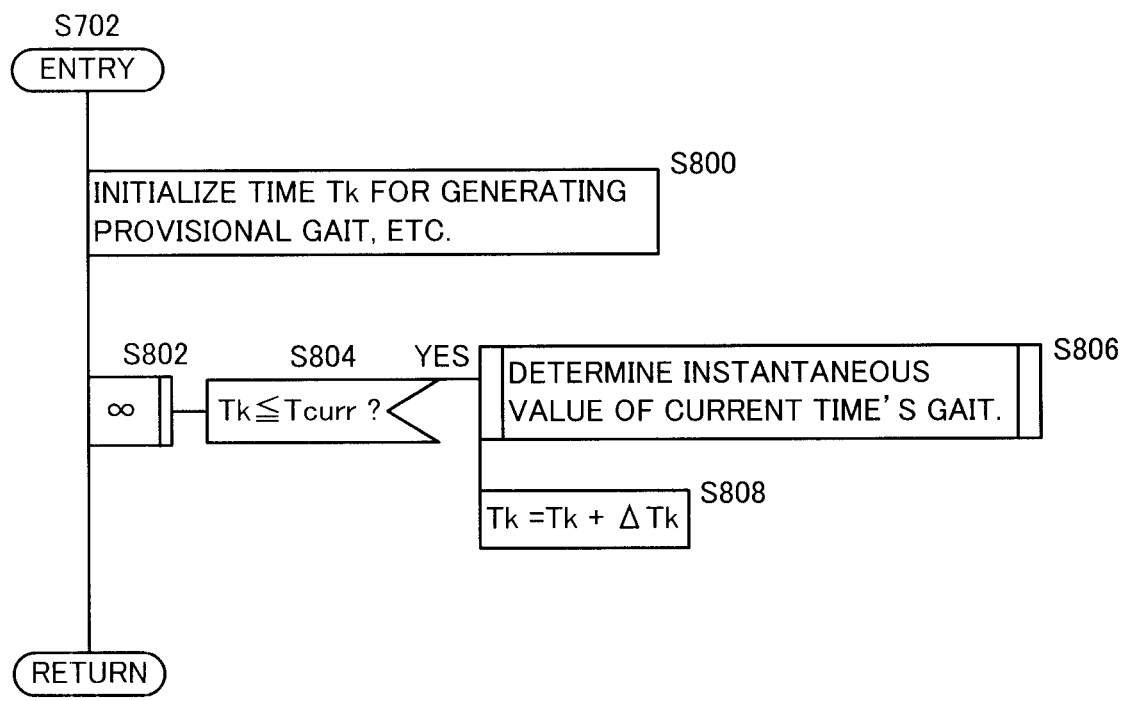
FIG. 30 is a flowchart illustrating the subroutine processing in S702 of FIG. 29.

For example, the processing in S702 when the current time's gait is a running gait is carried out according specifically to the flowchart of FIG. 30.

The gait generator 100 first carries out in S800 various types of initialization, including time Tk for generating a provisional current time's gait. More specifically, time Tk for generating a provisional current time's gait is initialized to current time t. Further, the motional states (the motional states observed in the current time's gait supporting leg coordinate system) of the desired gait at time t−Δt, including the desired body position, the desired body velocity, the desired body posture angle and the angular velocity thereof, the desired foot position/posture, and the desired arm posture already determined by the gait generator 100 at time t−Δt are set as the initial motional states immediately before current time t of the provisional current time's gait.

Subsequently, the gait generator 100 proceeds to S804 via S802 to determine whether time Tk for generating a provisional gait is time before end time Tcurr of the current time's gait (whether Tk≤Tcurr). If the determination result is affirmative, then the gait generator 100 proceeds to S806 to determine the instantaneous value of the current time's gait (the value at time Tk).

Subsequently, the gait generator 100 proceeds to S808 to increase the time Tk for generating a provisional gait by predetermined notch time ΔTk and then carries out the determination in S804 again. Here, the notch time ΔTk may be set to agree with, for example, a control cycle Δt.

If the determination result in S804 is negative, then the processing illustrated by the flowchart of FIG. 30 is completed.

By the processing described above, the provisional current time's gaits are generated from the start to the end.

Figure 31:
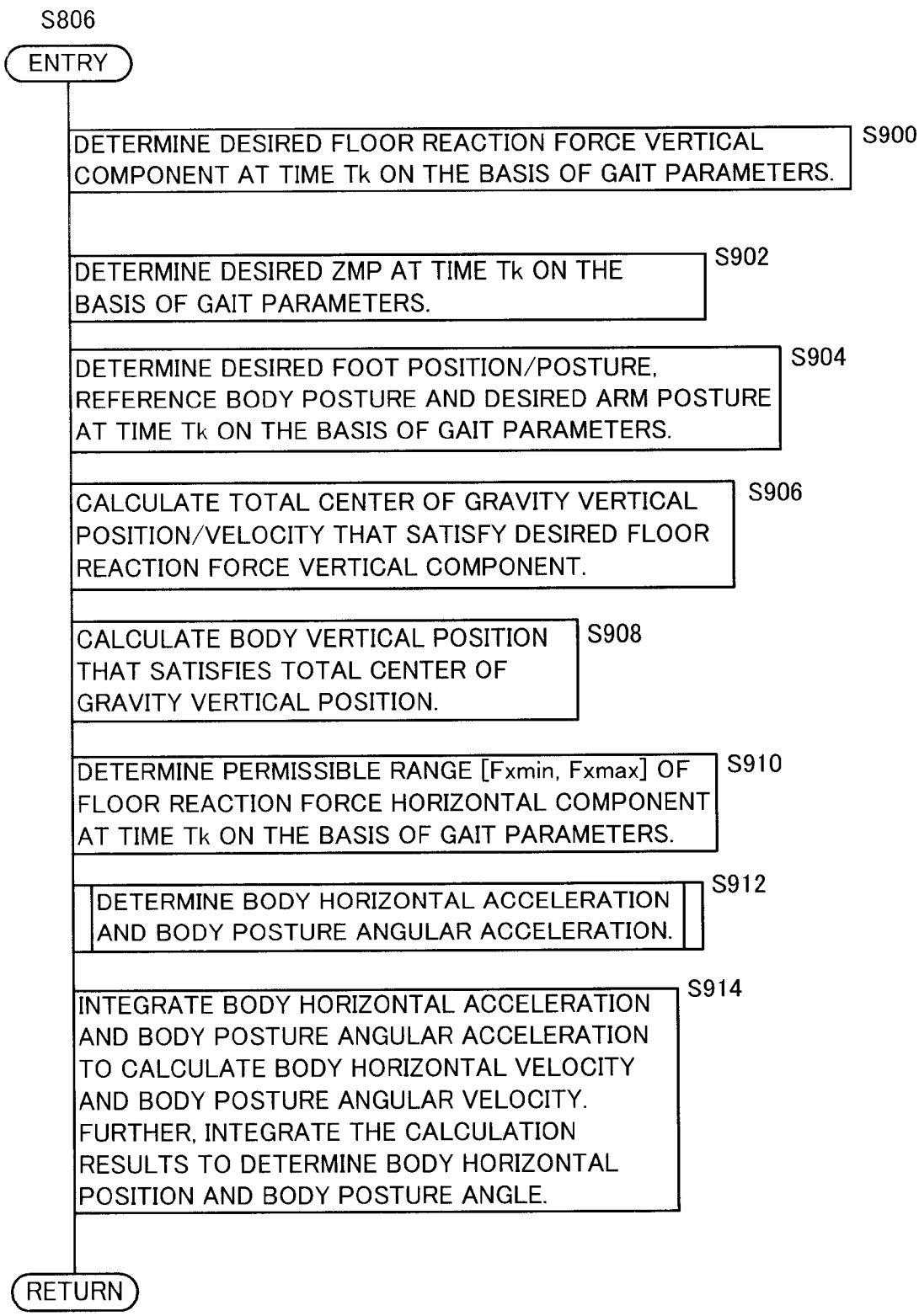
FIG. 31 is a flowchart illustrating the subroutine processing in S806 of FIG. 30.

More specifically, the processing in S806 is carried out according to the flowchart in FIG. 31.

First, in S900, the gait generator 100 determines an instantaneous value of the desired floor reaction force vertical component shown in FIG. 26 at time Tk on the basis of the gait parameters (more specifically, the floor reaction force vertical component trajectory parameters of a provisional current time's gait).

The gait generator 100 then proceeds to S902 to determine an instantaneous value of the provisional desired ZMP at time Tk on the basis of the gait parameters (more specifically, the ZMP trajectory parameters of the provisional current time's gait).

Subsequently, the gait generator 100 proceeds to S904 to determine the instantaneous values of the desired foot position/posture, the reference body posture, and the desired arm posture, respectively, at time Tk on the basis of the gait parameters (more specifically, the foot trajectory parameter, the reference body posture trajectory parameter, and the arm posture trajectory parameter). Regarding the desired arm posture, however, more specifically, the total center of gravity positions of both arms are determined, whereas the motions of the arms (arm swinging motions) that lead to changes in the angular momentums about the vertical axis (or the body trunk axis of the body 24) are not yet determined.

The instantaneous values of the desired foot position/posture at time Tk are determined using the finite-duration setting filter, as with the case where the foot position/posture at the start time Ts are determined in S200 of FIG. 20.

Subsequently, the gait generator 100 proceeds to S906 to calculate the total center of gravity vertical position/posture that satisfy the desired floor reaction force vertical component (that causes the sum of the inertial force in the vertical direction of the robot 1 and the gravitational force to balance with the desired floor reaction force vertical component). Specifically, this calculation is accomplished by the same processing as that in S406 of FIG. 22.

Then, the gait generator 100 proceeds to S908 to calculate the instantaneous value at time Tk of the body vertical position that satisfies the total center of gravity vertical position determined as described above. Specifically, this calculation is accomplished by the same processing as that in S408 of FIG. 22.

Figure 27:
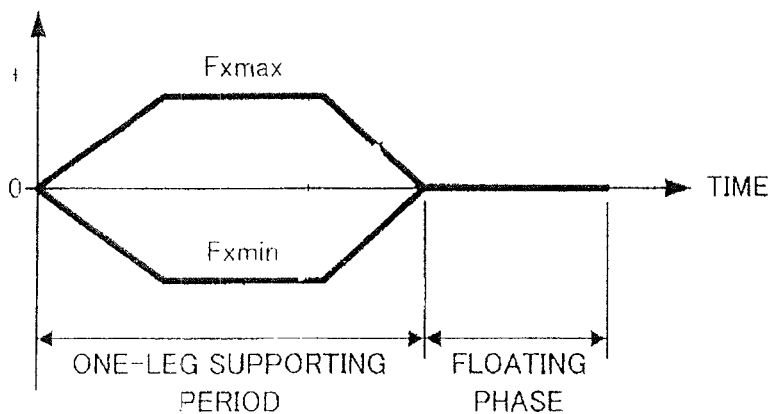
FIG. 27 is a graph illustrating an example of setting the permissible range of a floor reaction force horizontal component of the current time's gait (a running gait or a one-leg hopping gait)

Subsequently, the gait generator 100 proceeds to S910 to calculate the instantaneous value at time Tk in the permissible range of the floor reaction force horizontal component [Fxmin, Fxmax] shown in FIG. 27 on the basis of gait parameters (more specifically, the parameters that define the permissible range of the floor reaction force horizontal component of the provisional current time's gait).

Subsequently, the gait generator 100 proceeds to S912 to determine the body horizontal acceleration and the body posture angular acceleration at time Tk of the provisional current time's gait. The processing in S912 is slightly different from the processing in S412 of FIG. 22, and a model manipulation floor reaction force moment input to the gait generator 100 from the compensating total floor reaction force moment distributor 110 is reflected.

More specifically, the processing in S912 determines the body horizontal acceleration and the body posture angular velocity such that a condition that the model manipulation floor reaction force moment is generated about the desired ZMP and the floor reaction force horizontal component Fx that balances out the inertial force of the robot 1 in the horizontal direction does not deviate from the permissible range [Fxmin, Fxmax] is satisfied.

Figure 32:
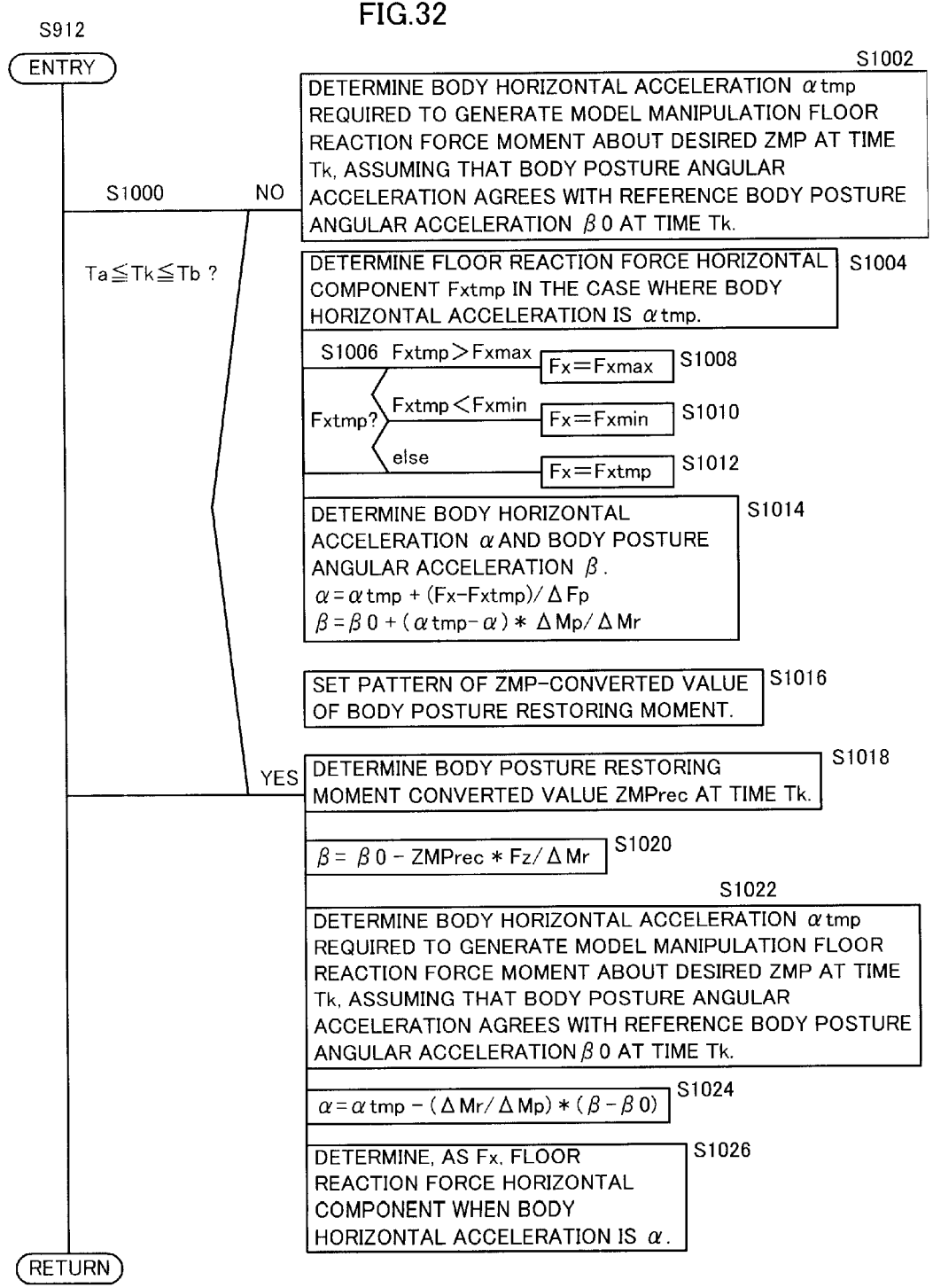
FIG. 32 is a flowchart illustrating the subroutine processing in S912 of FIG. 31.

Specifically, the processing is carried out as illustrated by the flowchart of FIG. 32.

Figure 25:
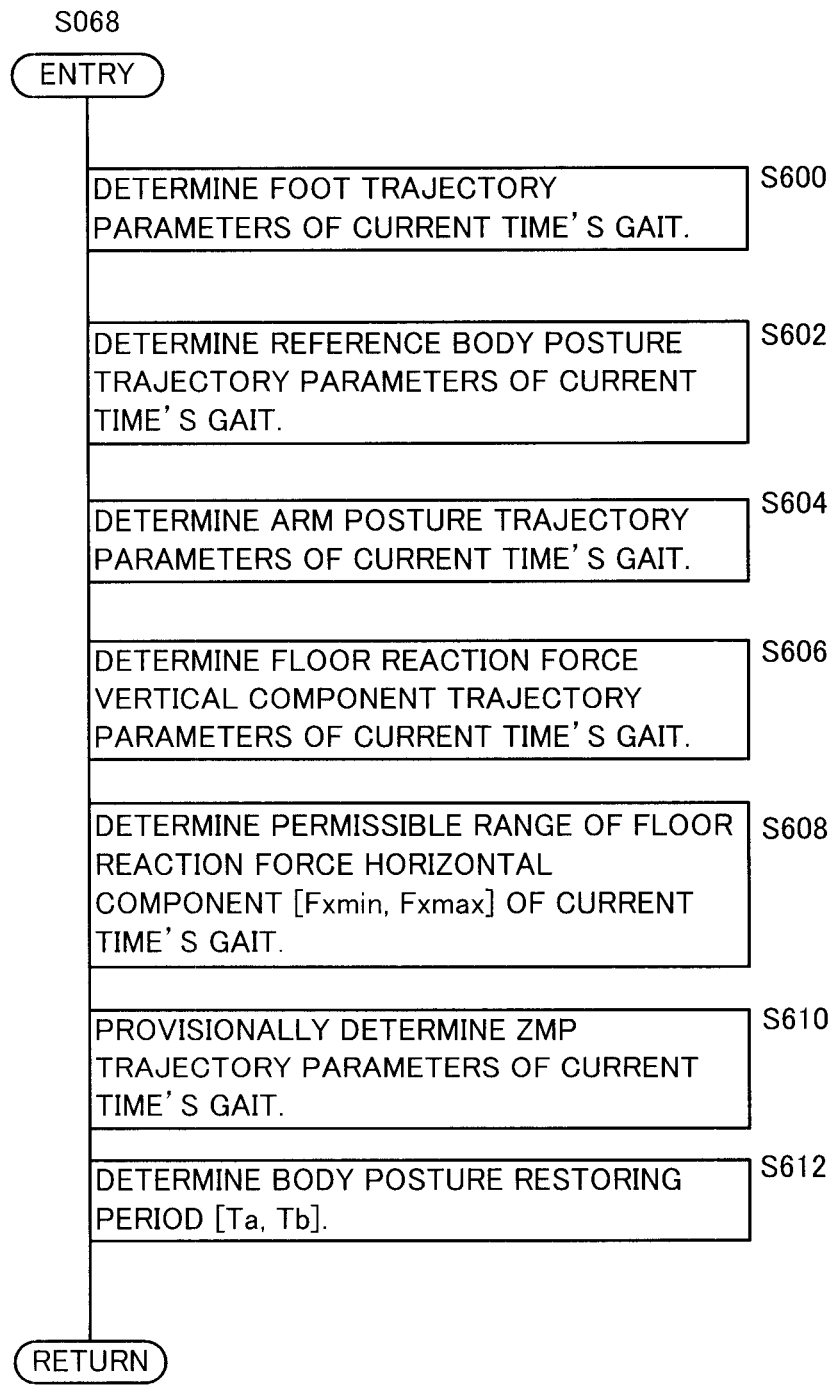
FIG. 25 is a flowchart illustrating the subroutine processing in S066 of FIG. 12.

First, in S1000, the gait generator 100 determines whether time Tk lies within the body posture restoring period [Ta, Tb] set in S612 of FIG. 25.

If the determination result is negative (if the permissible range of the floor reaction force horizontal component at time Tk is relatively narrow or zero), then the gait generator 100 carries out the processing from S1002 to S1014.

In S1002, the gait generator 100 calculates the body horizontal acceleration αmp at time Tk of the provisional current time's gait such that the model manipulation floor reaction force moment at time Tk received from the compensating total floor reaction force moment distributor 110 is generated about the desired ZMP on the dynamic model shown in FIG. 9 (such that the horizontal component of the moment generated about the desired ZMP due to the resultant force of the inertial force of the robot 1 and the gravitational force balances out the model manipulation floor reaction force moment).

In this case, however, if time Tk is later than current time t, then the gait generator 100 has not yet received the model manipulation floor reaction force moment from the compensating total floor reaction force moment distributor 110. Hence, if time Tk is later than current time t, then the gait generator 100 calculates the body horizontal acceleration αtmp at time Tk of the provisional current time's gait, setting the model manipulation floor reaction force moment at time Tk to zero (i.e., such that the horizontal component of the floor reaction force moment about the desired ZMP becomes zero).

Thus, the processing in S1002 in the present embodiment determines the body horizontal acceleration αtmp at time Tk such that the model manipulation floor reaction force moment at current time t actually input from the compensating total floor reaction force moment distributor 110 to the gait generator 100 is generated about the desired ZMP if time Tk is current time t. Meanwhile, if time Tk is later than current time t, then the body horizontal acceleration αtmp at time Tk is determined such that the desired ZMP is satisfied.

In this case, the method for determining the body horizontal acceleration in the case where the model manipulation floor reaction force moment is zero is the same as that for the processing in S504 of FIG. 23. Meanwhile, if the model manipulation floor reaction force moment is not zero, then the horizontal acceleration of body mass point d2Xb/dt2 calculated from an expression, which is obtained by making My of the aforesaid expression 03 coincide with the model manipulation floor reaction force moment in place of zero, is determined as the body horizontal acceleration αtmp.

Alternatively, the model manipulation floor reaction force moment after current time t may be predicted from the model manipulation floor reaction force moment input to the gait generator 100 at current time t or before current time t, and then the body horizontal acceleration at time Tk that is later than current time t may be determined such that the predicted model manipulation floor reaction force moment is generated about the desired ZMP.

The processing in S1004 to S1014 after carrying out the processing in S1002 as described above is the same as the processing in S506 to S516 of FIG. 23. Hence, the description of the processing will not be repeated.

Meanwhile, if the determination result in S1000 is affirmative (if the permissible range of the floor reaction force horizontal component at time Tk is relatively wide), then the gait generator 100 proceeds to S1016 and sets the pattern of the body posture restoring moment ZMP-converted value ZMPrec. In this case, the ZMPrec is set to a pattern in which the ZMPrec becomes the fixed value zero (i.e., the pattern in which the height of the trapezoidal pattern given in FIG. 24 is zero), which is different from the pattern set in S518 of FIG. 23 related to the generation of a normal gait.

Subsequently, the processing from S1018 to S1026 is carried out. In S1018 and S1020 of the processing, the same processing as that in S520 and S522, respectively, of FIG. 23 is carried out.

Further, in S1022 following S1020, the gait generator 100 carries out the same processing as that in S1002 described above to calculate the body horizontal acceleration αmp by reflecting the model manipulation floor reaction force moment thereon.

Then, the same processing as that in S526 and S528 of FIG. 23 is carried out in S1024 and S1026, respectively, after S1022.

The processing in S1016 to S1026 causes the instantaneous value of the body posture restoring moment ZMP-converted value ZMPrec to be always zero, so that the body posture angular acceleration β determined in S1020 coincides with the reference body posture angular acceleration β0 at time Tk. Therefore, only the processing in S1022, S1024 and S1026 may be carried out, applying β=β0. Further, the body horizontal acceleration α calculated in S1024 always coincides with αmp, so that the processing in S1024 may be omitted.

After completing the processing in S912 of FIG. 31 as described above, the gait generator 100 proceeds to S914 and sequentially integrates the body horizontal acceleration determined in S912 in the period up to time Tk thereby to determine the body horizontal velocity at time Tk. Further, the gait generator 100 sequentially integrates the body horizontal velocity in the period up to time Tk thereby to determine the body horizontal position at time Tk. Further, the gait generator 100 sequentially integrates the body posture angular acceleration determined in S912 in the period up to time Tk thereby to determine the body posture angular velocity at time Tk. Further, the gait generator 100 sequentially integrates the body posture angular velocity in the period up to time Tk thereby to determine the body posture angle at time Tk.

After completing the processing in S702 of FIG. 29 (the processing for generating a provisional current time's gait up to the end time) as described above, the gait generator 100 proceeds to S704. In this step S704, the gait generator 100 calculates the terminal divergent component qe1 of the provisional current time's gait (=Xe+Vxe/ω0) according to the aforesaid expression 10 on the basis of the body horizontal position/velocity (Xe, Vxe) at the end of the provisional current time's gait determined in S702 (Xe: terminal body horizontal position of the provisional current time's gait; Vxe: terminal body horizontal velocity of the provisional current time's gait).

Subsequently, the gait generator 100 proceeds to S706 to calculate a terminal divergent component error errq (=qe1−q0"), which is the difference between the terminal divergent component qe1 of the provisional current time's gait and the initial divergent component q0" of the normal gait previously determined in S224 of FIG. 20.

Then, the gait generator 100 proceeds to S708 to determine whether the calculated terminal divergent component error errq lies within a permissible range (a predetermined range in the vicinity of zero).

If the determination result in S708 is negative, then the gait generator 100 proceeds to S710 to generate a provisional current time's gait of up to the end time in the same manner as that in S702 described above by using the desired ZMP trajectory, which is obtained by correcting, as illustrated in FIG. 28, the provisional desired ZMP trajectory P-ZMPT by the ZMP correction amount of the trapezoidal pattern set as illustrated in FIG. 28, applying a=Δa (Δa: predetermined minutely small amount). More specifically, the gait generator 100 uses a desired ZMP trajectory, which is obtained by correcting the provisional desired ZMP trajectory P-ZMPT, in place of the provisional desired ZMP trajectory P-ZMPT used to generate the provisional current time's gait in S702, thereby generating a provisional current time's gait anew. In this case, the current time's gait parameters other than the desired ZMP are the same as those used in S702.

Here, the aforesaid ZMP correction amount means the correction amount for correcting the provisional desired ZMP (the correction amount to be added to the provisional desired ZMP) in order to cause the terminal divergent component of the current time's gait to agree with the initial divergent component of a normal gait (to eventually converge the body position/posture trajectories of the current time's gait to the body position/posture trajectories of a normal gait in the future) as much as possible. In the present embodiment, the ZMP correction amount is defined as the correction amount of the trapezoidal pattern, and the height of the trapezoidal pattern is denoted by the aforesaid "a."

In this case, according to the present embodiment, the provisional desired ZMP trajectory P-ZMPT is corrected during the aforesaid body posture restoring period [Ta, Tb], in which the permissible range of the floor reaction force horizontal component is sufficiently wide, and the trapezoidal pattern is set within the body posture restoring period [Ta, Tb]. The body posture restoring period [Ta, Tb] is also the period during which substantially the entire bottom surface of the supporting leg foot 22 is in contact with the ground (the phase of the entire sole being in contact with the ground). Further, the time of breakpoints of the ZMP correction amount of the trapezoidal pattern are set according to the time of the breakpoints of the provisional desired ZMP trajectory P-ZMPT.

In S710, a=Δa (Δa: predetermined minutely small amount) applies to observe a change in the aforesaid terminal divergent component error errq when the current provisional desired ZMP trajectory P-ZMPT is corrected by a minutely small amount on the basis of the ZMP correction amount of the aforesaid trapezoidal pattern.

Supplementarily, in the aforesaid processing of S710, correcting the position of the desired ZMP in the X-axis direction has been described as an example. Actually, however, the position of the desired ZMP in the Y-axis direction is also corrected. As with the correction of the position in the X-axis direction, the position in the Y-axis direction is corrected such that the desired ZMP trajectory is changed in the trapezoidal pattern from the provisional desired ZMP trajectory P-ZMPT. In this case, the aforesaid Δa may be set to the same value in each axial direction or set to different values for different axial directions.

If correcting the desired ZMP trajectory in one of the X-axis direction and the Y-axis direction does not influence the terminal divergent component in the other axial direction or if the influence is sufficiently small, then the processing from S710 to S716 to be discussed later may be separately carried out for the X-axis direction and the Y-axis direction, respectively.

The aforesaid Δa may be a constant of a minutely small amount. Alternatively, however, the Δa may be set such that the Δa decreases as the terminal divergent component error errq decreases by the repetitive computation as described below.

After generating the provisional current time's gait by using the provisional desired ZMP trajectory P-ZMPT that has been corrected by the ZMP correction amount in S710 as described above, the gait generator 100 proceeds to S712. In this step S712, the gait generator 100 calculates the terminal divergent component qe2 (=Xe1+Vxe1/ω0) of the provisional current time's gait (the provisional current time's gait generated in S710) according to the aforesaid expression 10 on the basis of the body horizontal position/velocity (Xe1, Vxe1) at the end of the provisional current time's gait determined in S710 (Xe1: terminal body horizontal position of the provisional current time's gait; Vxe1: terminal body horizontal velocity of the provisional current time's gait).

Subsequently, the gait generator 100 proceeds to S714 to calculate a parameter sensitivity r (the ratio of a change in the terminal divergent component error errq to Δa) according to the expression in the flowchart. More specifically, the parameter sensitivity r is calculated by dividing the difference between qe2 and qe1 by Δa.

Further, the gait generator 100 proceeds to S716 and sets the ZMP correction amount of the trapezoidal pattern by defining the value, which is obtained by dividing the terminal divergent component error errq determined in S706 by the parameter sensitivity r determined in S714, as the height a (a=−errq/r), and then corrects the provisional desired ZMP trajectory P-ZMPT (the provisional desired ZMP trajectory P-ZMPT used to generate the provisional current time's gait by the processing in S702) by the set ZMP correction amount, thereby determining a new provisional desired ZMP trajectory P-ZMPT.

Subsequently, the gait generator 100 carries out the processing from S702 again. In this case, a provisional current time's gait is generated in S702 by using the new provisional desired ZMP trajectory P-ZMPT determined in S716.

Then, the processing of S702 to S716 described above is repeated as long as the determination result in S708 is negative. When the determination result in S708 switches to affirmative, then the gait generator 100 leaves the repetitive loop and proceeds to S718.

The processing in S702 to S716 described above is repeated so as to correct the provisional desired ZMP trajectory P-ZMPT such that the terminal divergent component of the provisional current time's gait coincides or substantially coincides with the initial divergent component of the normal gait.

Subsequently, in S718, the gait generator 100 determines the pattern of the body posture restoring moment ZMP-converted value (ZMPrec) of the current time's gait on the basis of the provisional current time's gait (the provisional current time's gait generated in S702 immediately before the gait generator 100 leaves the repetitive loop in S702 to S716) and the normal gait so as to bring the body posture angle of the current time's gait close to the body posture angle of the normal gait.

In this case, the pattern of the body posture restoring moment ZMP-converted value (ZMPrec) is determined mainly on the basis of the difference between the terminal body posture angle of the provisional current time's gait and the initial body posture angle of the normal gait and the difference between the terminal body posture angular velocity of the provisional current time's gait and the initial body posture angular velocity of the normal gait.

The ZMPrec determined here is used to correct the provisional desired ZMP such that the coincidence between the terminal divergent component of a current time's gait and the initial divergent component of a normal gait (the condition in S708) can be maintained even if the body posture angular acceleration is generated to cause the body posture angle trajectory to connect (approximate) to a normal gait in a period in which the permissible range of the floor reaction force horizontal component is sufficiently large (the aforesaid body posture restoring period [Ta, Tb]) in the processing for generating the instantaneous values of the current time's gait, which will be discussed later (the processing in S032).

The ZMPrec has a trapezoidal pattern, as with the one described in the aforesaid processing for generating the normal gait, and the ZMPrec is determined as described below. In the trapezoidal pattern of the ZMPrec illustrated in FIG. 24, the time of the peaks (breakpoints) of the trapezoid is predetermined time (e.g., the time of the breakpoints of the trapezoidal pattern of the aforesaid ZMP correction amount) within the aforesaid body posture restoring period [Ta, Tb]. Then, the height of the trapezoid is defined as an unknown parameter and the height of the ZMPrec trapezoid is determined as described below. In S718, Tm and Ts2 in FIG. 24 are replaced by Ta and Tb, respectively.

If there is only one parameter of an unknown of the pattern of the body posture restoring moment ZMP-converted value ZMPrec as described above, then it is usually impossible to uninterruptedly lead both the body posture angle and the body posture angular velocity into a normal gait at the end of the current time's gait. According to the present embodiment, therefore, the parameter of the unknown is determined such that the state of the gait to be generated will gradually approximate to the state of the normal gait over a plurality of gait cycles.

Supplementally, the ZMPrec pattern may be more complicated to have two or more parameters of unknowns of the pattern, and the parameters of two or more unknowns may be determined to uninterruptedly lead both the body posture angle and the body posture angular velocity into the normal gait at the end of the current time's gait. In this case, however, the ZMPrec pattern may excessively vary in zigzag.

The height of the trapezoid, which is the parameter of an unknown of the ZMPrec is determined as described below.

In the following, the principle of calculation will be described first and then the procedure of the calculation will be described.

The difference between the terminal body posture angle of the provisional current time's gait generated by applying ZMPrec=0 in S702 as previously described and the initial body posture angle of the normal gait is denoted by θerr. Further, the difference between the terminal body posture angular velocity of the provisional current time's gait and the initial body posture angular velocity of the normal gait is denoted by Vθerr.

Here, it is assumed that a current time's gait is generated, denoting the height of the trapezoid of the ZMPrec pattern by a certain value bcurr and then the first turning gait of the normal gait is generated by the same algorithm as that of the current time's gait. The height of the body posture restoring moment ZMP-converted value ZMPrec pattern of the first turning gait is assumed to be the sum of the height of the ZMPrec pattern of the first turning gait (the height of the trapezoidal pattern illustrated in FIG. 24) determined in S518 of FIG. 23 and a certain value b1.

The gait generated as described above is referred to as a corrected ZMPrec gait, and the body posture angle at the end thereof (the end of the first turning gait) and the angular velocity thereof are denoted by θ1 and Vθ1, respectively.

The terminal body posture angle of the first turning gait and the angular velocity thereof of the original normal gait determined upon completion of the processing in S064 of FIG. 12 (the processing for determining the initial state of the normal gait), i.e., the normal gait in which the initial body posture angle and the angular velocity thereof of the normal gait finally determined in S310 are defined as initial values, and each of the patterns of the ZMPrec of the first turning gait and the second turning gait, respectively, is set to be the pattern determined in S518, are denoted by θ1org and Vθ1org.

Here, Δθ1 and ΔVθ1 are defined as follows.

$$\Delta\theta1 = \theta1 - \theta1org \qquad \text{Expression 50}$$

$$\Delta V\theta1 = \Delta\theta1 - V\theta1org \qquad \text{Expression 51}$$

The above ΔVθ1 means the difference between the body posture angle at the end of the corrected ZMPrec gait and the body posture angle at the end of the first turning gait of the original normal gait. Similarly, the above Vθ1 means the difference between the body posture angular velocity at the end of the corrected ZMPrec gait and the body posture angular velocity at the end of the first turning gait of the original normal gait. If Δθ1 and ΔVθ1 become zero, then generating a second turning gait following the corrected ZMPrec gait by the same algorithm as that of the current time's gait such that the ZMPrec pattern coincides with the ZMPrec for the second turning gait determined in S518 causes the body posture angle and the angular velocity of the second turning gait to coincide with those of the second turning gait of the original normal gait.

Thus, bcurr (hereinafter referred to as the current time's gait trapezoid height bcurr) and b1 (hereinafter referred to as the first turning gait trapezoid height b1) at which Δθ1 and ΔVθ1 become zero may be determined and the obtained bcurr may be determined as the final height of the trapezoid of the current time's gait.

Meanwhile, the dynamic model related to the body posture angle of the robot 1 has the linear characteristic indicated by the flywheel FH illustrated in FIG. 9, so that the Δθ1 and ΔVθ1 have the following relationship with the current time's gait trapezoid height bcurr, the first turning gait trapezoid height b1, the difference θerr between the terminal body posture angle of a provisional current time's gait and the initial body posture angle of a normal gait, and the difference Vθerr between the terminal body posture angular velocity of the provisional current time's gait and the initial body posture angular velocity of the normal gait.

$$\Delta\theta1 = c11*bcurr + c12*b1 + \theta err + e1*V\theta err \qquad \text{Expression 52}$$

$$\Delta V\theta1 = c21*bcurr + c22*b1 + e2*V\theta err \qquad \text{Expression 53}$$

where c11, c12, c21, c22, e1, and e2 denote coefficients uniquely determined primarily on the basis of the gait cycle of the current time's gait, the gait cycle of the first turning gait, and the parameters (especially the parameter related to time) of the pattern of the body posture restoring moment ZMP-converted value ZMPrec.

Based on the principle described above, the gait generator 100 determines the trapezoid height as the unknown parameter of the ZMPrec as follows.

First, the gait generator 100 determines the difference in the body posture angle θerr and the difference in the body posture angular velocity V$\theta$err at the boundary of the provisional current time's gait and the normal gait.

Subsequently, the gait generator 100 determines c11, c12, c21, c22, e1 and e2, which are the coefficients of expressions 52 and 53, primarily on the basis of the gait cycle of the current time's gait, the gait cycle of the first turning gait, and the parameters (especially the parameter related to time) of the pattern of the body posture restoring moment ZMP-converted value ZMPrec.

Subsequently, the gait generator 100 determines the current time's gait trapezoid height bcurr and the first turning gait trapezoid height b1 such that the value of the calculation result of the right side of each of expressions 52 and 53 is zero. More specifically, bcurr and b1 are determined by solving simultaneous equations obtained by setting the left sides of equation 52 and equation 53 to zero.

Then, the gait generator 100 determines the bcurr, which has been obtained as described above, as the trapezoid height of the trapezoidal pattern of the body posture restoring moment ZMP-converted value (ZMPrec) of the current time's gait.

After determining the pattern of the body posture restoring moment ZMP-converted value ZMPrec in S718 as described above, the gait generator 100 proceeds to S720. In this step S720, the gait generator 100 determines, as the desired ZMP trajectory of the current time's gait, the pattern obtained by superimposing or adding the pattern of the body posture restoring moment ZMP-converted value, which has been determined in S718, over or to the current provisional desired ZMP trajectory P-ZMPT (the provisional desired ZMP trajectory P-ZMPT when the gait generator 100 leaves the repetitive loop of S702 to S716).

The gait parameters of the current time's gait are finally determined such that the body posture angle trajectory of the current time's gait connects to the normal gait while restraining the body horizontal position trajectory from deviating from the horizontal position trajectory of the provisional current time's gait (eventually maintaining the state wherein the terminal divergent component of the current time's gait substantially coincides with the initial divergent component of the normal gait) by determining the desired ZMP trajectory of the current time's gait by superimposing the pattern of the body posture restoring moment ZMP-converted value over the provisional desired ZMP trajectory P-ZMPT as described above.

Returning to FIG. 12, after correcting the current time's gait parameters (after determining the current time's gait parameters) in S068 as described above, the gait generator 100 proceeds to S070 to determine whether the corrected desired ZMP trajectory C-ZMPT satisfies the condition on the ZMP existence permissible region.

Here, the provisional desired ZMP trajectory P-ZMPT is set in S066 such that it lies in a supporting polygon as described above (more specifically, the instantaneous value of the provisional desired ZMP trajectory P-ZMPT at each time lies within the supporting polygon at that time). However, the provisional desired ZMP trajectory P-ZMPT is corrected on the basis of the aforesaid ZMP correction amount or the like in S068 in order to converge the motion trajectory of the current time's gait of the robot 1 to the motion trajectory of the normal gait in the future (more specifically, in order to cause the terminal divergent component of the current time's gait to coincide or substantially coincide with the initial divergent component of the normal gait). This inconveniently causes the corrected desired ZMP trajectory C-ZMPT determined in S068 to deviate from the region of a supporting polygon in some cases.

The determination processing in S070 is the processing for checking whether a corrected desired ZMP satisfies the condition on the ZMP existence permissible region. The condition on the ZMP existence permissible region in the determination processing is a requirement that the instantaneous value at each time of the desired ZMP trajectory lie within a predetermined ZMP existence permissible region in the supporting polygon at that particular time.

To be more specific, in S070, the gait generator 100 calculates the foot position/posture trajectory of each foot 22 of the current time's gait on the basis of the foot position/posture trajectory parameters determined in S066, and then calculates the supporting polygon at each time (the time at each predetermined notch interval) from current time t (the time of the current control cycle of the gait generator 100) to the end of the current time's gait on the basis of the foot position/posture trajectory. Further, the gait generator 100 sets the ZMP existence permissible region in the obtained supporting polygon.

In this case, the ZMP existence permissible region may be a region that matches a supporting polygon or may be a region that is slightly smaller than the supporting polygon to provide an allowance. Further, the contour of the ZMP existence permissible region may be of course the same as that of the supporting polygon or may be different from that of the supporting polygon (e.g., a contour that is simpler than the supporting polygon, such as a simple rectangle) as long as it remains within the supporting polygon.

Then, the gait generator 100 determines whether the desired ZMP trajectory satisfies the condition on the ZMP existence permissible region by determining whether the desired ZMP at each time (each time after the current time) of the current time's gait lies within the ZMP existence permissible region at that particular time. If the determination result in S070 is affirmative, then the gait generator 100 proceeds to S072 to set the value of a flag to 1, deciding that a proper current time's gait (a current time's gait that enables the legged robot 1 to accomplish a continuous motion) can be generated.

If the determination result in S070 is negative, then the gait generator 100 carries out the determination processing in S074. In this step S074, the gait generator 100 determines whether the desired landing position of the supporting leg foot 22 of the next time's gait can be changed so as to satisfy the condition on the ZMP existence permissible region and the requirement for securing motional continuity within the range in which the aforesaid geometric leg motion requirements can be satisfied.

Here, the requirement for securing motional continuity is generally a condition that a desired motion trajectory of the robot 1 to be generated will be a desired motion trajectory that enables the robot 1 to perform a continuous motion at a stable posture without disturbing the stable posture of the robot 1.

In this case, according to the present embodiment, the gait generator 100 generates the motion trajectory of the current time's gait by using a dynamic model of the robot 1 such that the terminal divergent component in the motion trajectory of the current time's gait coincides or substantially coincides with the initial divergent component of the normal gait. In other words, the gait generator 100 generates the motion trajectory of the current time's gait by using the dynamic model such that the aforesaid requirement for the motional continuity is satisfied by generating the motion trajectory of the current time's gait that permits convergence to the motion trajectory of the normal gait in the future. Further, in this case, the gait generator 100 adjusts the desired ZMP trajectory as an element related to a floor reaction force, which is to be applied to the robot 1 on the dynamic model, in order to generate a motion trajectory of the current time's gait that satisfies the requirement for the motional continuity.

The aforesaid supporting polygon at each time of the current time's gait depends on the motion trajectories of the feet 22 and 22 of the two legs 2 and 2, so that changing, for example, the desired landing position of the supporting leg foot 22 of the next time's gait (i.e., the next time's gait supporting leg coordinate system) will automatically change the time-series pattern of the supporting polygon.

Hence, determining in S074 whether it is possible to change the desired landing position of the supporting leg foot 22 of the next time's gait such that the aforesaid condition on the ZMP existence permissible region and the aforesaid requirement for motional continuity are satisfied within a range in which the geometric leg motion requirement can be satisfied means, in other words, determining whether it is possible to set the desired ZMP trajectory of the current time's gait such that the requirement for the motional continuity is satisfied while allowing the instantaneous value of the desired ZMP to lie in the ZMP existence permissible region in the supporting polygon when it is assumed that the desired landing position of the supporting leg foot 22 of the next time's gait has been changed, and also determining whether it is possible to allow the changed desired landing position of the supporting leg foot 22 of the next time's gait to lie in the geometrically permissible landing region 22G for satisfying the geometric leg motion requirement.

The determination processing in S074 described above can be carried out, for example, as follows. The gait generator 100 sets the change amount of the desired landing position of the supporting leg foot 22 of the next time's gait (the change amount of the position of the origin of the next time's gait supporting leg coordinate system) primarily on the basis of the amount or the direction of deviation of the desired ZMP trajectory, on which the determination result in S070 has been negative, from the ZMP existence permissible region. The change amount (including the change direction) is the amount of a change of the supporting leg foot 22, which corresponds to the previously determined latest next time's gait supporting leg coordinate system, from the desired landing position in the processing in S040. The magnitude of the change amount is limited to a predetermined range.

Then, the gait generator 100 determines whether the changed desired landing position of the supporting leg foot 22 of the next time's gait lies in the geometrically permissible landing region 22G set in the current time's gait supporting leg coordinate system as described in S060. If the changed desired landing position does not lie in the geometrically permissible landing region 22G, i.e., if the desired landing position of the supporting leg foot 22 corresponding to the previously determined latest next time's gait supporting leg coordinate system has been set at or in the vicinity of the boundary of the geometrically permissible landing region 22G, causing the changed desired landing position to deviate from the geometrically permissible landing region 22G, then the gait generator 100 decides that the determination result in S074 is negative.

Further, if the changed desired landing position of the supporting leg foot 22 of the next time's gait lies in the geometrically permissible landing region 22G set in the current time's gait supporting leg coordinate system, then the gait generator 100 sets the position of the origin of the next time's gait supporting leg coordinate system at the position corresponding to the changed desired landing position and sets anew the next time's gait supporting leg coordinate system, the next but one time's gait supporting leg coordinate system, the cycle of the current time's gait, and the cycle of the next time's gait. In this case, the supporting leg coordinate systems and the gait cycles may be set in the same manner as that in the processing in S060 described above except for the setting of the position of the origin of the next time's gait supporting leg coordinate system.

Subsequently, the gait generator 100 carries out the same processing as the processing from S062 to S070 described above on the basis of the next time's gait supporting leg coordinate system, the next but one time's gait supporting leg coordinate system, the cycle of the current time's gait, and the cycle of the next time's gait, which have been set anew. If the determination result in S070 is affirmative, then the gait generator 100 decides that the determination result in S074 is affirmative.

If the determination result in S070 at that time is negative, then the gait generator 100 sets again the change amount of the desired landing position of the supporting leg foot 22 of the next time's gait in the same manner as that described above and then carries out the processing that follows the resetting of the change amount in the same manner as that described above. Lastly, if the changed desired landing position of the supporting leg foot 22 of the next time's gait deviates from the geometrically permissible landing region 22G set in the current time's gait supporting leg coordinate system, then the gait generator 100 decides that the determination result in S074 is negative.

The above has described the determination processing carried out in S074.

Alternatively, at the time of the first change of the desired landing position of the supporting leg foot 22 of the next time's gait, the candidate value or values of a single or a plurality of types of change amounts (a plurality of types of change amounts that differ from each other in the change direction or the like) of the desired landing position may be set, and the same processing as the aforesaid processing may be carried out on the basis of the candidate values thereby to presume the relationship between the change amount of the desired landing position and the correction amount of the desired ZMP trajectory (the amount of correction from the provisional desired ZMP trajectory P-ZMPT provisionally determined in S064) for satisfying the requirement for the motional continuity. Then, the change amount of the desired landing position may be set anew, taking the presumed relationship into account. This makes it possible to reduce the number of repetitions of the processing from S062 to S068 to be carried out in S074.

If the determination result in S074 described above is affirmative, then the gait generator 100 determines that a proper current time's gait can be generated and sets the value of the flag to 1, as in S072. If the determination result in S078 is negative, then the gait generator 100 determines that a proper current time's gait cannot be generated and sets the value of the flag to zero.

The above has described the details of the processing which is illustrated by the flowchart of FIG. 12 and which is carried out in S040. By this processing, it is determined whether a proper current time's gait that enables the robot 1 to continue its motion can be generated in the case where it is assumed that the operation mode of the next time's gait has been determined to be the operation mode of both legs alternately leaving from/landing on a floor.

Returning to FIG. 11, the gait generator 100 carries out the determination processing in S042 after carrying out the processing in S040 as described above. More specifically, the gait generator 100 checks the value of the flag set in S040 to determine whether a proper current time's gait can be generated. If the determination result is affirmative (if the value of the flag is 1), then the gait generator 100 proceeds to S044. In this step S044, the gait generator 100 determines the operation mode of the next time's gait to be the operation mode of both legs alternately leaving from/landing on a floor.

The case where the determination result in S042 is negative is the case where a current time's gait that satisfies all of the geometric leg motion requirement, the condition on the ZMP existence permissible region, and the motion continuity requirement cannot be generated if the operation mode of the next time's gait is determined to be the operation mode of both legs alternately leaving from/landing on a floor.

In this case, therefore, the gait generator 100 carries out, in S046, the processing for determining whether a proper current time's gait that enables the robot 1 to continue its motion at a stable posture can be generated, assuming that the operation mode of the next time's gait has been determined to be the one-leg hopping operation mode.

In this step S046, the processing illustrated by the flowchart of FIG. 12 is carried out, as in S040. In this case, however, the processing in S046 differs from the processing in S040 mainly in the specific method for setting some gait parameters. Hence, in the description of the processing in S046 will be mainly focused on the aspects that are different from those in the processing in S040 and the description of the same aspects of the processing will be omitted. Further, in the following description, the processing in S046 will be denoted by a suffix "b" and the processing in S040 will be denoted by a suffix "a" in order to distinguish the processing in S046 and the processing in S040. For example, the processing of S060 in S046 will be denoted by S060b and the processing of S060 in S040 will be denoted by S060a.

In S060b, the gait generator 100 determines the next time's gait supporting leg coordinate system, the next but one time's supporting leg coordinate system, the cycle of the current time's gait, and the cycle of the next time's gait, as with S060a described above. In this case, however, the next but one time's gait supporting leg coordinate system and the cycle of the next time's gait are determined on the assumption that the operation mode of the next time's gait is the one-leg hopping operation mode. The rest of the processing in S060b is the same as the processing in S060a.

Figure 33:
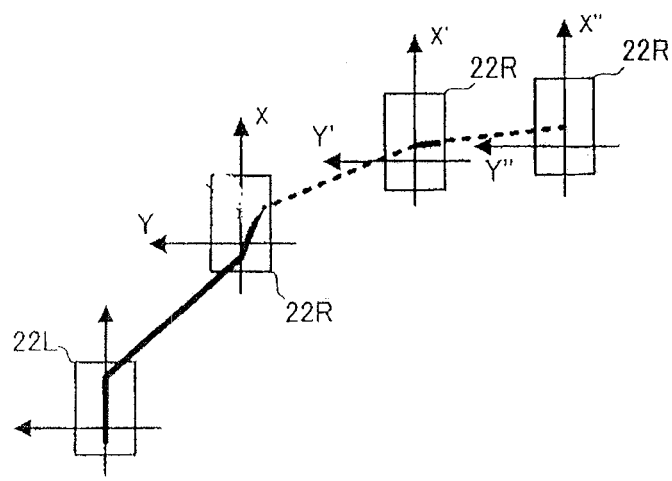
FIG. 33 is a diagram illustrating the landing position/posture of a foot of a robot in a one-leg hopping gait and a supporting leg coordinate system.

FIG. 33 illustrates the next time's gait supporting leg coordinate system and the next but one time's gait supporting leg coordinate system determined in S060b in the case where the operation mode of the next time's gait is the one-leg hopping operation mode. In this illustrated example, the operation mode of the current time's gait is also the one-leg hopping operation mode. Further, in the illustrated example, the one-leg hopping gait in the current time's gait and the next time's gait is a gait in which the right leg 2R is the supporting leg, and the robot 1 moves approximately in the right direction in the floating phase in each of the current time's gait and the next time's gait. In the illustrated example, the last time's gait is a walking gait.

Subsequently, the gait generator 100 determines the gait parameters of a normal turning gait in S062b. In this step S062b, the processing illustrated by the flowchart of FIG. 16 is carried out in the same manner as that in S062a. In this case, however, the operation mode of the next time's gait is the one-leg hopping gait, so that the first turning gait and the second turning gait of the normal gait in S062b are both one-leg hopping gaits.

Hence, the processing in S062b differs from the processing in S062a, which has been described by taking the running gait as an example, in the method for setting some normal gait parameters.

To be more specific, the method for determining the foot trajectory parameters in S100b in the flowchart of FIG. 16, the method for determining the reference body posture trajectory parameters in S102b therein, and the method for determining the ZMP trajectory parameters in S110b are different from those in the processing in S100a, S102a, and S110a, respectively, described above.

In S100b, the gait generator 100 determines the foot trajectory parameters formed of the positions/postures of the supporting leg foot and the free leg foot at the start and the end, respectively, of each of the first turning gait and the second turning gait and the gait cycles of the turning gaits such that the foot position/posture trajectory connects in the order of the current time's gait, the first turning gait, and the second turning gait. The guideline for determining the foot trajectory parameters is the same as that for S100a. To be more specific, in S100b, the foot trajectory parameters are determined, for example, as described below. Here, for the sake of understanding, it is assumed that the current time's gait is a one-leg hopping gait, as an example.

More specifically, the free leg foot position/posture at the start of the first turning gait of the foot trajectory parameters are the free leg foot position/posture at the end of the current time's gait observed from the next time's gait supporting leg coordinate system.

According to the present embodiment, if the current time's gait is the one-leg hopping gait, then the free leg foot position/posture at the end of the current time's gait observed from the next time's gait supporting leg coordinate system are predetermined position/posture which have been set beforehand (the position/posture in the air, which will be hereinafter referred to as the free leg foot position/posture at the end of the one-leg hopping gait).

Further, the supporting leg foot position/posture at the start of the first turning gait are the supporting leg foot position/posture at the end of the current time's gait observed from the next time's gait supporting leg coordinate system. In this case, according to the present embodiment, if the current time's gait is the one-leg hopping gait, then the supporting leg foot position/posture at the end of the current time's gait observed from the next time's gait supporting leg coordinate system are the aforesaid basic landing position/posture that are determined on the basis of the next time's gait supporting leg coordinate system.

The free leg foot position/posture at the end of the first turning gait are expressed by the foot position/posture observed from the next time's gait supporting leg coordinate system and are set such that the foot position/posture coincide with the free leg foot position/posture at the end of the one-leg hopping gait when the foot position/posture are converted to the position/posture observed from the next but one time's gait supporting leg coordinate system.

The supporting leg foot position/posture at the end of the first turning gait are expressed by the foot position/posture observed from the next time's gait supporting leg coordinate system and are set such that the foot position/posture coincide with the aforesaid basic landing position/posture determined on the basis of next but one time's gait supporting leg coordinate system when the foot position/posture are converted to the position/posture observed from the next but one time's gait supporting leg coordinate system (the aforesaid basic landing position/posture that define the position of the origin of the next but one time's gait supporting leg coordinate system and the directions of the X-axis and the Y-axis).

The free leg foot position/posture at the start of the second turning gait are the free leg foot position/posture at the end of the first turning gait observed from the next but one time's gait supporting leg coordinate system (i.e., the free leg foot position/posture at the end of the one-leg hopping gait).

The supporting leg foot position/posture at the start of the second turning gait are the supporting leg foot position/posture at the end of the first turning gait observed from the next but one time's gait supporting leg coordinate system (i.e., the basic landing position/posture that define the position of the origin of the next but one time's gait supporting leg coordinate system and the directions of the X-axis and the Y-axis).

The free leg foot position/posture at the end of the second turning gait are expressed by the foot position/posture observed from the next but one time's gait supporting leg coordinate system and are set such that the foot position/posture coincide with the free leg foot position/posture at the end of the first turning gait observed from the next time's gait supporting leg coordinate system.

The supporting leg foot position/posture at the end of the second turning gait are expressed by the foot position/posture observed from the next but one time's gait supporting leg coordinate system and are set such that the foot position/posture coincide with the supporting leg foot position/posture at the end of the first turning gait observed from the next time's gait supporting leg coordinate system.

The gait cycles of the first turning gait and the second turning gait are set to be the same as the cycle of the next time's gait.

The above has described an example of the foot trajectory parameters determined in S100 when the operation mode of the next time's gait is the one-leg hopping operation mode.

Further, in S102b, the reference body posture trajectory parameter that defines the reference body posture trajectory of the normal gait is determined, for example, as described below.

According to the present embodiment, the reference body posture angle in a normal gait that repeats the one-leg hopping gait (hereinafter referred to as the one-leg hopping normal gait in some cases) takes a fixed value, and the reference body posture angle of the fixed value is determined as the reference body posture trajectory parameter. The reference body posture angle is a posture angle (inclination angle) set as described below.

In the reference body posture angle of the one-leg hopping normal gait, the component about the Y-axis, i.e., the pitch direction (the inclination angle about the Y-axis of the body 24 relative to the vertical direction) is zero. More specifically, the component about the Y-axis is set to a posture angle that causes the direction of the body trunk axis of the body 24 of the robot 1 to be the vertical direction as observed in an XZ plane (a sagittal plane), i.e., the body posture angle obtained when the robot 1 stands in its upright posture.

Meanwhile, in the reference body posture angle of the one-leg hopping normal gait, the component about the X-axis, i.e., the roll direction (the inclination angle about the X-axis of the body 24 relative to the vertical direction) is set to a posture angle that causes the direction of the body trunk axis of the body 24 of the robot 1 to incline to the right or left of the robot 1 from the vertical direction as observed in a YZ plane (a lateral plane).

Figure 34:
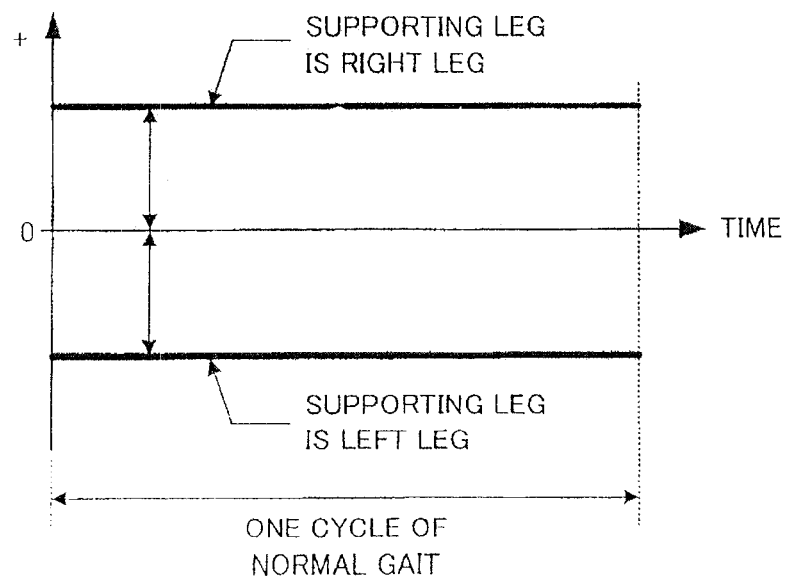
FIG. 34 is a graph illustrating an example of setting a reference body posture angle about an X-axis (in a roll direction) in the one-leg hopping gait.

To be more specific, as illustrated in FIG. 34, if the supporting leg of the one-leg hopping normal gait is the right leg 2R, then the reference body posture angle about the X-axis is set to a posture angle at which the direction of the body trunk axis of the body 24 is inclined in the positive direction (the clockwise direction as observed from the robot 1 facing toward the front) about the X-axis from the vertical direction by the body posture angle in the roll direction for the one-leg hopping in the figure, which is a predetermined angle, over the entire one-cycle period of the one-leg hopping normal gait.

If the supporting leg of the one-leg hopping normal gait is the left leg 2L, then the reference body posture angle about the X-axis is set to a posture angle at which the direction of the body trunk axis of the body 24 is inclined in the negative direction (the counterclockwise direction as observed from the robot 1 facing toward the front) in the roll direction (about the X-axis) from the vertical direction by the body posture angle in the aforesaid roll direction for the one-leg hopping over the entire one-cycle period of the one-leg hopping normal gait.

In the description of the present embodiment, the reference body posture angle in a state wherein the direction of the body trunk axis of the body 24 coincides with the vertical direction (a state wherein the body posture coincides with the body posture taken when the robot 1 stands in the upright posture) is zero.

The body posture angle in the roll direction for the one-leg hopping is set according to the guideline, which will be described below with reference to FIG. 35 and FIG. 36.

Figure 35:
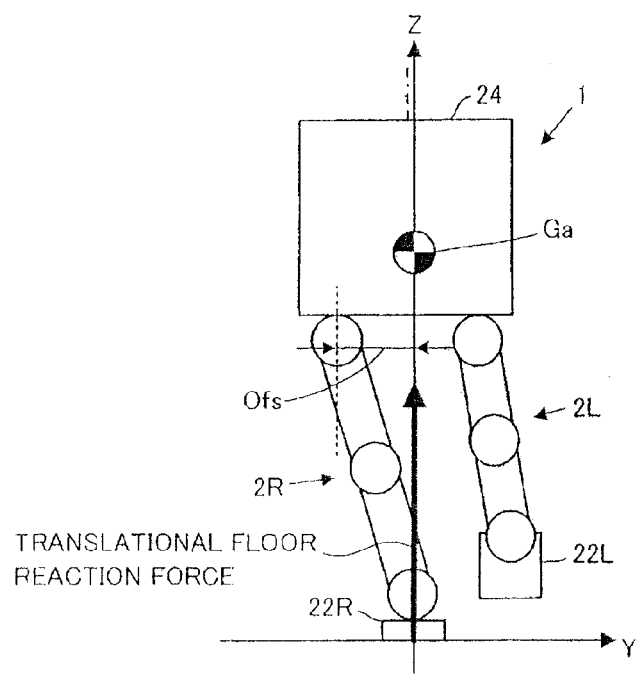
FIG. 35 is a diagram for explaining a guideline for setting the reference body posture angle shown in FIG. 34.

FIG. 35 illustrates a motional state of the robot 1, which is observed when it is assumed that the body posture angle has been set to zero without the body 24 being inclined, in a state wherein the supporting leg (the right leg 2R in the illustrated example) after a floating phase in a one-leg hopping gait. This motional state corresponds to the motional state at time between time t3 and t4 in the one-leg hopping gait illustrated in FIG. 7.

In the state immediately after the supporting leg lands on a floor after the floating phase in the one-leg hopping gait, the line of action of the translational floor reaction force acting on the robot 1 from the ground contact surface of the supporting leg foot 22 (22R) is required to pass the vicinity of an total center of gravity Ga of the robot 1 (a center-of-gravity point Ga of the entire robot 1), as illustrated in the figure. This is because, if the line of action considerably deviates from the total center of gravity Ga, then a moment attributable to a floor reaction force would be generated about the total center of gravity Ga, inconveniently causing the entire robot 1 to considerably rotate.

In this situation, as illustrated in FIG. 35, if the body posture angle were set to zero without inclining the body 24, then a distance Ofs in the Y-axis direction (the lateral direction of the robot 1) between the hip joint of the supporting leg and the line of action of the translational floor reaction force would be relatively large.

Hence, the hip joint of the supporting leg would be subjected to a relatively large moment in the roll direction (about the X-axis) due to the translational floor reaction force in an approximately vertical direction. Especially, the translational floor reaction force becomes large in the vicinity of the time (in the vicinity of time t4 in FIG. 7) when the height of the total center of gravity Ga of the robot 1 reaches a lowest point by bending the supporting leg after the supporting leg lands on the floor following the floating phase, thus leading to the aforesaid large moment. It would be necessary, therefore, to apply a relatively large drive torque against the aforesaid moment to the hip joint of the supporting leg.

Figure 36:
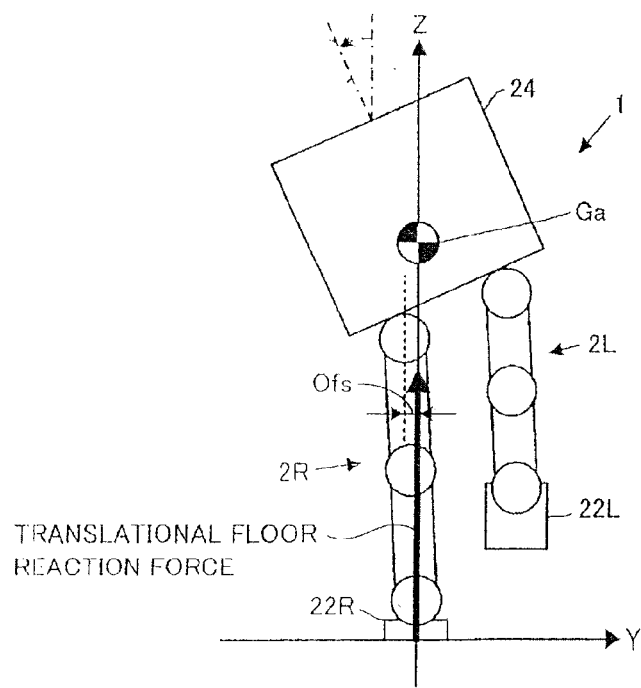
FIG. 36 is a diagram illustrating the motional state of the robot associated with the reference body posture angle shown in FIG. 34.

According to the present embodiment, therefore, the body 24 in the one-leg hopping gait is inclined as illustrated in FIG. 36 so as to reduce the moment acting on the hip joint of the supporting leg in the state wherein the supporting leg comes in contact with the floor after the floating phase. More specifically, in the inclined body posture, the direction of the body trunk axis of the body 24 is inclined from the vertical direction such that the hip joint of the free leg (the left leg 2L in the illustrated example) is at a relatively higher position than that of the hip joint of the supporting leg (the right leg 2R in the illustrated example).

Tilting the body trunk axis of the body 24 from the vertical direction such that the hip joint of the free leg is located at a relatively higher position than the hip joint of the supporting leg when the supporting leg is the right leg 2R can be accomplished by tilting the body trunk axis of the body 24 in the positive direction about the X-axis (in the clockwise direction as observed from the robot 1 facing to the front) relative to the vertical direction. Further, tilting the body trunk axis of the body 24 from the vertical direction such that the hip joint of the free leg is located at a relatively higher position than the hip joint of the supporting leg when the supporting leg is the left leg 2L can be accomplished by tilting the body trunk axis of the body 24 in the negative direction about the X-axis (in the counterclockwise direction as observed from the robot 1 facing to the front) relative to the vertical direction.

Thus, in the state wherein each joint of the supporting leg 2 is moved such that the total center of gravity Ga of the robot 1 lies at the position substantially right above the ground contact surface of the supporting leg foot 22 by tilting the body posture of the robot 1 is inclined about the X-axis relative to the vertical direction, the distance Ofs in the Y-axis direction (the lateral direction of the robot 1) between the hip joint of the supporting leg and the line of action of the translational floor reaction force can be reduced as illustrated in FIG. 36, as compared with the case where the body posture angle is zero (the case illustrated in FIG. 35). This makes it possible to reduce the moment that acts on the hip joint of the supporting leg due to the translational floor reaction force.

The body posture angle in the roll direction for the one-leg hopping illustrated in FIG. 34 is the reference desired value of the body posture angle about the X-axis that has been set so as to make it possible to reduce the moment acting on the hip joint of the supporting leg as described above. The body posture angle in the roll direction for the one-leg hopping is preset such that the aforesaid distance Ofs is zero or takes a value within a predetermined range in the vicinity of zero in the case where each joint of the supporting leg 2 is moved such that the body posture angle of the robot 1 coincides with the body posture angle in the roll direction for the one-leg hopping and the total center of gravity Ga is positioned substantially right above the ground contact surface of the supporting leg foot 22 in contact with the floor.

In the present embodiment, the reference body posture angle of the one-leg hopping normal gait has been set to a fixed value throughout the normal gait. Alternatively, however, the reference body posture angle may be continuously changed within a one-cycle period of the one-leg hopping normal gait. In this case, however, the reference body posture angle about the X-axis is changed such that the reference body posture angle about the X-axis will be the aforesaid body posture angle in the roll direction for the one-leg hopping or a posture angle approximating thereto in the period during which the supporting leg comes in contact with the floor after the floating phase (especially in the period in the vicinity of a point at which the magnitude of a floor reaction force vertical component acting on the robot 1 reaches its maximum).

Further, in S110b, the ZMP trajectory parameters that define a desired ZMP trajectory are determined such that a desired ZMP lies within a supporting polygon, a high stability allowance is ensured, and no sudden change is developed. The guideline for determining such ZMP trajectory parameters is the same as that used in S110a. More specifically, the ZMP trajectory parameters are determined in S100b, for example, as described below.

The desired ZMP trajectory in the first turning gait of the one-leg hopping normal gait is determined as illustrated, for example, by the desired ZMP trajectory between the supporting leg foot 22 (22R in FIG. 33) corresponding to the next time's gait supporting leg coordinate system in FIG. 33 and the supporting leg foot 22 (22R in the illustrated example) corresponding to the next but one time's gait supporting leg coordinate system. Incidentally, the portions denoted by the solid lines in the desired ZMP trajectory illustrated in FIG. 33 indicate the desired ZMP trajectory in a state wherein the supporting leg foot 22 is in contact with a floor, while the portions denoted by the dashed lines indicate the desired ZMP trajectory in a floating phase.

In the example illustrated in FIG. 33, the point located substantially at the center of the ground contact surface of the supporting leg foot 22 (22R in the illustrated example) corresponding to a next time's gait supporting leg coordinate system is set as the desired ZMP at the start of the one-leg hopping normal gait (the start of the first turning gait). Further, the point located substantially at the center of the ground contact surface of the supporting leg foot 22 (22R in the illustrated example) corresponding to a next but one time's gait supporting leg coordinate system is set as the desired ZMP at the end of the first turning gait.

The desired ZMP trajectory in the first turning gait is set such that the position of the ZMP continuously changes from the desired ZMP at the start thereof to the desired ZMP at the end thereof. In this case, the desired ZMP in a one-leg supporting period may be maintained constant during a part of the one-leg supporting period (e.g., during a period immediately following the start of the one-leg supporting period).

Although not illustrated, the desired ZMP trajectory in the second turning gait of the one-leg hopping normal gait is set in the same manner as described above.

In this case, the desired ZMPs at the start and the end of each of the first turning gait and the second turning gait, the desired ZMP immediately before the start of a floating phase (immediately before the end of a one-leg supporting period) and the like are determined as the ZMP trajectory parameters of the one-leg hopping normal gait.

The processing illustrated by the flowchart of FIG. 16 in S062b is the same as the processing in S062a except for the processing in S100b, S102b and S110b described above.

Returning to FIG. 12, the gait generator 100 then determines the initial state of the normal turning gait in S064b. In this step S064b, the processing illustrated by the flowcharts of FIG. 20 to FIG. 23 is carried out in the same manner as that for the processing in S064a.

Subsequently, the gait generator 100 provisionally determines the gait parameters of the current time's gait in S066b. The processing in S066b is carried out according to the flowchart given in FIG. 25. Here, as an example, the processing illustrated by the flowchart in FIG. 25 will be described for the case where the current time's gait is a running gait and a case where the current time's gait is a one-leg hopping gait.

First, in S600b, the gait generator 100 determines the foot trajectory parameters of the current time's gait such that the foot position/posture trajectory of the current time's gait uninterruptedly leads into the foot position/posture trajectory of a normal gait. The method for determining the foot trajectory parameters is the same as that of the processing in S600a regardless of whether the current time's gait is a running gait or a one-leg hopping gait.

Subsequently, in S602b, the gait generator 100 determines the reference body posture trajectory parameters of the current time's gait such that the reference body posture trajectory of the current time's gait uninterruptedly leads into the reference body posture trajectory of the normal gait.

In the processing, if the current time's gait is the one-leg hopping gait, then the reference body posture trajectory parameters of the current time's gait are determined such that the reference body posture angle of the current time's gait is maintained at the same fixed value as that of the reference body posture angle in the one-leg hopping normal gait. More specifically, the reference body posture angle about the X-axis and the reference body posture angle about the Y-axis are set to zero body posture angles in the roll direction for the one-leg hopping for each thereof. These values are determined as the reference body posture trajectory parameters of the current time's gait.

Further, if the current time's gait is a running gait, then the reference body posture trajectory parameters of the current time's gait are determined such that the reference body posture angle of the current time's gait continuously changes from the reference body posture angle for the gait of both legs alternately leaving from/landing on a floor (more specifically, the reference body posture angle in the case where the normal gait is the gait of both legs alternately leaving from/landing on a floor) to the reference body posture angle for the one-leg hopping gait (more specifically, the reference body posture angle in the case where the normal gait is the one-leg hopping normal gait).

In this case, according to the present embodiment, the component about the Y-axis of the reference body posture angle for the gait of both legs alternately leaving from/landing on a floor and the component about the Y-axis of the reference body posture angle for the one-leg hopping gait are both zero, so that the component about the Y-axis of the reference body posture angle of the current time's gait is maintained to zero.

Figure 37:
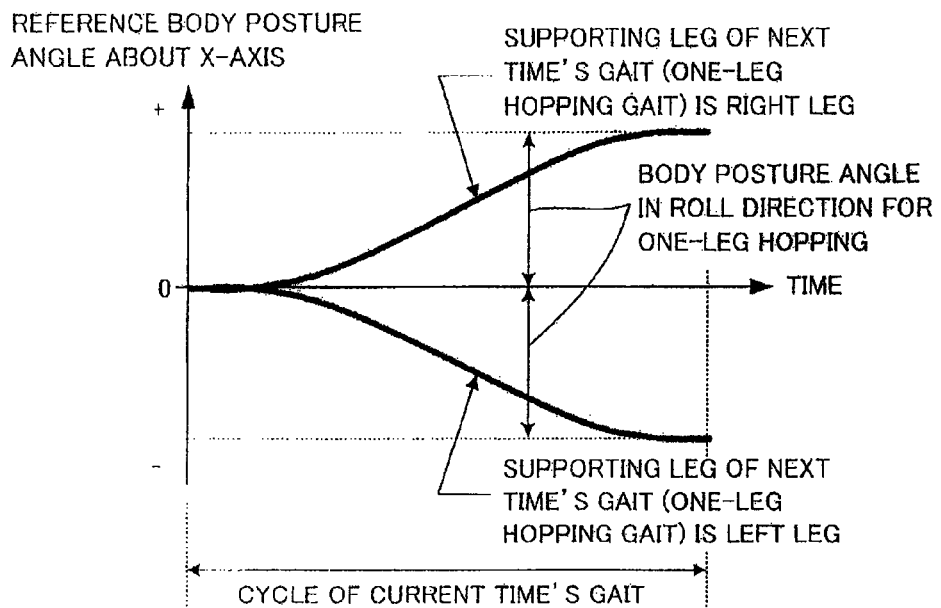
FIG. 37 is a graph illustrating an example of setting the reference body posture angle about the X-axis (in the roll direction) in the case where the operation mode is changed from the gait of both legs alternately leaving from/landing on a floor to the one-leg hopping gait.

Meanwhile, the component about the X-axis of the reference body posture angle for the gait of both legs alternately leaving from/landing on a floor and the component about the X-axis of the reference body posture angle for the one-leg hopping gait are zero, and the body posture angle in the roll direction for the one-leg hopping is not zero ($\neq 0$), so that the component about the Y-axis of the reference body posture angle of the current time's gait is set such that it continuously changes from zero to the body posture angle in the roll direction for the one-leg hopping, as illustrated in, for example, FIG. 37.

Figure 38:
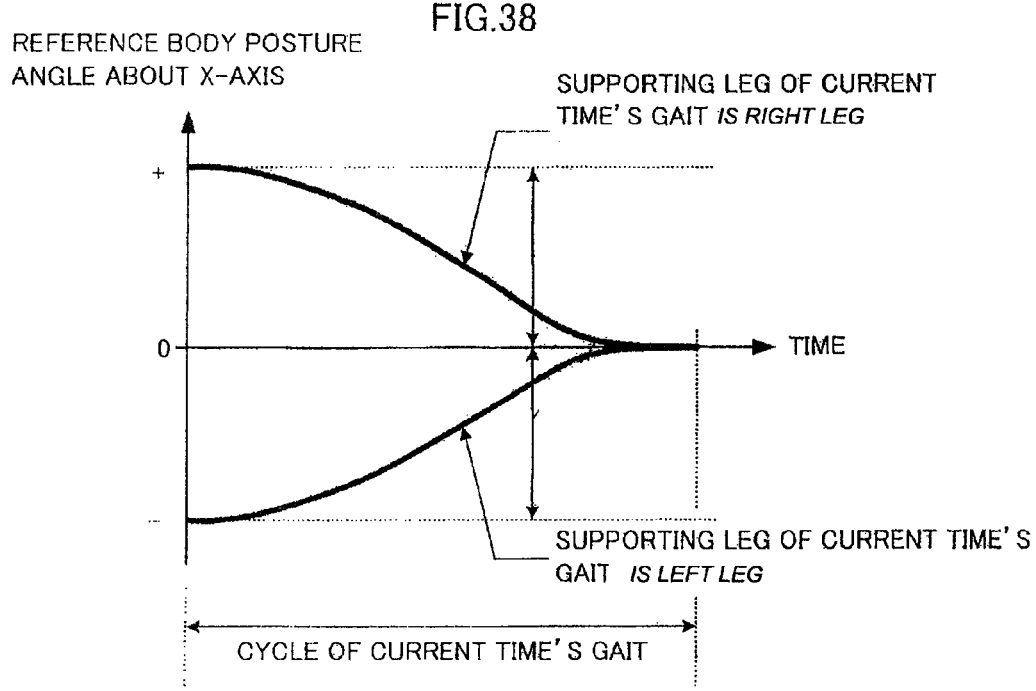
FIG. 38 is a graph illustrating an example of setting the reference body posture angle about the X-axis (in the roll direction) in the case where the operation mode is changed from the one-leg hopping gait to the gait of both legs alternately leaving from/landing on a floor.

Supplementarily, in the processing in S602a in the aforesaid S040 wherein the operation mode of the next time's gait is assumed to be the operation mode of both legs alternately leaving from/landing on a floor, if the operation mode of the current time's gait is, for example, the one-leg hopping gait, then the reference body posture trajectory parameters of the current time's gait are determined such that the reference body posture angle of the current time's gait is continuously changed from the reference body posture angle for the one-leg hopping gait to the reference body posture angle for the gait of both legs alternately leaving from/landing on a floor. Hence, the component about the X-axis of the reference body posture angle of the current time's gait in this case is set such that the component continuously changes from the body posture angle in the roll direction for the one-leg hopping to zero, as illustrated in FIG. 38, which is opposite from the case illustrated in FIG. 37. The component about the Y-axis of the reference body posture angle of the current time's gait in this case is maintained to zero.

Subsequently, the gait generator 100 proceeds to S604b to determine the arm posture trajectory parameter of the current time's gait. The processing is the same as that in S604a regardless of whether the current time's gait is the running gait or the one-leg hopping gait.

Subsequently, the gait generator 100 proceeds to S606b to determine the floor reaction force vertical component trajectory parameter of the current time's gait. The processing is the same as the processing in S606a, which has been previously explained about the case where the current time's gait is a running gait, regardless of whether the current time's gait is the running gait or the one-leg hopping gait.

Subsequently, the gait generator 100 proceeds to S608b to determine the permissible range of a floor reaction force horizontal component [Fxmin, Fxmax] (specifically, the parameters that define the pattern of the permissible range of the floor reaction force horizontal component). The processing determines the permissible range of the floor reaction force horizontal component according to the aforesaid expressions 12a and 12b from the floor reaction force vertical component trajectory determined in S606b, as with the processing in S608a.

Then, the gait generator 100 proceeds to S610b to provisionally determine the ZMP trajectory parameters that define the ZMP trajectory of the current time's gait. The processing provisionally determines the ZMP trajectory parameters such that the desired ZMP defined thereby continuously changes in a supporting polygon in the current time's gait from the desired ZMP at the end of a last time's gait to the desired ZMP at the start of a normal gait with a high stability allowance while restraining sudden changes.

To be more specific, as an example, if the current time's gait is a running gait, then the desired ZMP trajectory of the current time's gait is set as explained about the processing in S610b. For example, the position of the desired ZMP trajectory of the current time's gait in the X-axis direction is determined according to one of the patterns illustrated in FIG. 28. Then, the positions and time of the breakpoints of the desired ZMP trajectory are determined as the desired ZMP trajectory parameters of the current time's gait.

Further, if the current time's gait is the one-leg hopping gait, then the desired ZMP trajectory of the current time's gait is determined as indicated by, for example, the desired ZMP trajectory between the supporting leg foot 22 (22R in the illustrated example) corresponding to the current time's gait supporting leg coordinate system and the supporting leg foot (22R in the illustrated example) corresponding to the next time's gait supporting leg coordinate system illustrated in FIG. 33.

In this example, the last time's gait is the gait of both legs alternately leaving from/landing on a floor, and the desired ZMP is set such that it continuously moves from the position adjacent to the heel of the supporting leg foot 22 (22R), i.e., the position of the desired ZMP at the end of the last time's gait, to the position adjacent to the front right of the ground contact surface of the supporting leg foot 22 in the one-leg supporting period of the current time's gait. Then, in the floating phase, the desired ZMP is set such that it continuously moves from the position adjacent to the front right of the ground contact surface of the supporting leg foot 22 to the point located substantially at the center of the ground contact surface of the supporting leg foot 22 (22R) corresponding to the next time's gait supporting leg coordinate system, i.e., the position of the desired ZMP at the start of a normal gait. In this case, the desired ZMP in the one-leg supporting period may be maintained constant in a part of the period of the one-leg supporting period.

Further, the position or the like of the desired ZMP immediately before the end of the one-leg supporting period in the desired ZMP trajectory set as described above is determined as the ZMP trajectory parameter of the current time's gait.

The desired ZMP trajectory defined by the ZMP trajectory parameters determined in S610b as described above is the provisional desired ZMP trajectory P-ZMPT of the current time's gait as with the one determined in S610a.

Subsequently, the gait generator 100 proceeds to S612b to determine the body posture restoring period [Ta, Tb]. The processing is the same as the processing in S612a. Start time Ta of the body posture restoring period corresponds to Tm in the second turning gait of a normal gait, while end time Tb of the body posture restoring period corresponds to Ts2 in the second turning gait of the normal gait. The time Ta and time Tb are set in the same manner as that for Tm and Ts2, respectively. Thus, the body posture restoring period [Ta, Tb] is determined as illustrated in FIG. 26.

This completes the description of the processing carried out in S066b.

Returning to FIG. 12, after carrying out the processing in S066b (the processing for determining or provisionally determining the gait parameters of the current time's gait) as described above, the gait generator 100 proceeds to S068b to correct the gait parameters of the current time's gait (determine the current time's gait parameters). The gait parameters to be corrected here are the ZMP trajectory parameters that define the aforesaid provisional desired ZMP trajectory P-ZMPT. By the processing in this step S068, the ZMP trajectory parameters are corrected to cause the body position/posture trajectories of the current time's gait to continue to or gradually approximate to a normal gait.

In this step S068b, the provisional desired ZMP trajectory P-ZMPT is corrected by the processing illustrated by the flowcharts of FIG. 29 to FIG. 32, as with S068a, such that the aforesaid motional continuity requirement is satisfied (such that the terminal divergent component of the current time's gait coincides or substantially coincides with the initial divergent component of the normal gait) regardless of whether the current time's gait is the running gait or the one-leg hopping gait. Thus, the current time's gait parameters are determined.

Subsequently, the gait generator 100 proceeds to S070b to determine whether the corrected desired ZMP trajectory C-ZMPT satisfies the condition on the ZMP existence permissible region, as with S070a. If the determination result is affirmative, then the gait generator 100 proceeds to S072b and sets the value of the flag back to 1, deciding that a proper current time's gait can be generated.

If the determination result in S070b is negative, then the gait generator 100 proceeds to S074b to determine whether the desired landing position of the supporting leg foot 22 of the next time's gait can be changed so as to satisfy the condition on the ZMP existence permissible region and the requirement for securing motional continuity within the range in which the aforesaid geometric leg motion requirements can be satisfied. The determination processing is carried out in the same manner as that in the aforesaid S074a.

If the determination result in S074b is affirmative, the gait generator 100 proceeds to S076b and sets the value of the flag back to 1, deciding that a proper current time's gait can be generated.

If the determination result in S074b is negative, then the gait generator 100 proceeds to S078b and sets the value of the flag back to zero, deciding that a proper current time's gait cannot be generated.

The above has described the details of the processing which is illustrated by the flowchart of FIG. 12 and which is carried out in S046.

Returning to FIG. 11, the gait generator 100 carries out the determination processing in S048 after carrying out the processing in S046 as described above. More specifically, the gait generator 100 checks the value of the flag set in S046 to determine whether a proper current time's gait can be generated. If the determination result is affirmative (if the value of the flag is 1), then the gait generator 100 proceeds to S050. In this step S050, the gait generator 100 determines the operation mode of the next time's gait to be the one-leg hopping operation mode.

The case where the determination result in S048 is negative is the case where a current time's gait that satisfies all of the geometric leg motion requirement, the condition on the ZMP existence permissible region, and the motion continuity requirement cannot be generated regardless of whether the operation mode of the next time's gait is determined to be the operation mode of both legs alternately leaving from/landing on a floor or the one-leg hopping operation mode.

In this case, therefore, the gait generator 100 determines, in S052, the operation mode of the next time's gait to be an emergency operation mode.

Thus, the processing in S020 shown in FIG. 10 is terminated and the operation mode of the next time's gait is determined.

Returning to FIG. 10, the gait generator 100 carries out the determination processing in S022 after the processing in S020. In this processing, the gait generator 100 determines whether the operation mode of the current time's gait (the operation mode finally determined when the last time's gait was generated) is the emergency operation mode. Incidentally, the initial operation mode when the robot 1 starts traveling is, for example, the operation mode of both legs alternately leaving from/landing on a floor.

If the determination result in S022 is affirmative, then the gait generator 100 aborts the processing illustrated by the flowchart of FIG. 10, and carries out the processing for generating an emergency gait. In the processing for generating the emergency gait, the gait generator 100 generates a desired motion of the robot 1 that causes, for example, both legs 2 and 2 to promptly land on a floor and bend both legs 2 and 2 at the knee joints thereof to lower the total center of gravity of the robot 1, as illustrated in FIG. 8.

Meanwhile, if the determination result in S022 is negative, that is, if the operation mode of the current time's gait is the operation mode of both legs alternately leaving from/landing on a floor or the one-leg hopping operation mode, then the gait generator 100 proceeds to S026 to determine the gait parameters of the current time's gait.

In this case, the final current time's gait parameters determined in the processing in S020 as the parameters making it possible to generate a proper current time's gait that satisfies the aforesaid geometric leg motion requirement, the condition on the ZMP existence permissible region, and the motion continuity requirement are directly determined as the current time's gait parameters in S026. In other words, the latest current time's gait parameters (including the aforesaid body posture restoring period [Ta, Tb]) determined immediately before the determination result in S070 or S074 in FIG. 12 is switched to be affirmative are directly determined as the current time's gait parameters in S026.

Subsequently, the gait generator 100 proceeds to S028 to determine the parameters of the floor reaction force moment permissible range that define the permissible range of the floor reaction force moment about the desired ZMP (more specifically, the horizontal component of the floor reaction force moment) at each time from the start to the end of the current time's gait. The permissible range of the floor reaction force moment defined by the parameters of the floor reaction force moment permissible range is used in the aforesaid compensating total floor reaction force moment distributor 110 as previously described.

In this case, the result obtained by dividing the floor reaction force moment about the desired ZMP by the floor reaction force vertical component corresponds to the amount of deviation of the ZMP (the central point of the floor reaction force) from the desired ZMP. Hence, based on, for example, this relationship, the gait generator 100 determines the permissible range parameters of the floor reaction force moment in S028. More specifically, the gait generator 100 converts the ZMP existence permissible region at each time of the current time's gait into the permissible range of the floor reaction force moment on the basis of the aforesaid relationship to determine the permissible range parameters of the floor reaction force moment from the ZMP existence permissible region in the supporting polygon determined on the basis of the foot trajectory parameter of the current time's gait parameters determined in S026, the desired floor reaction force vertical component trajectory defined by the floor reaction force vertical component trajectory parameters of the current time's gait, and the desired ZMP trajectory defined by the ZMP trajectory parameters of the current time's gait.

The permissible range of the floor reaction force moment may be determined, taking the configuration or properties (e.g., the hardness of a floor) into account in addition to a supporting polygon, which is defined, depending on the ground contact surface (the surface of contact with a floor surface) of the robot 1.

Subsequently, the gait generator 100 proceeds to S030 to determine the instantaneous values of the current time's gait (the instantaneous values of the desired foot position/posture or the like of the current time's gait at a current control cycle). In this step S030, the instantaneous values of the current time's gait are determined such that the model manipulation floor reaction force moment input from the compensating total floor reaction force moment distributor 110 is generated about the desired ZMP.

To be more specific, in S030, the gait generator 100 carries out the same processing as the processing from S900 to S910 of FIG. 31, and then carries out the processing from S1000 to S1026 of FIG. 32, which is the subroutine processing of S912. In this case, however, in S1016 of FIG. 32 carried out in the processing in S030, the pattern of the latest body posture restoring moment ZMP-converted value (ZMPrec) finally determined by the processing in S718 of FIG. 29 in the aforesaid S020 (the pattern of the latest ZMPrec determined immediately before the determination result in S070 or S074 of FIG. 12 switches to be affirmative) is set as the pattern of the body posture restoring moment ZMP-converted value (ZMPrec).

Subsequently, the gait generator 100 carries out the same processing as that in S914 of FIG. 31, thus completing the processing in S030 of FIG. 10.

Time Tk in the processing carried out in S030 denotes time t of the present control cycle (the current control cycle) of the gait generator 100.

Subsequently, the gait generator 100 proceeds to S032 to determine an arm swinging motion (a motion for swinging the right and left arms in the longitudinally opposite directions from each other) so as to cancel a spin force (so as to reduce the floor reaction force moment vertical component (the component about the Z-axis) generated about the desired ZMP by a motion of a part other than the arms of the robot 1 to zero or substantially zero).

To be more specific, the gait generator 100 determines the floor reaction force moment vertical component trajectory obtained in the case where it is assumed that a current time's gait is generated such that the arms are not swung (to be more precise, the instantaneous values with reversed signs of the vertical component trajectory of the moment applied to the desired ZMP due to the resultant force of the inertial force generated by a motion of the robot 1 and the gravitational force acting on the robot 1 in the case where a current time's gait not involving arm swings is generated).

In other words, the gait generator 100 calculates the instantaneous value of a floor reaction force moment vertical component that balances out the instantaneous value of the inertial force moment vertical component generated about the desired ZMP by the motion of the current time's gait generated by the processing in S030, which motion does not include an arm swinging motion. Then, the instantaneous value of the floor reaction force moment vertical component is divided by the equivalent inertial moment of an arm swing motion to determine the angular acceleration of the arm swing motion necessary for canceling the spin force. If the arm swing becomes excessively large, then the instantaneous value of the floor reaction force moment vertical component may be divided by a value that is larger than the equivalent inertial moment of the arm swing motion to determine the angular acceleration of the arm swing motion.

Subsequently, the gait generator 100 carries out the second-order integration on the angular acceleration of the arm swing motion. The angle obtained by passing the integrated value through a low-cut filter is determined as the arm swing motion angle. Thus, the postures of both arms including the arm swing motion are determined. In the arm swing motion, however, the right and left arms are swung in opposite longitudinal directions from each other so as not to cause the positions of the centers-of-gravity of both arms to change.

As an alternative, the arm swing motion for canceling the spin force may be generated also for a normal gait beforehand and the arm swing motion in the current time's gait may be determined so as to be led thereto.

Subsequently, the gait generator 100 proceeds to S034 and increments time t for generating a gait by Δt (the control cycle of the gait generator 100) and then carries out the processing from S014 again.

This completes the description of the processing for generating a desired gait in the gait generator 100.

According to the present embodiment described above, the determination processing in S040 sequentially carried out while the robot 1 is in motion (traveling) in the operation mode of both legs alternately leaving from/landing on a floor determines whether an appropriate desired gait that enables the robot 1 to continue its motion in the operation mode of both legs alternately leaving from/landing on a floor (a current time's gait that makes it possible to satisfy the geometric leg motion requirement, the motion continuity requirement, and the condition on the ZMP existence permissible region) can be generated in the case where it is assumed that the motion of the robot 1 is continued in the operation mode of both legs alternately leaving from/landing on a floor. If the determination result is affirmative, then the operation mode of the next time's gait is maintained to the same operation mode of both legs alternately leaving from/landing on a floor as that of the current time's gait and a gait of both legs alternately leaving from/landing on a floor corresponding to the operation mode of both legs alternately leaving from/landing on a floor is generated.

Further, if the aforesaid determination result is negative, then the determination processing in S046 determines whether an appropriate desired gait that enables the robot 1 to continue its motion (a current time's gait that makes it possible to satisfy the geometric leg motion requirement, the motion continuity requirement, and the condition on the ZMP existence permissible region) can be generated in the case where it is assumed that the operation mode of the robot 1 is changed from the operation mode of both legs alternately leaving from/landing on a floor to the one-leg hopping operation mode after the current time's gait ends. If the determination result switches to be affirmative, then the operation mode of the next time's gait is set to the one-leg hopping operation mode and the current time's gait is generated such that the gait of both legs alternately leaving from/landing on a floor is smoothly shifted to the one-leg hopping gait (such that the series of the instantaneous values of the gait smoothly continues).

In the case where the robot 1 is in motion (traveling) in the one-leg hopping operation mode after the operation mode of the robot 1 is changed to the one-leg hopping operation mode, the determination processing in S040 determines whether the a proper desired gait that enables the robot 1 to continue its motion (a current time's gait that makes it possible to satisfy the geometric leg motion requirement, the motion continuity requirement, and the condition on the ZMP existence permissible region) can be generated if it is assumed that the operation mode of the robot 1 is set from the one-leg hopping operation mode back to the operation mode of both legs alternately leaving from/landing on a floor after the current time's gait ends. If the determination result is affirmative, then the operation mode of the next time's gait is set to the operation mode of both legs alternately leaving from/landing on a floor and a current time's gait is generated such that the one-leg hopping gait is smoothly changed over to the gait of both legs alternately leaving from/landing on a floor (such that the series of the instantaneous values of the gait smoothly continues).

Further, if the aforesaid determination result is negative, then the determination processing in S046 determines whether a proper desired gait that enables the robot 1 to continue its motion in the one-leg hopping operation mode (a current time's gait that makes it possible to satisfy the geometric leg motion requirement, the motion continuity requirement, and the condition on the ZMP existence permissible region) can be generated in the case where it is assumed that the motion of the robot 1 is continued in the one-leg hopping operation mode. If the determination result is affirmative, then the operation mode of the next time's gait is maintained to the one-leg hopping operation mode, which is the same as the current time's gait, and the one-leg hopping gait corresponding to the one-leg hopping operation mode is generated.

Then, the operation of the robot 1 is controlled through the intermediary of the composite-compliance operation determiner 104, the robot geometric model (kinematics calculator) 102, and the joint displacement controller 108 so as to follow the gaits generated as described above.

Thus, according to the present embodiment, the desired gaits of the robot 1 are generated to switch from the gait of both legs alternately leaving from/landing on a floor to the one-leg hopping gait in a situation wherein it is determined that properly continuing the motion of the robot 1 by a standard traveling operation of the robot 1, namely, the operation mode of both legs alternately leaving from/landing on a floor (the walking operation or the running operation), while preventing the posture of the robot 1 from being disturbed will be difficult, and wherein it is determined that changing the operation mode of the robot 1 from the operation mode of both legs alternately leaving from/landing on a floor over to the one-leg hopping operation mode will enable the robot 1 to properly continue its motion.

This arrangement permits a maximized possibility of the continued motion of the robot 1 at a stable posture without causing the posture of the robot 1 to be disturbed or without the need for forcibly interrupting the motion of the robot 1 in the situation wherein it is determined that properly continuing the motion of the robot 1 in the operation mode of both legs alternately leaving from/landing on a floor (the walking operation or the running operation) will be difficult.

Furthermore, the desired gaits of the robot 1 are generated such that the one-leg hopping gait is switched over to the gait of both legs alternately leaving from/landing on a floor in a situation wherein it is determined that the motion of the robot 1 can be properly continued without causing the posture of the robot 1 to be disturbed even if the operation mode of the robot 1 is switched back to the operation mode of both legs alternately leaving from/landing on a floor after the operation mode has been changed to the one-leg hopping operation mode.

Thus, the frequency of the robot 1 traveling in a highly stable walking or running motion can be increased by using the one-leg hopping motion of the robot 1 as a temporary motion.

Further, in the determination processing in S040 or S046, if it is possible to generate a current time's gait that satisfies the geometric leg motion requirement that requires the landing position of the leg 2 be restricted to a position within a geometrically permissible landing region 22G, the motion continuity requirement that requires a desired motion trajectory of the robot 1 of a current time's gait turn into a motion trajectory that can be converged into the motion of a normal gait, which is a cyclic gait, and the condition on a ZMP existence permissible region that requires a desired ZMP be restricted to a position in a ZMP existence permissible region within a supporting polygon, then it is determined that a proper desired gait that enables the robot 1 to continue its motion can be generated.

Therefore, it can be determined whether a proper desired gait can be generated by properly reflecting the geometric (kinematic) restrictive condition on the legs 2 and 2 of the robot 1, the requirement for securing the continuity of the motion of the robot 1, and the dynamic restrictions related to a ZMP as the aforesaid geometric leg motion requirement, the motion continuity requirement, and the condition on the ZMP existence permissible region, respectively. This arrangement makes it possible to enhance the reliability of the determination result, thus allowing the operation mode of the robot 1 to be changed at a proper timing or in a proper situation.

Further, when changing the operation mode of the robot 1, a current time's gait is generated on the assumption that the operation mode will be changed from the next time's gait, that is, on the assumption that the operation mode will be changed after the leg 2 which will be the supporting leg in the next time's gait lands, thus making it possible to obviate a sudden change in a desired motion of the robot 1. This means that the desired gait of the robot 1 can be generated such that the desired motion of the robot 1 smoothly continues from the motion before the operation mode is changed to the motion after the operation mode is changed.

The present embodiment provides the following advantages related to the motion of the robot 1 especially in the one-leg hopping operation mode.

More specifically, in the case where the robot 1 performs the one-leg hopping motion in the one-leg hopping operation mode, the body posture angles in the roll direction for the one-leg hopping illustrated in FIG. 34 and FIG. 36 are set as the reference body posture angles in the roll direction (about the X-axis). Hence, the desired body posture angle in the roll direction in the state wherein the supporting leg has landed after a floating phase is determined to coincide with the body posture angle in the roll direction for the one-leg hopping as the reference body posture angle or determined to be a posture angle approximating thereto. Here, the desired body posture angle in the roll direction in the state wherein the supporting leg has landed after a floating phase does not necessarily coincide with the reference body posture angle, because the desired body posture angle is corrected by shifting it from the reference body posture angle so as to satisfy the permissible range of a horizontal floor reaction force.

Thus, in the state wherein the supporting leg has landed after the floating phase of the one-leg hopping motion, the desired body posture angle will be a posture angle obtained when the body 24 inclines such that the proximal end (the hip joint) of the free leg 2 is positioned relatively higher than the proximal end (the hip joint) of the supporting leg 2, as illustrated in FIG. 36. Accordingly, the desired gait (the one-leg hopping gait) of the robot 1 is generated such that the total center of gravity Ga of the robot 1 lies at a position right above or close to the hip joint of the supporting leg 2.

Further, the desired ZMP is set at a position within the ground contact surface of the supporting leg foot 22 in the state wherein the supporting leg has landed, so that, on the average, the aforesaid total center of gravity Ga immediately after the supporting leg 2 lands is positioned substantially right above the ground contact surface of the supporting leg foot 22.

Thus, controlling the operation of the robot 1 to follow the desired gait (the one-leg hopping gait) makes it possible to restrain a large moment (a moment about the X-axis) from acting on the hip joint of the supporting leg 2 while satisfying the dynamic balance condition of the robot 1 when the supporting leg 2 lands on a floor immediately following the floating phase of the one-leg hopping motion. As a result, the load on the joint actuator (the electric motor 42 in the present embodiment) of the hip joint can be reduced, the size or the weight of the joint actuator or the hip joint can be reduced, and the durability of the joint actuator or the hip joint can be enhanced.

Here, the relationship of correspondence between the present embodiment described above and the present invention will be supplementarily described.

In the present embodiment, the processing in S040 of FIG. 11 implements the first determining unit or the third determining unit in the present invention. More specifically, the first determining unit in the present invention is implemented by the determination processing in S040 in the case where the operation mode of a current time's gait is the operation mode of both legs alternately leaving from/landing on a floor, and the third determining unit in the present invention is implemented by the determination processing in S040 in the case where the operation mode of the current time's gait is the one-leg hopping operation mode.

In this case, when the operation mode of the current time's gait is the operation mode of both legs alternately leaving from/landing on a floor, the geometric leg motion requirement, the motion continuity requirement, and the condition on the ZMP existence permissible region in the case where it is assumed that the operation mode of the next time's gait is the operation mode of both legs alternately leaving from/landing on a floor correspond to the first A condition, the first B condition and the first C condition, respectively, in the present invention. The combination of these conditions constitutes the first condition in the present invention. Further, the geometrically permissible landing region 22G illustrated in FIG. 13(*a*) or FIG. 13(*b*) corresponds to the predetermined permissible landing region related to the first A condition.

Further, when the operation mode of the current time's gait is the one-leg hopping operation mode, the geometric leg motion requirement, the motion continuity requirement, and the condition on the ZMP existence permissible region in the case where it is assumed that the operation mode of the next time's gait is the operation mode of both legs alternately leaving from/landing on a floor correspond to the third A condition, the third B condition and the third C condition, respectively, in the present invention. The combination of these conditions constitutes the third condition in the present invention. Further, the geometrically permissible landing region 22HG illustrated in FIG. 14 corresponds to the predetermined permissible landing region related to the third A condition.

Further, according to the present embodiment, the processing in S046 of FIG. 11 implements the second determining unit or the fourth determining unit in the present invention. More specifically, the determination processing in S046 in the case where the operation mode of the current time's gait is the operation mode of both legs alternately leaving from/landing on a floor implements the second determining unit in the present invention. Similarly, the determination processing in S046 in the case where the operation mode of the current time's gait is the one-leg hopping operation mode implements the fourth determining unit in the present invention.

In this case, when the operation mode of the current time's gait is the operation mode of both legs alternately leaving from/landing on a floor, the geometric leg motion requirement, the motion continuity requirement, and the condition on the ZMP existence permissible region in the case where it is assumed that the operation mode of the next time's gait is the one-leg hopping operation mode correspond to the second A condition, the second B condition and the second C condition, respectively, in the present invention. The combination of these conditions constitutes the second condition in the present invention. Further, the geometrically permissible landing region 22G illustrated in FIG. 13(*a*) or FIG. 13(*b*) corresponds to the predetermined permissible landing region related to the second A condition.

Further, when the operation mode of the current time's gait is the one-leg hopping operation mode, the geometric leg motion requirement, the motion continuity requirement, and the condition on the ZMP existence permissible region in the case where it is assumed that the operation mode of the next time's gait is the one-leg hopping operation mode correspond to the fourth A condition, the fourth B condition and the fourth C condition, respectively, in the present invention. The combination of these conditions constitutes the fourth condition in the present invention. Further, the geometrically permissible landing region 22HG illustrated in FIG. 14 corresponds to the predetermined permissible landing region related to the fourth A condition.

Further, in the present embodiment, the processing in S044, S050 and S052 of FIG. 11 implements the operation mode determining unit in the present invention.

In the present embodiment, the gait generator 100 (more specifically, the processing in S022 to S032 of FIG. 10 sequentially carried out by the gait generator 100 at every control cycle) implements the desired gait generating unit in the present invention.

A description will now be given of several modifications of the embodiments described above.

In the aforesaid embodiments, the operation mode of the robot 1 has been determined by determining whether the motion of the robot 1 in the operation mode of both legs alternately leaving from/landing on a floor or the one-leg hopping operation mode enables the robot 1 to properly continue its motion, and then the motion of the robot 1 has been carried out in the determined operation mode.

Alternatively, however, the operation mode of the robot 1 may be specified to the robot 1 as necessary or in advance from an external unit such as, for example, a controlling device, thus causing the robot 1 to perform its motion in the specified operation mode.

In the case where the operation mode of the robot 1 is specified as described above, the processing for determining the current time's gait parameters in the operation mode of both legs alternately leaving from/landing on a floor or the one-leg hopping operation mode may be carried out for each gait changeover (i.e., for each step). For example, current time's gait parameters may be determined for each gait changeover (at the control cycle of gait changeover) by the processing illustrated by the flowchart of FIG. 12 in the aforesaid Japanese Patent No. 3674788, and the operation control for one step of the robot 1 may be carried out on the basis of the instantaneous value (the instantaneous value at each control cycle) of a current time's gait specified by the determined current time's gait parameters.

In this case, the current time's gait parameters in the operation mode of both legs alternately leaving from/landing on a floor may be determined in the same manner as that described in the aforesaid Japanese Patent No. 3674788. Further, the current time's gait parameters in the one-leg hopping operation mode may be determined in the same manner as that for determining the current time's gait parameters of the one-leg hopping gait at the control cycle at the gait changeover in the aforesaid embodiment of the present invention.

Further, in the embodiment described above, the dynamic model illustrated in FIG. 9 has been used. However, the dynamic model for generating gaits is not limited to the dynamic model illustrated in FIG. 9. For example, a multi-mass-point model having a mass point in each link of the robot 1 may be used as the dynamic model. The dynamic model for generating gaits may use other types of dynamic model as long as the dynamic model is capable of properly representing the dynamics of the robot 1 in the motion of both legs alternately leaving from/landing on a floor, the one-leg hopping motion or the like.

Alternatively, as with the technique for generating gaits disclosed by the applicant of the present application in, for example, Japanese Patent No. 4246538, after generating a desired gait by using a relatively simple dynamic model, the generated desired gait may be corrected by using a more precise dynamic model to generate various desired gaits, including the gait of both legs alternately leaving from/landing on a floor and the one-leg hopping gait.

Further, in the aforesaid embodiment, the model manipulation floor reaction force moment has been fed back to the gait generator 100 and the model manipulation floor reaction force moment has been additionally applied to the robot 1 on the dynamic model of the robot 1. However, the model manipulation floor reaction force moment may be omitted (in other words, the model manipulation floor reaction force moment may be steadily set to zero).

Further, in the aforesaid embodiment, the combination of the geometric leg motion requirement, the motion continuity requirement, and the condition on the ZMP existence permissible region has been used as the conditions (the first to the fourth conditions in the present invention) for determining whether a proper desired gait that permits a continued motion can be generated; alternatively, however, conditions other than these may be used or more conditions may be added. The conditions for determining whether a proper desired gait that ensures a continued motion can be generated may be set, as necessary, by taking into account the construction of a robot, the type of a gait generation algorithm, the operating environment of the robot and the like.

Further, the aforesaid embodiment has been described by taking the case, where a desired gait is generated in real time while the robot 1 is in motion, as an example. However, the gait generator in accordance with the present invention may generate desired gaits (including the one-leg hopping gait) of a robot by using a computer at an arbitrary timing other than the time when the actual robot 1 is in motion.

What is claimed is:

1. A control device for a bipedal mobile robot which has two legs with proximal end portions thereof connected to a body through the intermediary of joints and which is capable of accomplishing motions, including a one-leg hopping motion in which only one of the two legs leaves from a floor and then lands on the floor while the other leg is off the floor, the control device comprising:

a desired gait generating unit which generates a desired gait including at least a desired motion of the robot when the robot performs the one-leg hopping motion such that a horizontal distance in a left and right direction of the robot between a total center-of-gravity point of the robot and the proximal end portion of the one leg in a state wherein the one leg has landed on the floor after leaving from the floor is shorter than the horizontal distance therebetween in a state wherein the robot is standing in an upright posture with only the one leg on the floor, wherein the proximal end portion of the one leg is an upper end of the one leg; and a joint control unit which controls operation of each joint of the robot according to the generated desired gait, wherein the desired motion generated by the desired gait generating unit in the state wherein the one leg has landed on the floor after leaving from the floor is a desired motion that causes the total center-of-gravity point of the robot and the proximal end portion of the one leg to be vertically arranged at right above a ground contact surface of the one leg, wherein the robot has, as an operation mode thereof, a one-leg hopping operation mode, which is a mode for carrying out the one-leg hopping motions, and an operation mode of both legs alternately leaving from/landing on the floor for the robot to travel by carrying out both legs alternately leaving from/landing on the floor motion, which consists of the motion of each leg leaving from the floor and then landing on the floor, alternating between two legs, the control device further comprising:

a first determining unit which sequentially determines whether it is possible to generate the desired gait that satisfies a predetermined first condition required to continue the motion of the robot in the operation mode of both legs alternately leaving from/landing on the floor while the robot is moving in the operation mode of both legs alternately leaving from/landing on the floor;

a second determining unit which sequentially determines whether it is possible to generate the desired gait that satisfies a predetermined second condition required to continue the motion of the robot by changing a future operation mode of the robot from the operation mode of both legs alternately leaving from/landing on the floor to the one-leg hopping operation mode in a case where the determination result given by the first determining unit is negative; and an operation mode determining unit which maintains the operation mode of the robot to the operation mode of both legs alternately leaving from/landing on the floor in a case where the determination result given by the first determining unit is affirmative, or determines the operation mode of the robot on the basis of the determination results given by the first determining unit and the second determining unit so as to change the future operation mode of the robot from the operation mode of both legs alternately leaving from/landing on the floor to the one-leg hopping operation mode in a case where the determination result given by the first determining unit is negative while the determination result given by the second determining unit is affirmative, wherein the desired gait generating unit generates the desired gait such that the robot performs a motion in the determined operation mode.

2. The control device for a bipedal mobile robot according to claim 1, wherein in the case where a parallel direction of the two legs in the state wherein the robot is standing in the upright posture is defined as a lateral direction of the robot, the posture of the body in the desired motion generated by the desired gait generating unit in the state wherein the one leg has landed on the floor after leaving from the floor is a posture obtained by tilting the body toward the one leg in the lateral direction of the robot from the body posture in the upright posture.

3. The control device for a bipedal mobile robot according to claim 1, further comprising:

a third determining unit which sequentially determines whether it is possible to generate the desired gait that satisfies a predetermined third condition required to continue the motion of the robot by changing the future operation mode of the robot from the one-leg hopping operation mode to the operation mode of both legs alternately leaving from/landing on the floor during the motion of the robot in the one-leg hopping operation mode; and a fourth determining unit which sequentially determines whether it is possible to generate the desired gait that satisfies a predetermined fourth condition required to continue the motion of the robot in the one-leg hopping operation mode in a case where the determination result given by the third determining unit is negative, wherein the operation mode determining unit includes a unit which determines the operation mode of the robot according to the determination results given by the third determining unit and the fourth determining unit such that the future operation mode of the robot is changed from the one-leg hopping operation mode to the operation mode of both legs alternately leaving from/landing on the floor in a case where the determination result given by the third determining unit is affirmative, of the future operation mode of the robot is maintained to the one-leg hopping operation mode in a case where the determination result given by the third determining unit is negative and the determination result given by the fourth determining unit is affirmative.

4. The control device for a bipedal mobile robot according to claim 1, wherein in the case where the determination result given by the first determining unit is negative while the determination result given by the second determining unit is affirmative, the operation mode determining unit changes the operation mode of the robot from the operation mode of both legs alternately leaving from/landing on the floor to the one-leg hopping operation mode after the leg to be landed anew in the operation mode of both legs alternately leaving from/landing on the floor after a current time lands on the floor.

5. The control device for a bipedal mobile robot according to claim 3, wherein in a case where the determination result given by the third determining unit is affirmative, the operation mode determining unit changes the operation mode of the robot from the one-leg hopping operation mode to the operation mode of both legs alternately leaving from/landing on the floor after the one leg to be landed anew in the one-leg hopping operation mode after a current time lands on the floor.

6. The control device for a bipedal mobile robot according to claim 4, wherein the first condition includes at least:
a first A condition that a desired landing position in the desired gait of a leg to be landed on the floor anew in the operation mode of both legs alternately leaving from/landing on the floor lies in a predetermined permissible landing region associated with the operation mode of both legs alternately leaving from/landing on the floor in the case where the desired gait is generated by the desired gait generating unit provided that the operation mode is maintained to the operation mode of both legs alternately leaving from/landing on the floor, a first B condition that the motion trajectory of the robot defined by the desired gait becomes a motion trajectory that can be converged in the future to a motion trajectory of a virtual cyclic gait repeating the same pattern of motion in the operation mode of both legs alternately leaving from/landing on the floor, and a first C condition that the desired position of a ZMP defined by the desired gait lies in a predetermined ZMP existence permissible region set according to the motion trajectories of the two legs defined by the desired gait, and the second condition includes at least:
a second A condition that a desired landing position in the desired gait of a leg to be landed on the floor in the operation mode of both legs alternately leaving from/landing on the floor lies in the predetermined permissible landing region associated with the operation mode of both legs alternately leaving from/landing on the floor in the case where the desired gait is generated by the desired gait generating unit provided that the operation mode is changed from the operation mode of both legs alternately leaving from/landing on the floor to the one-leg hopping operation mode after the leg to be landed anew in the operation mode of both legs alternately leaving from/landing on the floor lands on the floor, a second B condition that the motion trajectory of the robot defined by the desired gait becomes a motion trajectory that can be converged in the future to a motion trajectory of a virtual cyclic gait repeating the same pattern of motion in the one-leg hopping operation mode, and a second C condition that the desired position of a ZMP defined by the desired gait lies in a predetermined ZMP existence permissible region set according to the motion trajectory of the one leg defined by the desired gait.

7. The control device for a bipedal mobile robot according to claim 5, wherein the third condition includes at least:

a third A condition that a desired landing position in the desired gait of the one leg to be landed on the floor in the one-leg hopping operation mode lies in a predetermined permissible landing region associated with the one-leg hopping operation mode in the case where the desired gait is generated by the desired gait generating unit provided that the operation mode is changed from the one-leg hopping operation mode to the operation mode of both legs alternately leaving from/landing on the floor after the one leg to be landed on the floor anew in the one-leg hopping operation mode lands on the floor, a third B condition that the motion trajectory of the robot defined by the desired gait becomes a motion trajectory that can be converged in the future to a motion trajectory of a virtual cyclic gait repeating the same pattern of motion in the operation mode of both legs alternately leaving from/landing on the floor, and a third C condition that the desired position of a ZMP defined by the desired gait lies in a predetermined ZMP existence permissible region set according to the motion trajectories of the two legs defined by the desired gait, and the fourth condition includes at least:

a fourth A condition that a desired landing position in the desired gait of the one leg to be landed on the floor anew in the one-leg hopping operation mode lies in the predetermined permissible landing region associated with the one-leg hopping operation mode in the case where the desired gait is generated by the desired gait generating unit provided that the operation mode is maintained to the one-leg hopping operation mode, a fourth B condition that the motion trajectory of the robot defined by the desired gait becomes a motion trajectory that can be converged in the future to a motion trajectory of a virtual cyclic gait repeating the same pattern of motion in the one-leg hopping operation mode, and a fourth C condition that the desired position of a ZMP defined by the desired gait lies in a predetermined ZMP existence permissible region set according to the motion trajectory of the one leg defined by the desired gait.

8. The control device for a bipedal mobile robot according to claim 1, wherein the desired gait generating unit has a unit which generates a desired motion of the robot such that the total center-of-gravity point of the robot descends in a case where the determination result given by the first determining unit and the determination result given by the second determining unit are both negative.

9. The control device for a bipedal mobile robot according to claim 3, wherein the desired gait generating unit has a unit which generates a desired motion of the robot such that the total center-of-gravity point of the robot descends in a case where the determination result given by the third determining unit and the determination result given by the fourth determining unit are both negative.

10. A gait generating device for a bipedal mobile robot which has two legs with the proximal end portions thereof connected to a body through the intermediary of joints and which is capable of accomplishing motions, including a one-leg hopping motion in which only one of the two legs leaves from a floor and then lands on the floor while the other leg is off the floor, the gait generating device comprising:

a desired motion generating unit which generates a desired motion of the robot when the robot performs the one-leg hopping motion such that a horizontal distance in a left and right direction of the robot between the total center-of-gravity point of the robot and the proximal end portion of the one leg in a state wherein the one leg has landed on the floor after leaving from the floor is shorter than the horizontal distance in a state wherein the robot is standing in an upright posture with only the one leg on the floor in a case where a desired gait including at least a desired motion of the robot for causing the robot to perform the one-leg hopping motion is generated, wherein the proximal end portion of the one leg is an upper end of the one leg, wherein the desired motion generated by the desired motion generating unit in the state in which the one leg has landed on the floor after leaving from the floor is a desired motion that causes the total center-of-gravity point of the robot and the proximal end portion of the one leg to be vertically arranged at right above a ground contact surface of the one leg, wherein the robot has, as an operation mode thereof, a one-leg hopping operation mode, which is a mode for carrying out the one-leg hopping motions, and an operation mode of both legs alternately leaving from/landing on the floor for the robot to travel by carrying out both legs alternately leaving from/landing on the floor motion, which consists of the motion of each leg leaving from the floor and then landing on the floor, alternating between two legs, the control device further comprising:

a first determining unit which sequentially determines whether it is possible to generate the desired gait that satisfies a predetermined first condition required to continue the motion of the robot in the operation mode of both legs alternately leaving from/landing on the floor while the robot is moving in the operation mode of both legs alternately leaving from/landing on the floor;

a second determining unit which sequentially determines whether it is possible to generate the desired gait that satisfies a predetermined second condition required to continue the motion of the robot by changing a future operation mode of the robot from the operation mode of both legs alternately leaving from/landing on the floor to the one-leg hopping operation mode in a case where the determination result given by the first determining unit is negative; and an operation mode determining unit which maintains the operation mode of the robot to the operation mode of both legs alternately leaving from/landing on the floor in a case where the determination result given by the first determining unit is affirmative, or determines the operation mode of the robot on the basis of the determination results given by the first determining unit and the second determining unit so as to change the future operation mode of the robot from the operation mode of both legs alternately leaving from/landing on the floor to the one-leg hopping operation mode in a case where the determination result given by the first determining unit is negative while the determination result given by the second determining unit is affirmative, wherein the desired gait generating unit generates the desired gait such that the robot performs a motion in the determined operation mode.

11. The gait generating device for a bipedal mobile robot according to claim 10, wherein in the case where a parallel direction of the two legs in the state wherein the robot is standing in the upright posture is defined as a lateral direction of the robot, the posture of the body in the desired motion generated by the desired gait generating unit in the state wherein the one leg has landed on the floor after leaving from the floor is a posture obtained by tilting the body toward the one leg in the lateral direction of the robot from the body posture in the upright posture.

* * * * *